(12) United States Patent
Magnuszewski et al.

(10) Patent No.: US 10,893,213 B2
(45) Date of Patent: Jan. 12, 2021

(54) VEHICLE UNDERCARRIAGE IMAGING SYSTEM

(71) Applicant: ACV Auctions Inc., Buffalo, NY (US)

(72) Inventors: Daniel Magnuszewski, Amherst, NY (US); Charlie Campanella, Tonawanda, NY (US); Keith Carolus, Buffalo, NY (US); Darin Chambers, Hamburg, NY (US); Reid Gershbein, Buffalo, NY (US); Michael Pokora, Buffalo, NY (US); Timothy Poulsen, Walworth, NY (US); Philip Schneider, Amherst, NY (US); Julian Baldwin, Buffalo, NY (US)

(73) Assignee: ACV Auctions Inc., Buffalo, NY (US)

( * ) Notice: Subject to any disclaimer, the term of this patent is extended or adjusted under 35 U.S.C. 154(b) by 0 days.

(21) Appl. No.: 16/373,393

(22) Filed: Apr. 2, 2019

(65) Prior Publication Data

US 2020/0322545 A1    Oct. 8, 2020

(51) Int. Cl.
| | | |
|---|---|---|
| H04N 5/00 | (2011.01) | |
| H04N 5/262 | (2006.01) | |
| H04N 5/225 | (2006.01) | |
| H04N 5/247 | (2006.01) | |
| G03B 15/06 | (2006.01) | |
| H04N 5/232 | (2006.01) | |
| G06T 7/00 | (2017.01) | |

(52) U.S. Cl.
CPC ........... *H04N 5/2624* (2013.01); *G03B 15/06* (2013.01); *H04N 5/2253* (2013.01); *H04N 5/23299* (2018.08); *H04N 5/247* (2013.01); *G06T 7/0004* (2013.01); *G06T 2207/30252* (2013.01)

(58) Field of Classification Search
USPC ........................................................ 396/322
See application file for complete search history.

(56) References Cited

U.S. PATENT DOCUMENTS

| | | | | |
|---|---|---|---|---|
| 6,856,344 B2* | 2/2005 | Franz | ................. | G01N 21/8806 |
| | | | | 348/143 |
| 8,006,559 B2* | 8/2011 | Mian | ..................... | G01M 17/10 |
| | | | | 250/522.1 |
| 8,155,384 B2 | 4/2012 | Chew | | |
| 8,594,979 B2* | 11/2013 | Icove | ....................... | G01V 3/15 |
| | | | | 324/207.2 |

(Continued)

FOREIGN PATENT DOCUMENTS

| | | |
|---|---|---|
| KR | 10-1630596 B1 | 6/2016 |
| WO | 2006/059998 A1 | 6/2006 |

OTHER PUBLICATIONS

International Search Report and Written Opinion for Application No. PCT/US2020/026417 dated Jul. 31, 2020.

*Primary Examiner* — Clayton E. LaBalle
*Assistant Examiner* — Warren K Fenwick
(74) *Attorney, Agent, or Firm* — Merchant & Gould P.C.

(57) ABSTRACT

Devices and methods for capturing vehicle undercarriage images are described. In some instances, a mirror assembly may be used to reflect images of portions of a vehicle undercarriage into a field of view of a camera to be captured, e.g., as a vehicle passes over the mirror assembly. Composite images may be reconstructed from the reflected portions of the vehicle undercarriage, and analysis may be performed on those reconstructed, composite images to identify features in the composite vehicle undercarriage images.

23 Claims, 39 Drawing Sheets

(56) References Cited

U.S. PATENT DOCUMENTS

| | | | | |
|---|---|---|---|---|
| 9,244,133 B2* | 1/2016 | Icove | ............... | G01V 3/081 |
| 2006/0262190 A1 | 11/2006 | Millar | | |
| 2007/0040911 A1* | 2/2007 | Riley | ............... | H04N 7/181 |
| | | | | 348/148 |
| 2015/0331113 A1* | 11/2015 | Stettner | ............ | G01S 17/931 |
| | | | | 701/37 |

* cited by examiner

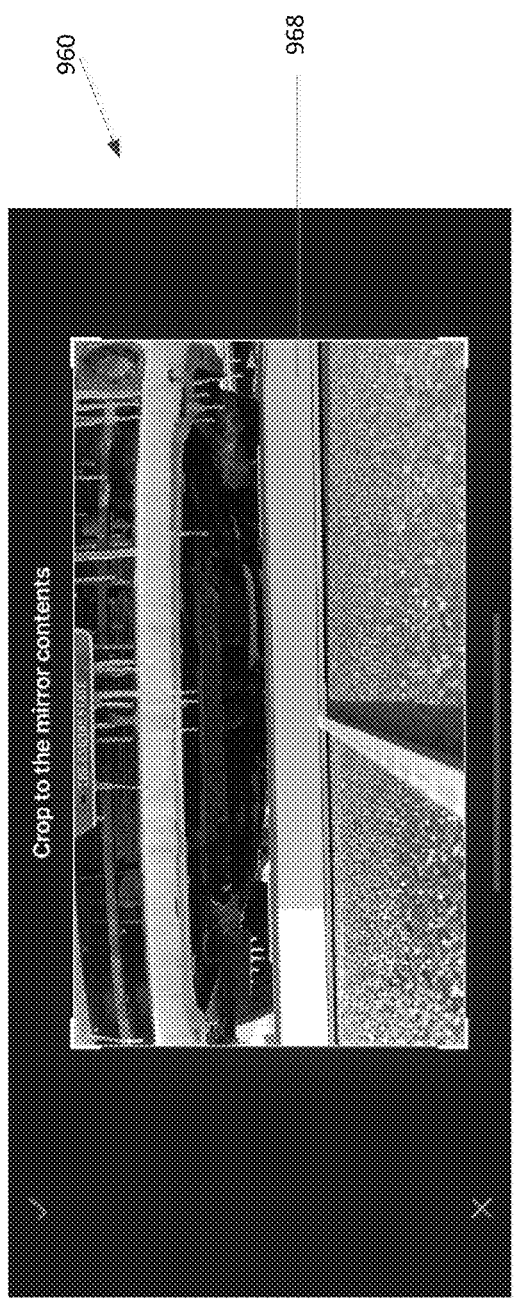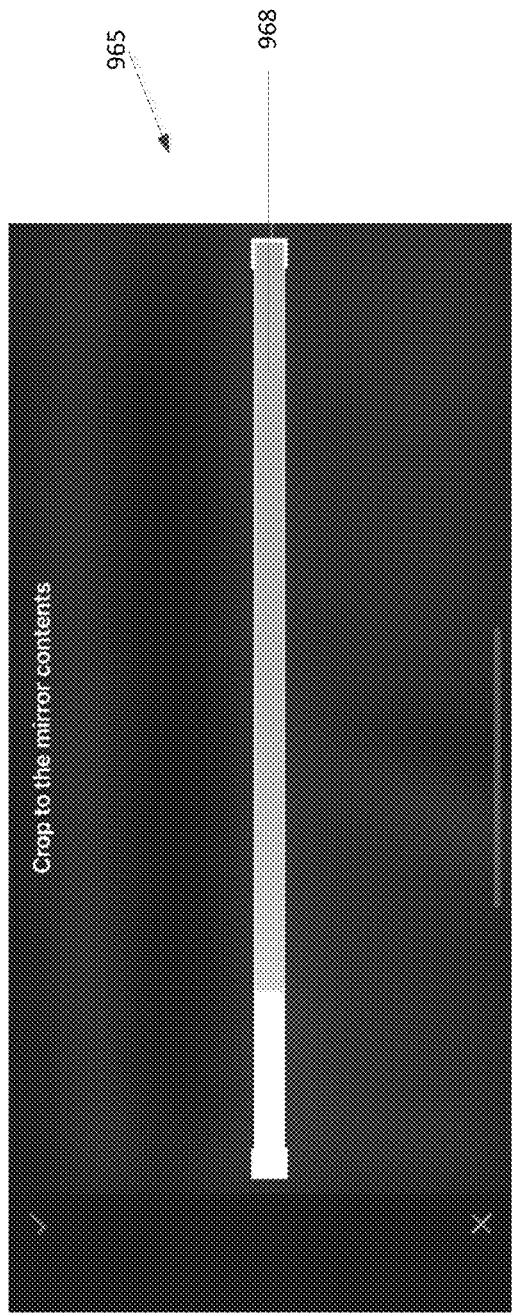
FIG. 32

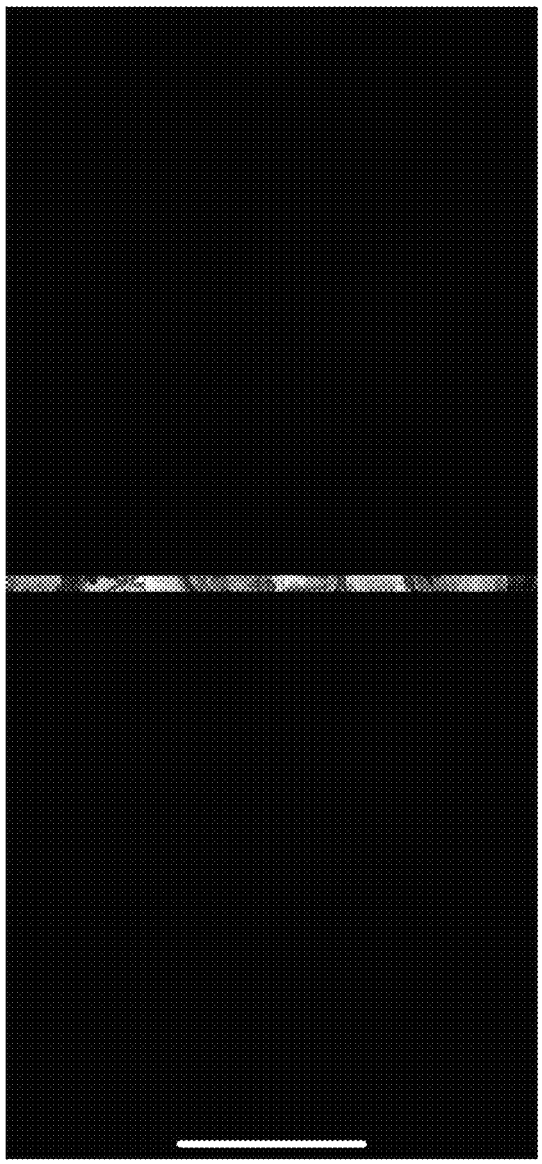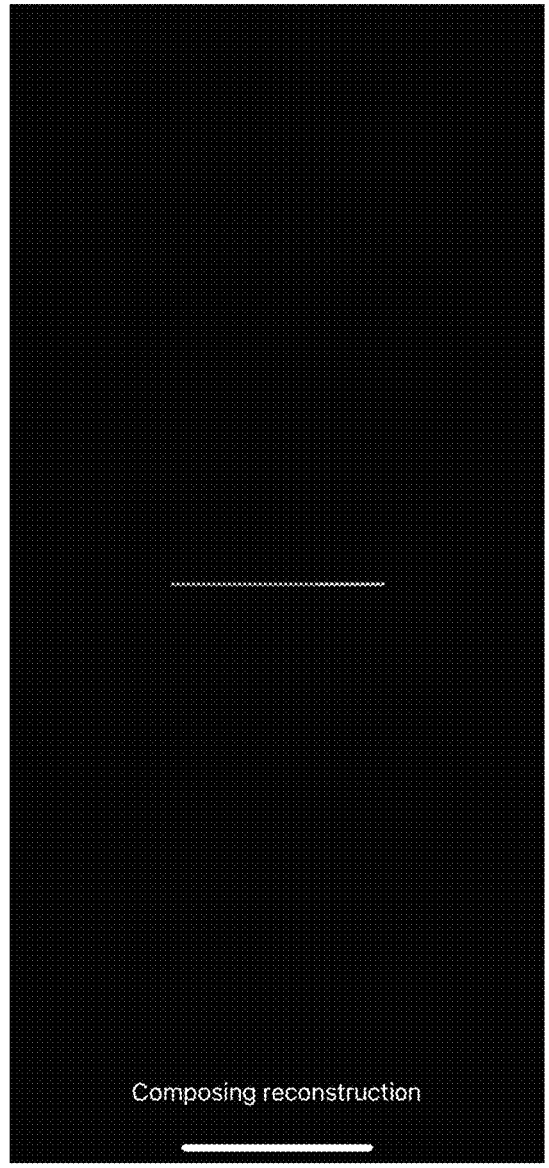
970  FIG. 33  975

VEHICLE UNDERCARRIAGE IMAGING SYSTEM

TECHNICAL FIELD

This invention relates to the field of vehicle diagnostics. More particularly, this invention relates to the capture and processing of vehicle undercarriage images.

BACKGROUND

Vehicles are often bought and sold in the wholesale market by automobile dealers. Vehicle buying and selling transactions may occur in-person or online in a virtual sales environment, and may also occur at auctions, either in-person or online over the internet. Because of the volume of vehicles sold at auction, often it is not possible for a dealer, acting as either a wholesale buyer or wholesale seller, to inspect a vehicle in-person, much less have the vehicle inspected by a qualified mechanic. Dealers often rely on auction houses or third party inspection services to provide vehicle condition data upon which purchasing decisions may be made. This vehicle condition data is often provided to dealers as a written report in electronic form.

The value of a vehicle condition report is based, in large part, on the accuracy and completeness of the data it contains. However, even perfect vehicle condition reports may lack data necessary to provide an accurate assessment of a vehicle's condition. For example, vehicle undercarriage features such as rust, flood damage, frame damage, missing components, aftermarket replacements, and non-standard components are not easily observed and captured in a written report. The same is true in a retail environment, where vehicle data is often presented online in a website as a written description and a set of images of the exterior and interior of the vehicle, but lacking vehicle undercarriage features such as how the undercarriage looks.

One of the challenges of determining vehicle undercarriage condition is the difficulty in capturing vehicle undercarriage data because a vehicle's undercarriage is relatively inaccessible. A vehicle's undercarriage is relatively inaccessible because the ground clearance of a vehicle is typically only a few inches. In order to access the undercarriage of a vehicle for visual inspection, image capture, or video capture, the vehicle must be separated from the surface on which the vehicle resides, e.g. a road, parking lot, or the ground, to give a reasonable viewing distance in order to for the vehicle undercarriage to be within the field of view of the viewer or image capture device, and to give a reasonable distance for a viewer or image capture device to focus. Separating the vehicle from the surface on which it resides can be done by lifting the vehicle off the ground with a vehicle lift, driving the vehicle onto an elevated ramp, or driving the vehicle over an area with a recess in the ground. Such methods require specialty equipment or a special surface, which are typically costly or not readily accessible, or both. If the vehicle is not separated from the ground, the viewer or camera are forced to operate within the limited viewing distance afforded by the ground clearance of the vehicle.

Therefore, there is a need for improvements in the capture and processing of vehicle condition data provided to dealers in wholesale automobiles. The need for improvements in the capture and processing of vehicle condition data extends to the retail market for automobiles as well.

SUMMARY

In general terms, this disclosure is directed towards assessment of the condition of vehicles. This disclosure relates generally to systems and methods for providing vehicle undercarriage diagnostics, and in particular to capturing and evaluating vehicle undercarriage images.

In a first aspect, a vehicle undercarriage imaging system is disclosed. The system includes a mirror assembly and a camera. The mirror assembly includes a base and a mirror surface, the mirror surface having a width and the mirror assembly having a height. The camera is positionable at a location that is central in a width direction along the mirror surface and spaced apart from the mirror surface in a depth direction that is normal to the width direction, the camera having a field of view oriented toward the mirror surface. The mirror surface is angled in the depth direction such that a reflected field of view that is viewable in the mirror surface at the camera is above the mirror assembly in the height direction. The camera is configured to capture sequential images of at least a portion of a vehicle undercarriage passing above the mirror assembly within the reflected field of view.

In a second aspect, a vehicle undercarriage imaging system is disclosed that includes a mirror assembly and a camera mount. The mirror assembly includes a base and a mirror surface, the mirror surface having a width and the mirror assembly having a height. The camera mount is positioned on an end of an extension arm, the extension arm movable between a retracted position an extended position, wherein, in the extended position, the camera mount is at a location that is central in a width direction along the mirror surface and spaced apart from the mirror surface in a depth direction that is normal to the width direction. The camera mount is positioned such that a camera mountable therein is oriented toward the mirror surface. The mirror surface is angled in the depth direction such that a reflected field of view that is viewable in the mirror surface from the camera mount is above the mirror assembly in the height direction. The reflected field of view includes an entire width of a vehicle undercarriage passing above the mirror assembly in the depth direction.

In a third aspect, a method of capturing an image of a vehicle undercarriage is disclosed. The method includes placing a mirror assembly at a predetermined location, the mirror assembly including a base and a mirror surface, the mirror surface having a width and the mirror assembly having a height. The method further includes extending a camera mount from the mirror assembly at a predetermined horizontal distance from the mirror assembly. The method also includes positioning a device including a camera in the camera mount oriented toward the mirror surface, the mirror surface being upwardly angled to reflect a view above the mirror assembly toward the camera, and causing a vehicle to pass over the mirror assembly while recording a plurality of images in the camera. The method further includes viewing a composite vehicle undercarriage image compiled from portions of the plurality of images.

In a further aspect, a method of obtaining a vehicle undercarriage image is disclosed. The method includes obtaining image data comprising a series of images captured from an image capture location, the image capture location being a location at which a vehicle undercarriage passes through a field of view. The method further includes determining a sub-region of images included in the series of images, the sub-region corresponding to a region of interest in which a portion of the vehicle undercarriage appears as a vehicle passes over the image capture location, and combining the regions of interest to form a composite image of the vehicle undercarriage, the composite image being a representative image of the vehicle undercarriage reconstructed from the sub-regions of the series of images.

In a still further aspect, a vehicle undercarriage image processing system includes a programmable circuit and a memory operatively connected to the programmable circuit. The memory stores an application comprising instructions which, when executed, cause the programmable circuit to perform: obtaining image data comprising a series of images, the series of images capturing a field of view including an image capture location; determining a sub-region of images included in the series of images, the sub-region corresponding to a region of interest in which a portion of a vehicle undercarriage appears as a vehicle passes over the image capture location; and combining the regions of interest to form a composite image of the vehicle undercarriage, the composite image being a representative image of the vehicle undercarriage reconstructed from the sub-regions of the series of images.

In a further aspect, a method of obtaining a vehicle undercarriage image is disclosed. The method includes obtaining, via a camera of a mobile device, image data comprising a series of images, the series of images capturing a field of view including an image capture location defined by a mirror assembly positioned at a predetermined location and orientation relative to the mobile device. The method also includes determining, based on the image data, a sub-region of images included in the series of images, the sub-region corresponding to a region of interest that is reflected to the camera by the mirror assembly. The method also includes combining the regions of interest to form a composite image of the regions of interest, the composite image being a representative image of an object in the regions of interest reconstructed from the sub-regions of the series of images.

Corresponding reference characters indicate corresponding parts throughout the several views. The exemplifications set out herein illustrate an embodiment of the invention, and such exemplifications are not to be construed as limiting the scope of the invention in any manner.

BRIEF DESCRIPTION OF THE DRAWINGS

The present disclosure will be described hereafter with reference to the attached drawings which are given as non-limiting examples only, in which:

FIG. 32 is an image of user interface screen for determining a sub-region within each of the individual frames of an extracted set of frames from a video and a user interface screen for displaying the determined sub-region, according to an example embodiment of the present disclosure.

FIG. 33 is an image of user interface screen for displaying and extracted sub-region and a user interface screen for displaying image compositing progress, according to an example embodiment of the present disclosure.

DETAILED DESCRIPTION

Figure 1:
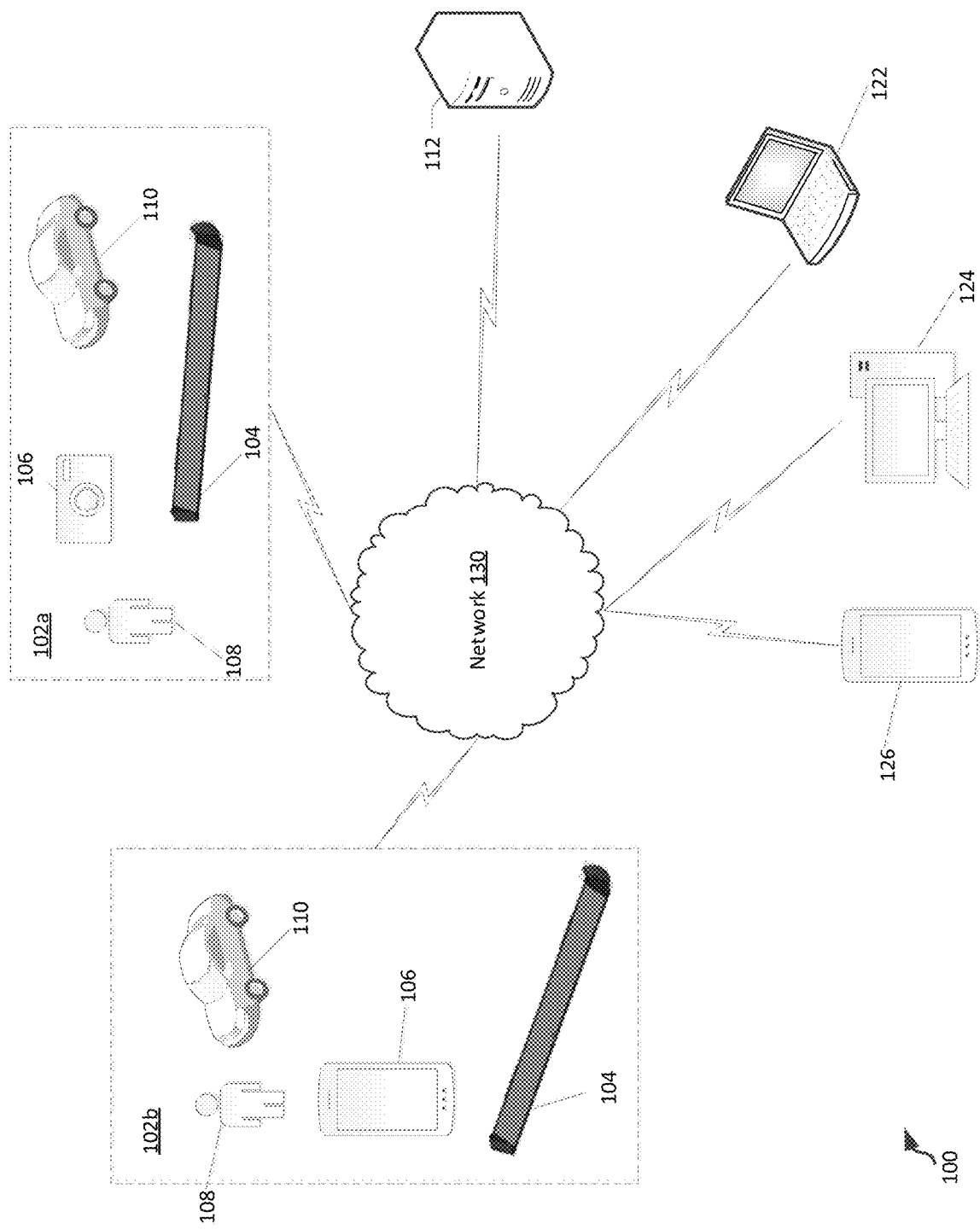
FIG. 1 is a schematic diagram illustrating a vehicle undercarriage data capture and diagnostics system, in accordance with some embodiments of the present disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure relates generally to an imaging system useable to capture an image of a vehicle undercarriage. Such an imaging system provides for ease of use in a field environment to obtain high-quality images that can be used to assess the condition of a vehicle. A portable system and method for capturing an image of the undercarriage of a vehicle without the need to lift the vehicle, or otherwise separate the vehicle from the ground, is disclosed. Many aspects of vehicle health can be determined from the visual appearance of a vehicle's undercarriage. Video and image data of a vehicle's undercarriage can serve as a unique signature of the relative health of a particular vehicle's frame and components, especially as profiled over time for degradation due to rust and wear and tear.

Vehicle condition data, for example data included in vehicle condition reports in the wholesale or retail automobile market, may be improved by including vehicle undercarriage data. In some embodiments of this disclosure, the vehicle undercarriage data may be in the form of an electronic image file which the consumer of the vehicle condition report, for example a wholesale dealer, may view on an electronic device configured to display the electronic image file. In other embodiments, certain visual features correlated with vehicle undercarriage condition may be automatically determined from the image of a vehicle's undercarriage. In still further embodiments, vehicle undercarriage conditions determined automatically from vehicle undercarriage data may be combined with related repair costs and arbitration costs to determine the cost to repair or arbitrate the vehicle, adjust the value of the vehicle, or to assign market value to the vehicle relative to vehicles of similar type, e.g. make, model, year, engine configuration, options, etc.

FIG. 1 is a schematic diagram illustrating a vehicle undercarriage data capture and diagnostics system 100, in accordance with some embodiments of the present disclosure. In the illustrated example, the system 100 includes locations 102*a* and 102*b*, server 112, data consumer devices 122, 124, and 126, and network 130. Also shown in FIG. 1 are a mirror assembly 104, a camera 106, a user 108, and a vehicle 110.

In the example shown, locations 102*a-b* may be remote from each other, or may be proximate to each other, for example, all contained within a particular parking lot. Each of locations 102*a-b* include the mirror assembly 104, the camera 106, the user 108, and the vehicle 110. In some embodiments, the camera 106 and user 108 may be the same in all locations 102*a-b*, for example, the same user 108 with the same camera 106 may walk to locations 102*a-b* within the same parking lot. In other embodiments, the user 108 and camera 106 may be different in each of locations 102a-b, for example, locations 102a-b may be in different states, or even different countries. Similarly, in some embodiments the vehicle 110 may be the same in all three of the locations 102a-b, for example for multiple video captures of the same vehicle. In some embodiments, the vehicle 110 may be different in each of locations 102a-b. It is noted that the example shows two locations, however, other numbers of locations are within the scope of this disclosure, for example, one, three, four, or more locations.

In the example shown, the locations 102a-b are separated from the server 112 and data consumer devices 122, 124, and 126 by a network 130. Network 130 can, in some cases, represent an at least partially public network such as the Internet. Data consumer devices 122, 124, and 126 include computing devices which are configured to download or access processed vehicle undercarriage data provided by server 112. In some embodiments, data consumer devices 122, 124, and 126 may download or access vehicle condition reports that include processed vehicle undercarriage data. In some embodiments, the processed vehicle undercarriage data within vehicle condition reports downloaded or accessed by data consumer devices 122, 124, and 126 may be an image composite of the vehicle undercarriage data. In some other embodiments, the processed vehicle undercarriage data within vehicle condition reports downloaded or accessed by data consumer devices 122, 124, and 126 may be an image or video file, or a link to an image or video file for display on data consumer devices 122, 124, and 126.

In the example shown, the server 112 can represent a vehicle undercarriage data processing server, as well as one or more additional servers. For example, the server 112 can also represent a condition report server that requests and receives vehicle undercarriage data from a vehicle undercarriage data processing server via an API exposed by the vehicle undercarriage data processing server. In some embodiments, vehicle undercarriage data processing and condition reports may be provided by the same server 112 device.

In some embodiments, the mirror assembly 104 can be a portable assembly of a size capable of being positioned under a vehicle without contacting the vehicle undercarriage or wheels.

In some embodiments, the camera 106 can be a digital camera capable of capturing digital image data, or video data, that is transferable to a computing device. In other embodiments, the camera 106 can be included in a mobile computing device including a processor and a memory storing instructions, such as a smartphone, a laptop, a tablet, or the like. In some embodiments, the camera 106, or the mobile device into which the camera 106 is integrated, can include application software configured to capture and store electronic image or video files. In other embodiments, the mobile device into which the camera 106 is integrated can include application software configured to capture data entered by the user 108 and to process captured electronic image or video files for reconstruction and diagnostic evaluation.

Figure 2:
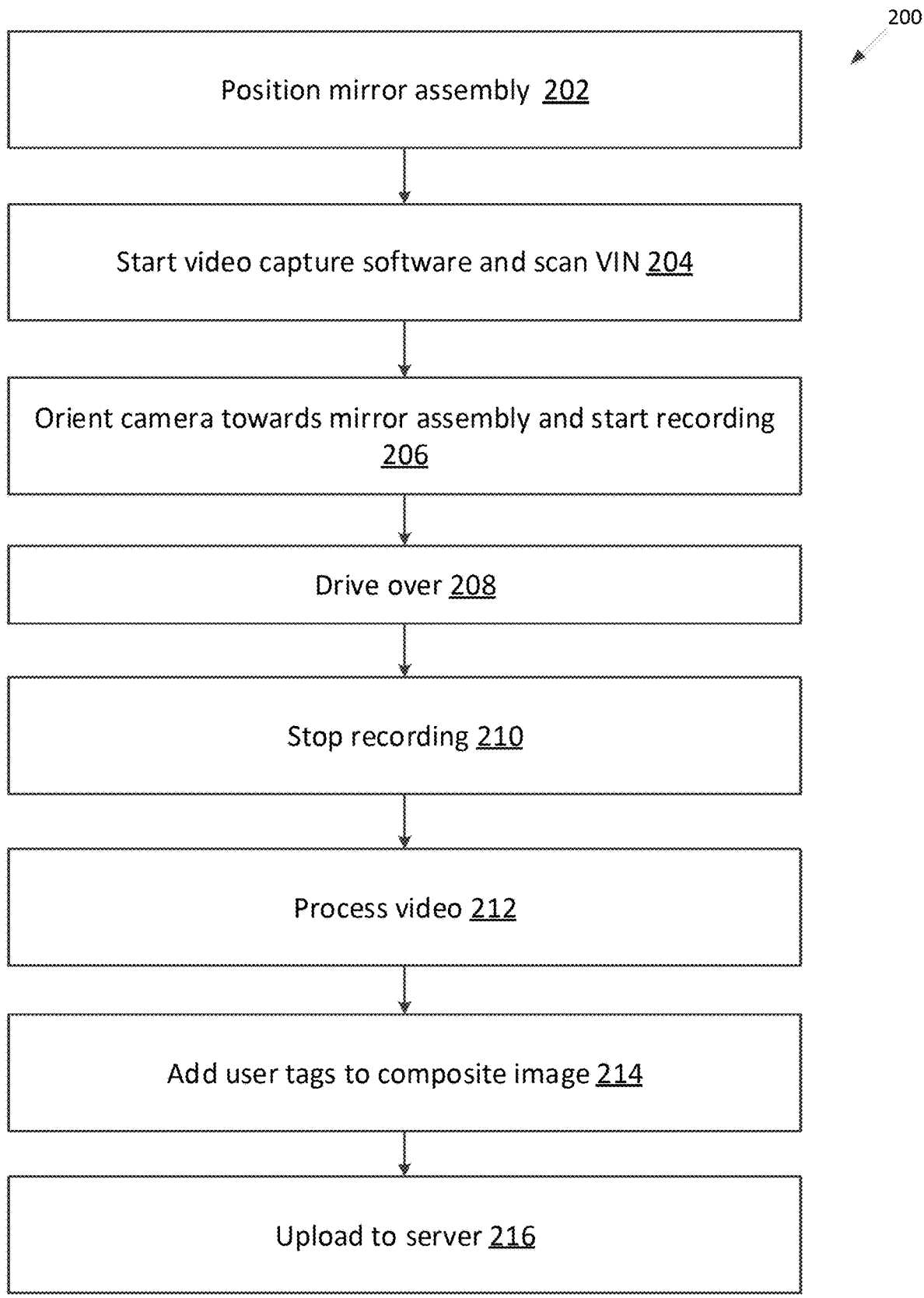
FIG. 2 is a flow chart illustrating an example method of capturing vehicle undercarriage data, in accordance with some embodiments of the present disclosure.

FIG. 2 is a flow chart illustrating an example method 200 of capturing vehicle undercarriage data, in accordance with some embodiments of the present disclosure. The method 200 can be performed, for example, at a location 102.

In the example of method 200 shown, the mirror assembly 104 is positioned for capturing vehicle undercarriage data at step 202. In an example embodiment, a user positions the mirror assembly in an image capture position, e.g., by placing the mirror assembly on a generally level surface that a vehicle may also drive over. In some embodiments, step 202 includes leveling the mirror assembly 104.

The vehicle undercarriage video capture application software is initiated on the camera 106, and the vehicle identification number (VIN) of the vehicle is scanned, at step 204. The camera 106 is oriented towards the mirror assembly 104 and video capture is initiated by the user 108 at step 206. In some embodiments, video capture can be initiated by a user 108 selecting an option within the vehicle undercarriage data capture application software to start recording video. In some embodiments, the camera 106 is placed in a camera mount attached to the mirror assembly 104 at a predetermined horizontal distance. In other embodiments, the camera 106 is placed in a camera mount located at a predetermined horizontal distance from the mirror assembly 104 and centrally located along the width of the mirror assembly 104, the mirror assembly being within the field of view of the camera 106. In still other embodiments, the camera 106 is not placed in a mount at all, and is placed at a predetermined horizontal distance from the mirror assembly 104 and centrally located along the width of the mirror assembly 104, the mirror assembly being within the field of view of the camera 106. In preferred embodiments, the camera 106 is placed such that the mirror assembly is centered in the field of view of the camera 106 and at a distance sufficient to capture the entire width of the vehicle reflected from a mirror surface within the mirror assembly 104 with sufficient image magnification, e.g. image resolution or sampling, and such that the camera 106 is capable of capturing an image of a portion of the undercarriage of the vehicle that is in focus.

The vehicle 110 is driven over the mirror assembly 104 and the camera 106 while vehicle undercarriage data is being captured at step 208. In preferred embodiments, the video capture rate is large enough that the vehicle can be driven at a reasonable speed, e.g. 100 miles per hour (mph) or slower, and more preferably between 2 mph and 10 mph.

In the example of the method 200 shown, the video capture is ended at step 210. In some embodiments, video capture can be ended by a user 108 selecting an option within the vehicle undercarriage data capture application software to stop recording video.

Also in the example shown, the captured video is processed and a composite image of the full area of the vehicle undercarriage is produced at step 212. The video processing can be performed by a mobile device, or can be performed by any computing device after the captured video data is made available to the computing device.

In the example shown, tags are added to the composite vehicle undercarriage image at step 214. In an example embodiment, the tags are selected by the user 108 using the vehicle undercarriage data capture application software. The tags can correspond to conditions, such as the weather, when the vehicle undercarriage data was captured, as well as the user's 108 subjective judgment of the vehicle undercarriage, including irregularities associated with the vehicle undercarriage, during vehicle undercarriage data capture. Such tags can include dents or scratches, rust or corrosion, aftermarket modifications such as lift kits or replacement parts, dirt and debris and corrosion indicative of flood damage, frame damage, frame repairs, missing components such as removal of heat shields or the catalytic converter, exhaust system defects such as holes in the exhaust pipe or muffler caused by corrosion, rust, or physical damage, or the presence of non-standard components such as items attached to the vehicle undercarriage. Tags can also include comments entered by the user 108. In some embodiments, tags can be assigned to the entire composite image or to portions of the composite image. In some embodiments, tags can also include conditions present during vehicle undercarriage data capture such as wet weather, exhaust smoke from the vehicle, abnormal exhaust color from the vehicle, e.g. blue-gray, white-gray, black, etc. Tags can also include difficult start, such as when engine start takes longer than usual or multiple attempts were made. Tags can also include the make, model, year, and trim of the vehicle, and vehicle options, e.g. a larger engine with dual exhaust. Tags can also include selected areas of interest within the composite vehicle undercarriage image. For example, areas that indicate vehicle undercarriage defects such as rust, holes, dents, scratches, etc., can be selected.

The vehicle undercarriage composite image and user tags are uploaded to the server 112 at step 216. As noted below in connection with FIGS. 37-38, various additional processing steps may be performed on the image and tag data, as well as any other data uploaded to or available at the server that is descriptive of the vehicle associated with the image.

Figure 3:
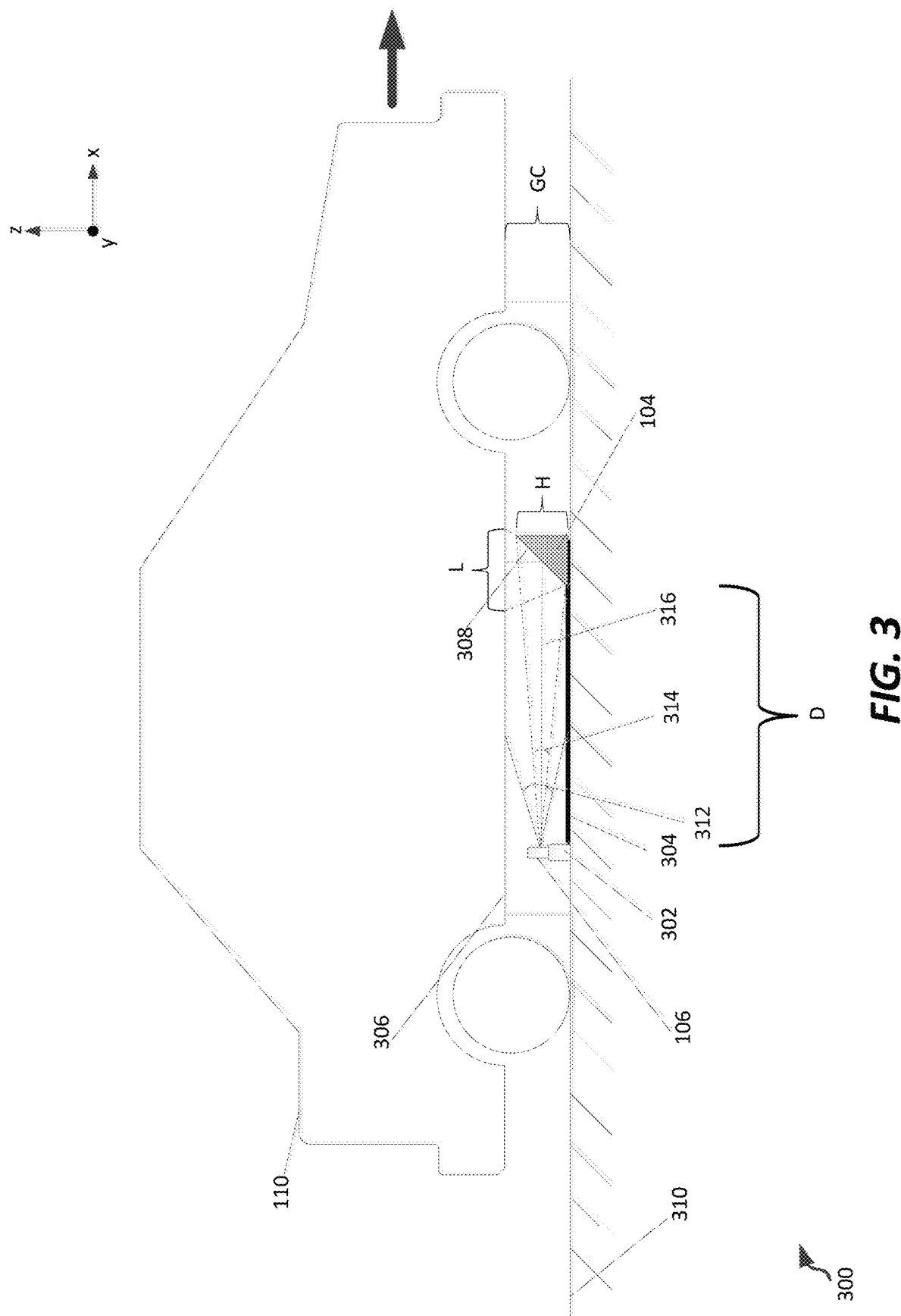
FIG. 3 is a schematic diagram illustrating a side-view of a vehicle undercarriage imaging system, in accordance with some embodiments of the present disclosure.
Figure 4:
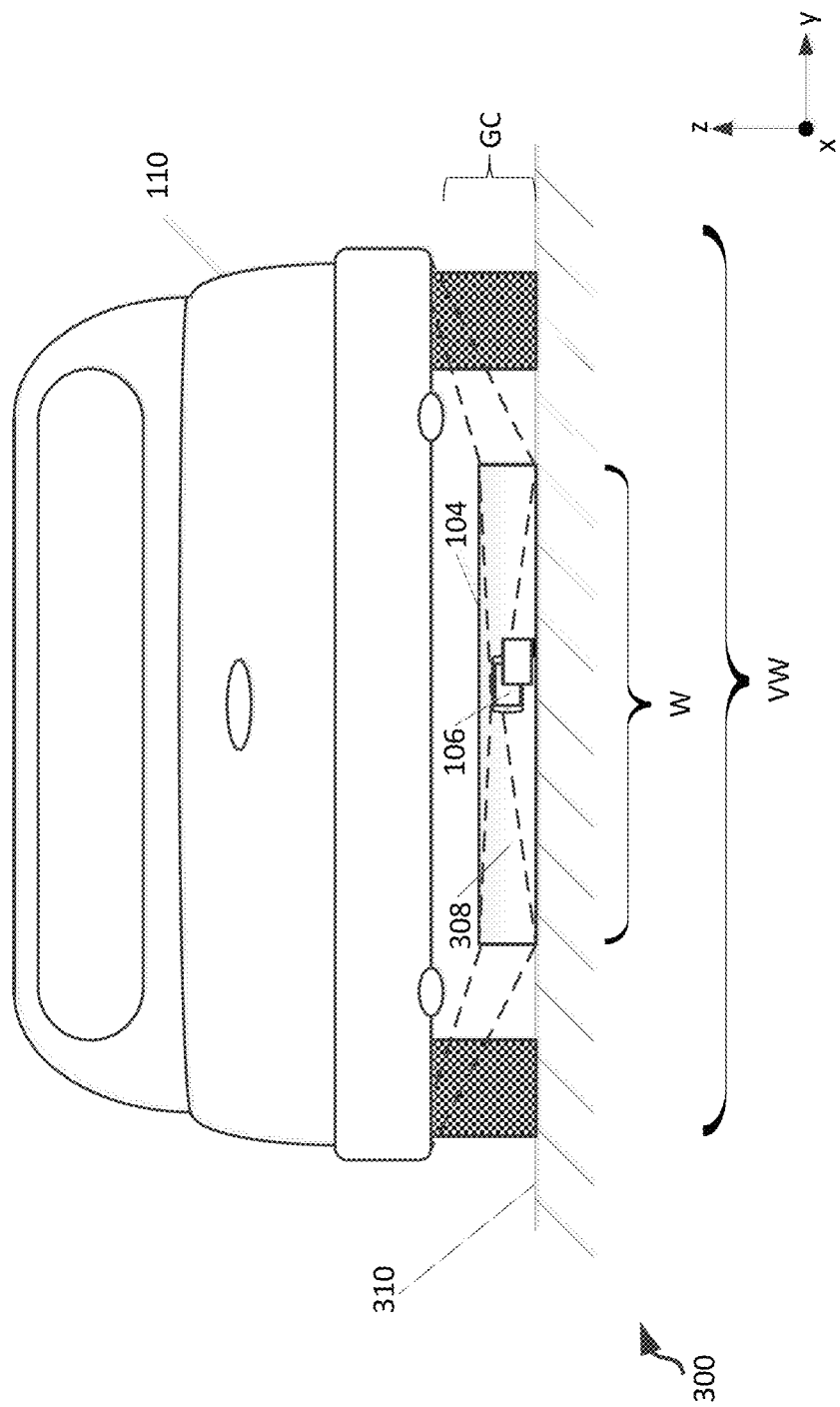
FIG. 4 is a schematic diagram illustrating a rear-view of a vehicle undercarriage imaging system, in accordance with some embodiments of the present disclosure.
Figure 5:
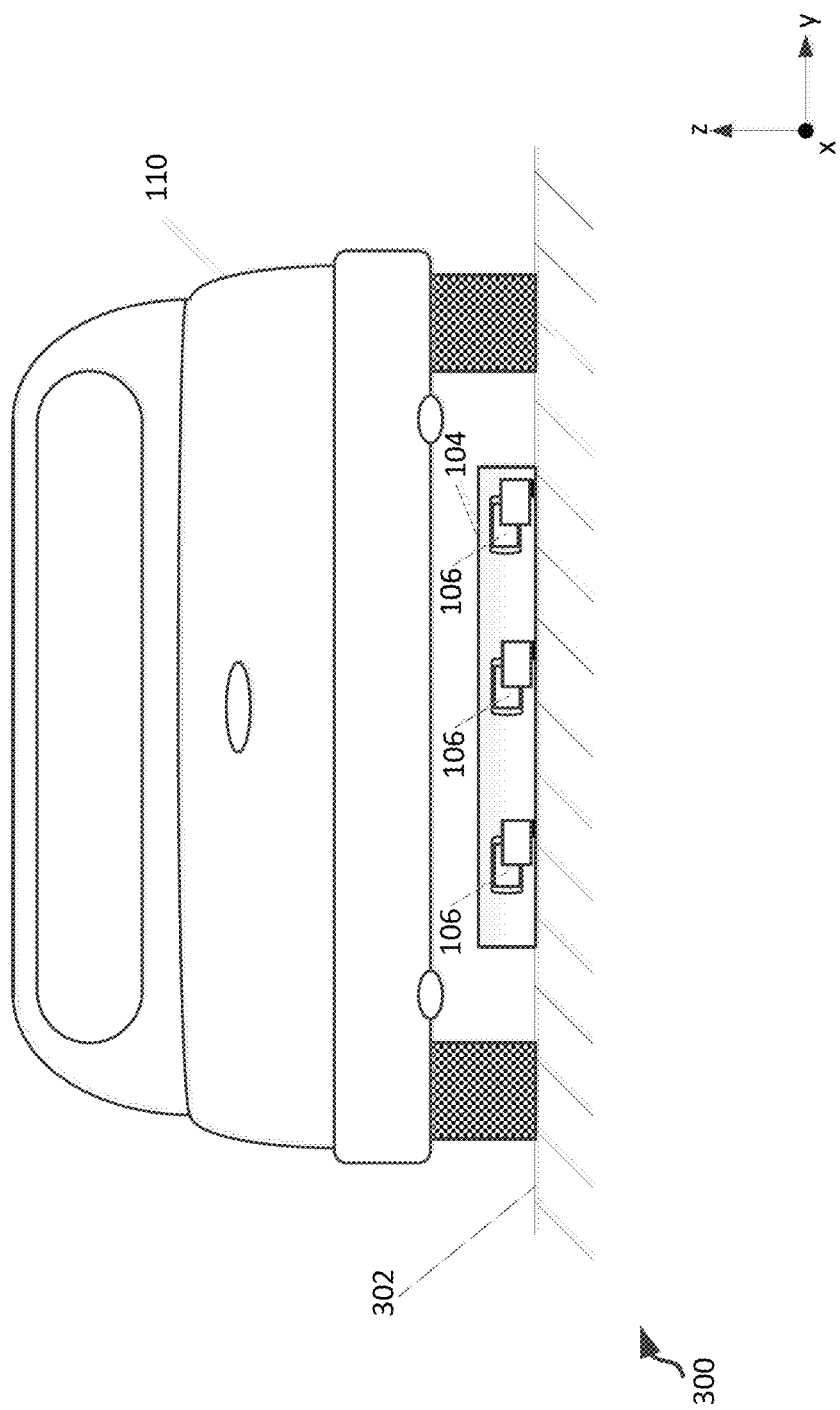
FIG. 5 is a schematic diagram illustrating a rear-view of a vehicle undercarriage imaging system, in accordance with some embodiments of the present disclosure.

FIGS. 3-5 are schematic diagrams illustrating different views of a vehicle undercarriage imaging system 300, in accordance with some embodiments of the present disclosure. In some embodiments, the vehicle undercarriage imaging system 300 captures video data used to reconstruct an image of a vehicle undercarriage at a location 102.

FIG. 3 is a schematic diagram illustrating a side-view of a vehicle undercarriage imaging system 300, in accordance with some embodiments of the present disclosure. In the example shown in FIG. 3, the vehicle undercarriage imaging system 300 includes a mirror assembly 104, and a camera 106. The example shown also illustrates a camera mount 302, a spacer 304, a vehicle 110, a vehicle undercarriage 306, a mirror surface 308, and a surface 310. The example shown in FIG. 3 further illustrates a camera field of view 312 and a field of view 314 subtended by the mirror surface 308. The example shown in FIG. 3 also illustrates a ground clearance GC, a predetermined horizontal distance D between the mirror assembly 104 and the camera 106, a mirror assembly height H, an undercarriage portion length L. The FIG. 3 further illustrates the vehicle 110 traveling along the surface 310 in the depth direction, or equivalently the length direction, e.g. in the x direction as shown by the reference (x, y, z) axes in the example.

In the embodiment shown, the height H of the mirror assembly 104 and the height of the camera 106 being held in the camera mount 302 are both less than the ground clearance GC of the vehicle 110. This enables the system 300 to be driven over by the vehicle 110. In the embodiment shown, the camera 106 is spaced from the mirror assembly 104 by the predetermined horizontal distance D and or oriented towards the mirror assembly 104 as well as the mirror surface 308, and is positioned at a location that is central in the width direction y along the mirror surface 308. The mirror assembly 104 or oriented with its width along the width direction y and normal to the depth direction x, and is positioned at a location that is central in a width direction along the vehicle undercarriage 306.

In some embodiments, the camera mount 302 can be spaced from the mirror assembly 104 at the predetermined horizontal distance D by the spacer 304. The camera mount 302 can be configured to hold the camera 106 at a location that is spaced from the mirror assembly 104 by a predetermined horizontal distance D, central in the width direction y along the mirror surface 308, and oriented towards the mirror surface 308 such that the mirror surface 308 is within the field of view 312 of the camera 106.

In some embodiments, the spacer 304 can be attached to the camera mount 302 at one end and the mirror assembly 104 at the other end. In other embodiments, the spacer 304 can be an extension arm extendable from the mirror assembly 104 in the depth direction x and have a length such that it can space the camera mount 302 from the mirror assembly 104 by the predetermined distance D.

In some embodiments, the mirror surface 308 has a width along the width direction y, and a height that is tilted back, or angled, in the depth direction x such that a reflected field of view 314 that is viewable in the mirror surface 308 at the camera 106 is above the mirror assembly 104 in the height direction z. In other words, the mirror surface 308 is angled relative to the orientation of the camera 106 to reflect a worm's eye view of the vehicle undercarriage to the camera. In some embodiments, field of view 314 corresponds to an image capture location at which a vehicle undercarriage passes.

In some embodiments, the camera field of view 312 includes a view of the vehicle undercarriage 306, the mirror surface 308, and the surface 310 in the height direction z. In some embodiments, the camera field of view 312 includes a view of the width W (further described in connection with FIG. 4 below) of the mirror surface 308 in the width direction y. The height and width of the area captured by the camera 106 in an image corresponds to the camera field of view 312. In some embodiments, an image captured by the camera 106 having the field of view 312 will include a portion of the vehicle undercarriage 306 viewed at an angle, a portion of the vehicle undercarriage 306 reflected by the mirror surface 308 and viewed normal to the plane of the vehicle undercarriage 306 from a worm's eye view, and a portion of the surface 310.

In some embodiments, the field of view 314 includes a view of the mirror assembly height H in the height direction z and a view of the mirror surface width W in the width direction w. In some embodiments, the field of view 314 subtended by the mirror surface 308 is less than the camera field of view 312 and an image captured by the camera 106 can include the portion of the vehicle undercarriage 306 reflected by the mirror surface 308 corresponding to the field of view 314 and viewed normal to the plane of the vehicle undercarriage 306 from a worm's eye view.

In the example shown, by capturing image or video data of the mirror surface 308, including a portion of the vehicle undercarriage 306 reflected by the mirror surface 308, the depth of focus is two-dimensional, as opposed to including three-dimensional depth of focus data for embodiments that utilized multiple cameras directly viewing and capturing image or video of the vehicle undercarriage 306. This has the advantage of simplifying image reconstruction, for example, reconstruction a vehicle undercarriage composite image from video captured of the vehicle undercarriage 306 as discussed below with respect to FIGS. 22-38.

FIG. 4 is a schematic diagram illustrating a rear-view of a vehicle undercarriage imaging system 300, in accordance with some embodiments of the present disclosure. In the example shown in FIG. 4, the vehicle undercarriage imaging system 300 includes a mirror assembly 104, and a camera 106. The example shown also illustrates a width W of the mirror surface 308 and a wheel width WW of the vehicle 110.

In the embodiment shown in FIG. 4, the dashed lines represent the extreme angles of the field of view 314 subtended by the mirror surface 308, and illustrate that the field of view 314 in the width direction y can include the vehicle width VW of the vehicle 110 at the ground clearance GC height, e.g. the plane of the vehicle undercarriage 306. In other words, when the camera 106 is placed at a depth D from the mirror assembly 104 and located centrally along the width of the mirror assembly 104, the camera's view of the portion of the vehicle undercarriage 306 reflected in the mirror surface 308 can extend beyond the width W of the mirror surface 308 to include the vehicle width VW. In the embodiment shown, the vehicle undercarriage imaging system 300 is configured to capture an image including a portion of the vehicle undercarriage 306 that includes the vehicle width VW, e.g. the full width of the vehicle undercarriage 306, and a portion of the length of the vehicle undercarriage L while having a height H that is less than the ground clearance GC of the vehicle and a width W that is less than the wheel width of the vehicle, allowing the system 300 to be driven over by the vehicle. In some embodiments, the vehicle undercarriage imaging system 300 can capture a series of images, or video, of portions of the vehicle undercarriage as the vehicle 110 is driving over the system 300, thereby acquiring vehicle undercarriage data sufficient to reconstruct a composite image of the entire vehicle undercarriage 306 by acquiring full vehicle width VW images at a plurality of locations along the full length of the vehicle undercarriage 306. In some embodiments, the vehicle undercarriage imaging system 300 is able to capture vehicle undercarriage data sufficient to reconstruct a composite image of the entire vehicle undercarriage 306 without the use of a specialty wide field of view lens, such as a fisheye lens, or the need to separate the vehicle 110 from the surface 310. Specialty lenses, such as a fisheye lens, can have the disadvantage of adding distortion to an image captured by the camera 106.

In some embodiments, the mirror surface 308 subtends less than the full field of view 312 of the camera 106 and images captured by the camera include the portion of the vehicle undercarriage 306 reflected to the camera 106 by the mirror surface 308. As such, the images captured by the camera 106 can include the portion of the vehicle undercarriage 306 as a sub-region within the image captured. The sub-region contains the vehicle undercarriage image data, and is a region of interest within the image captured using the vehicle undercarriage imaging system 300.

FIG. 5 is a schematic diagram illustrating a rear-view of a vehicle undercarriage imaging system 300, in accordance with some embodiments of the present disclosure. In the example shown in FIG. 5, the vehicle undercarriage imaging system 300 includes a mirror assembly 104, and a plurality of cameras 106.

In some embodiments, multiple cameras 106 can be used to capture vehicle undercarriage data. The use of multiple cameras allows for a higher resolution composite image to be formed, and for a reduction in the predetermined horizontal distance D by requiring each of the plurality of cameras 106 to only capture a portion of the width of the vehicle undercarriage 306 at different positions along the width of the vehicle undercarriage 306. However, use of multiple cameras may increase image processing complexity for forming a composite vehicle undercarriage image.

An example embodiment of an imaging assembly 400 will now be described with reference to FIGS. 6-14. In some embodiments, the imaging assembly 400 can be portable, and can be used in the vehicle undercarriage imaging system 300 for capturing vehicle undercarriage video sufficient to reconstruct a composite image of a vehicle undercarriage 306 at a location 102 without the need to lift, or otherwise separate, the vehicle 110 from the surface 310 on which the vehicle 110 resides.

Figure 6:
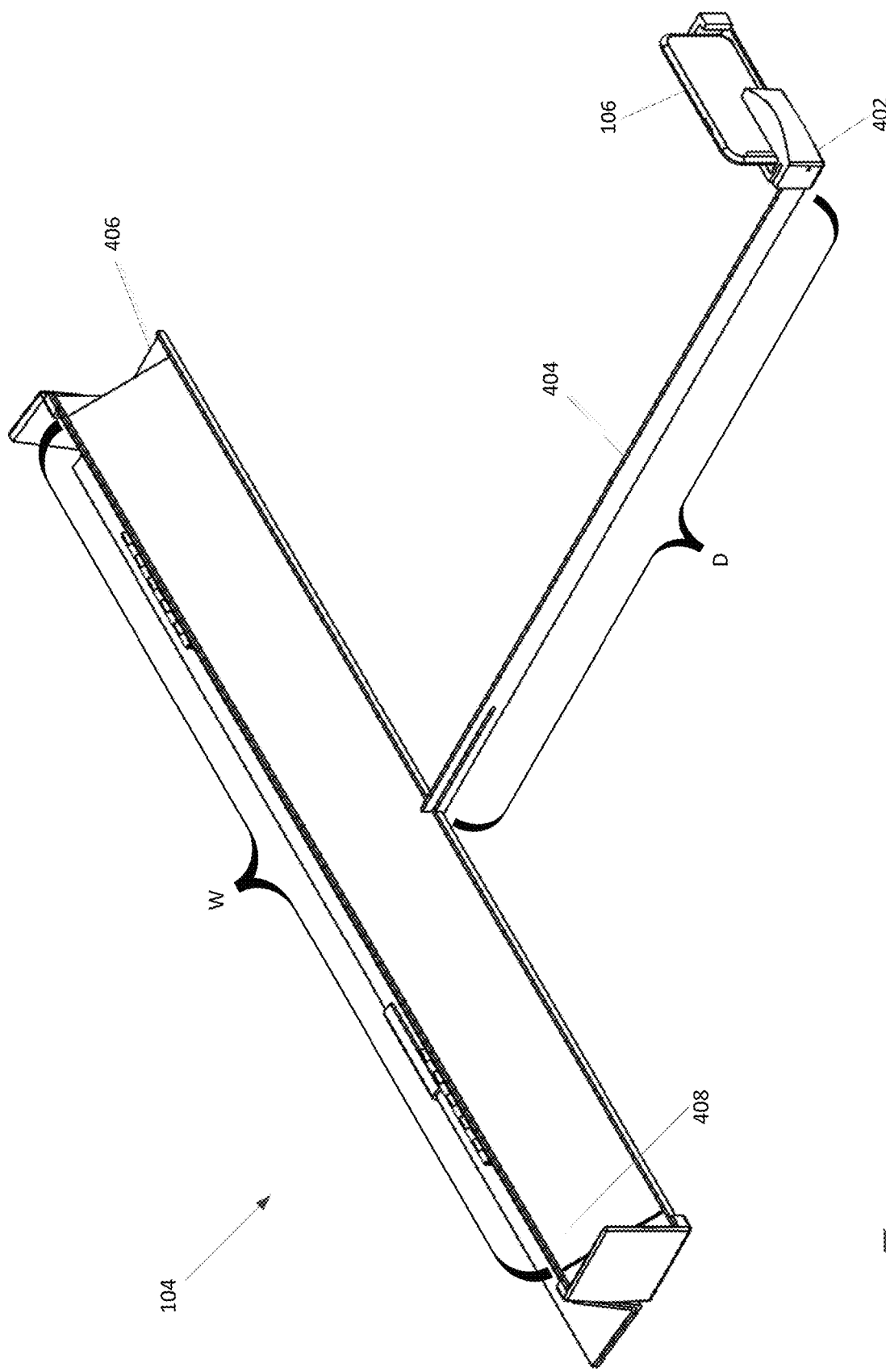
FIG. 6 is a perspective view of an imaging assembly, in accordance with some embodiments of the present disclosure.

FIG. 6 is a perspective view of an imaging assembly 400, in accordance with some embodiments of the present disclosure. In the example shown in FIG. 6, the imaging assembly 400 includes a mirror assembly 104, a camera mount 402, and an extension arm 404. In the example shown in FIG. 6, the mirror assembly 104 includes a base 406 and a mirror surface 408. The example shown in FIG. 6 also includes a camera 106.

In the example shown, the camera mount 402 is attached to an end of the extension arm 404 and can hold the camera 106 in a position oriented towards the mirror surface 408. In some embodiments, the extension arm 404 can hold the camera mount 402 at least partially positioned in horizontal alignment with the mirror assembly 104.

In the embodiment shown, the extension arm 404 is illustrated in an extended position. The extension arm 404 can position the camera mount 402 such that the camera 106 mounted in the camera mount 402 is a located centrally along the width W of the mirror surface 408 and separated from the mirror assembly 104 by a depth distance D in a direction perpendicular to the width of the mirror surface 408. The extension arm 404 can be made of metal, such as steel or aluminum, or any suitable material with sufficient strength and stiffness to support the camera mount 402 with the camera 106 mounted in the camera mount 402. In some embodiments, the extension arm 404 can be attachable to the mirror assembly 104 and can be extendable and retractable from the mirror assembly 104. In some embodiments, the extension arm 404 in the extended position is perpendicular to the width W of the mirror surface 408, and the extension arm 404 in the retracted position is parallel to the width W of the mirror surface 408, as illustrated below in FIGS. 9, 11 and 12.

In the example shown, the imaging assembly 400 can be placed on a surface, such as the ground, a road, a parking lot, the surface 310 on which a vehicle 110 resides. The mirror assembly 104 supports the mirror surface 408 at the correct angle such that the mirror surface 408 reflects a worm's eye view of the vehicle undercarriage to the camera 106 mounted in the camera mount 402. The mirror assembly can also support the extension arm 404 and camera mount 402, either of which can be placed on the surface 310 or be suspended above the surface 310 and supported by the mirror assembly 104.

Figure 7:
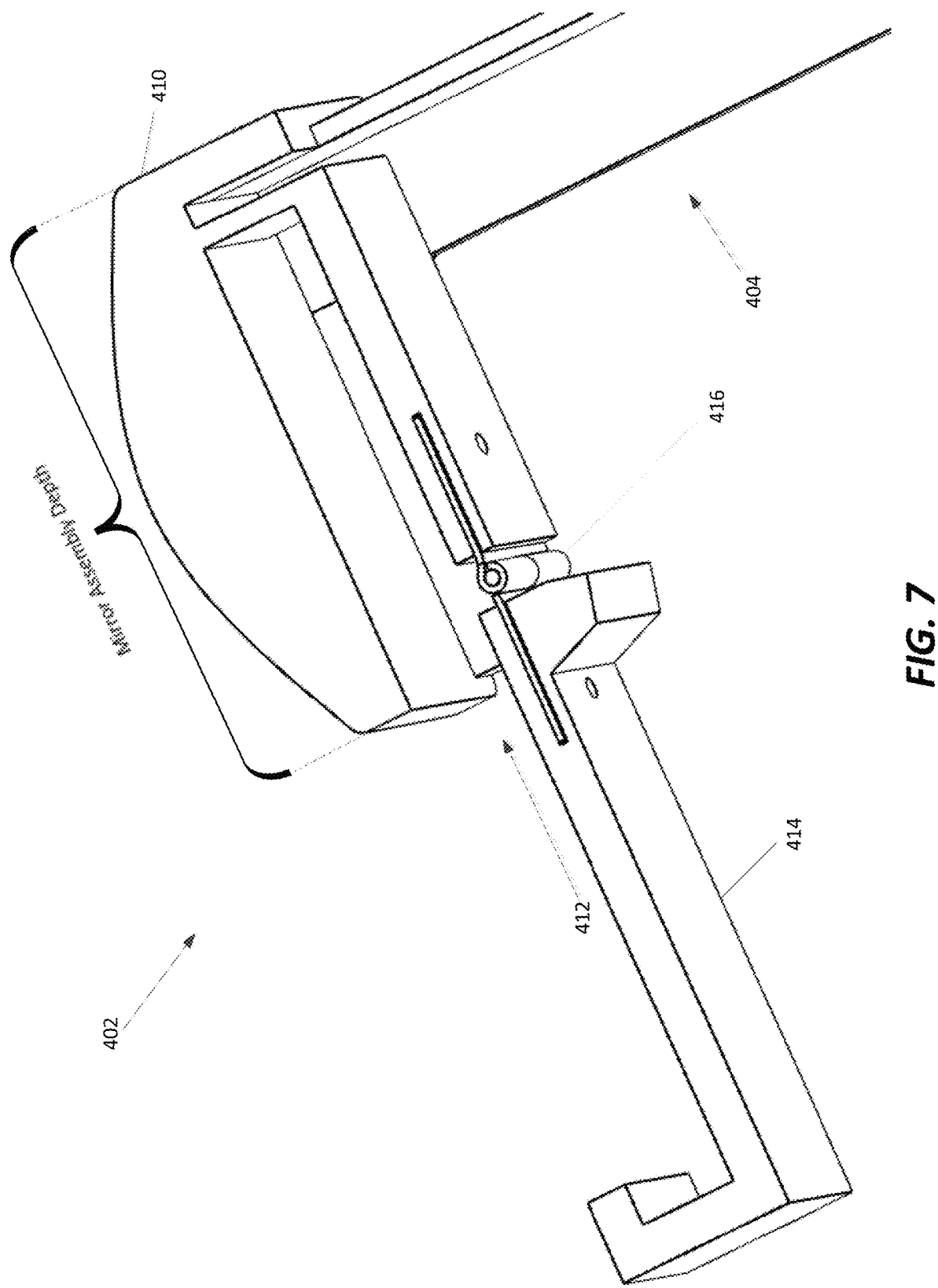
FIG. 7 is a perspective view of the camera mount, in accordance with some embodiments of the present disclosure.

FIG. 7 is a perspective view of the camera mount 402, in accordance with some embodiments of the present disclosure. In the example shown in FIG. 7, the camera mount 402 includes a camera mount base 410, a camera mount slot 412, a camera mount arm 414, and a camera mount arm hinge 416.

In the embodiment shown, the camera mount base 410 is attached to the extension arm 404 and includes the camera mount slot 412. The camera mount slot 412 is sized to receive the camera 106. In the embodiment shown, the camera mount arm 414 is movably attached to the camera mount base 410 by the camera mount arm hinge 416. In some embodiments, the camera 106 is longer than the camera mount slot 412 such that the camera 106 extends beyond the camera mount slot 412 in the width direction. In such embodiments, the camera mount arm 414 can be folded out to support the portion of the camera 106 that extends beyond the camera mount slot 412. In some embodiments the camera mount arm 414 has a J shape sized to receive the camera 106, the camera mount slot 412 has a U shape, and the camera 106 can be loosely placed into the camera mount slot 412 and the camera mount arm 414 such that the camera 106 is supported in the camera mount 402 and oriented towards the mirror surface 408. In other embodiments, the camera 106 can be press fit into the camera mount slot 412 and the camera mount arm 414 such that the camera 106 is supported in the camera mount 402 and oriented towards the mirror surface 408.

Figure 9:
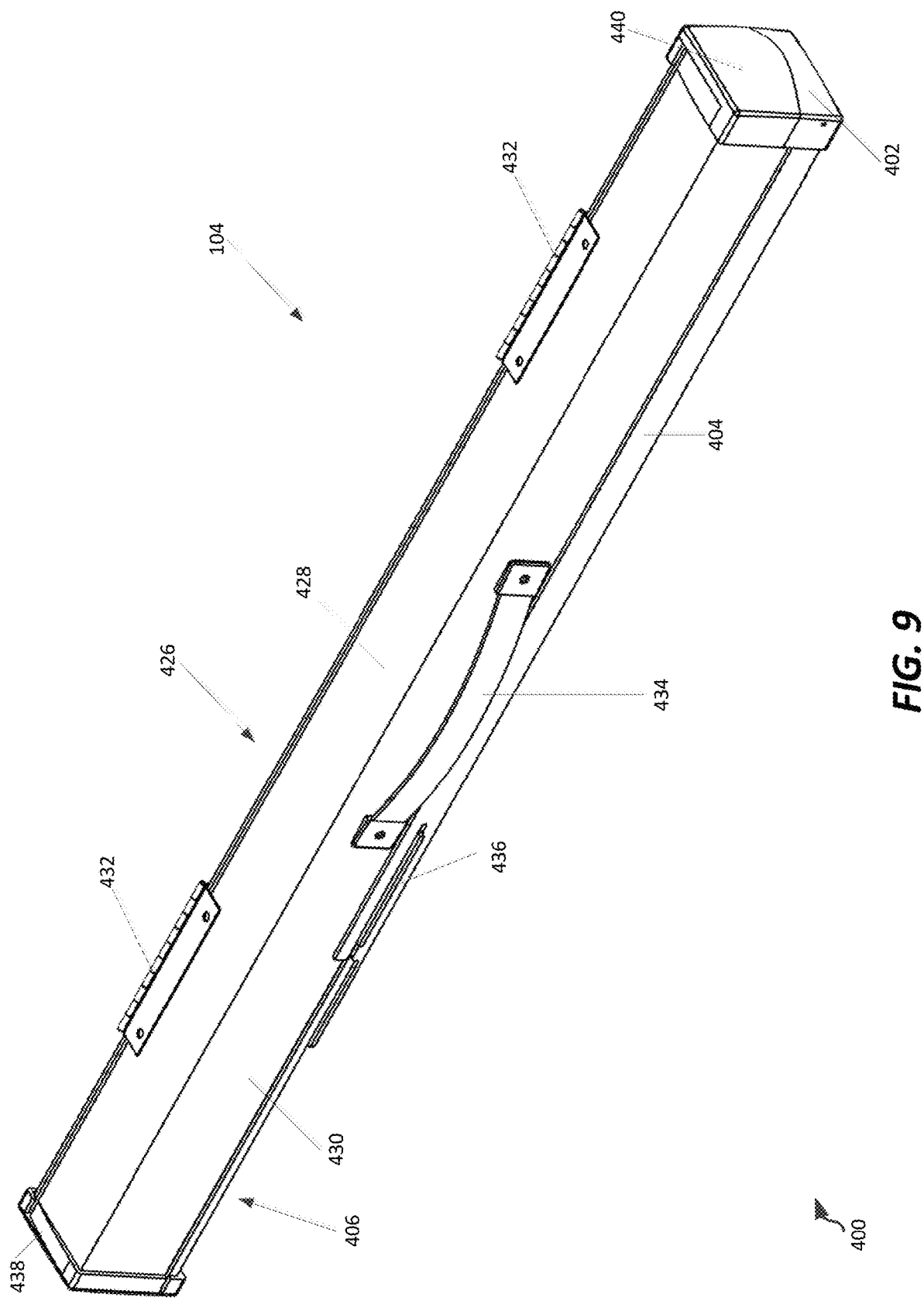
FIG. 9 is a perspective view of the imaging assembly, in accordance with some embodiments of the present disclosure.
Figure 10:
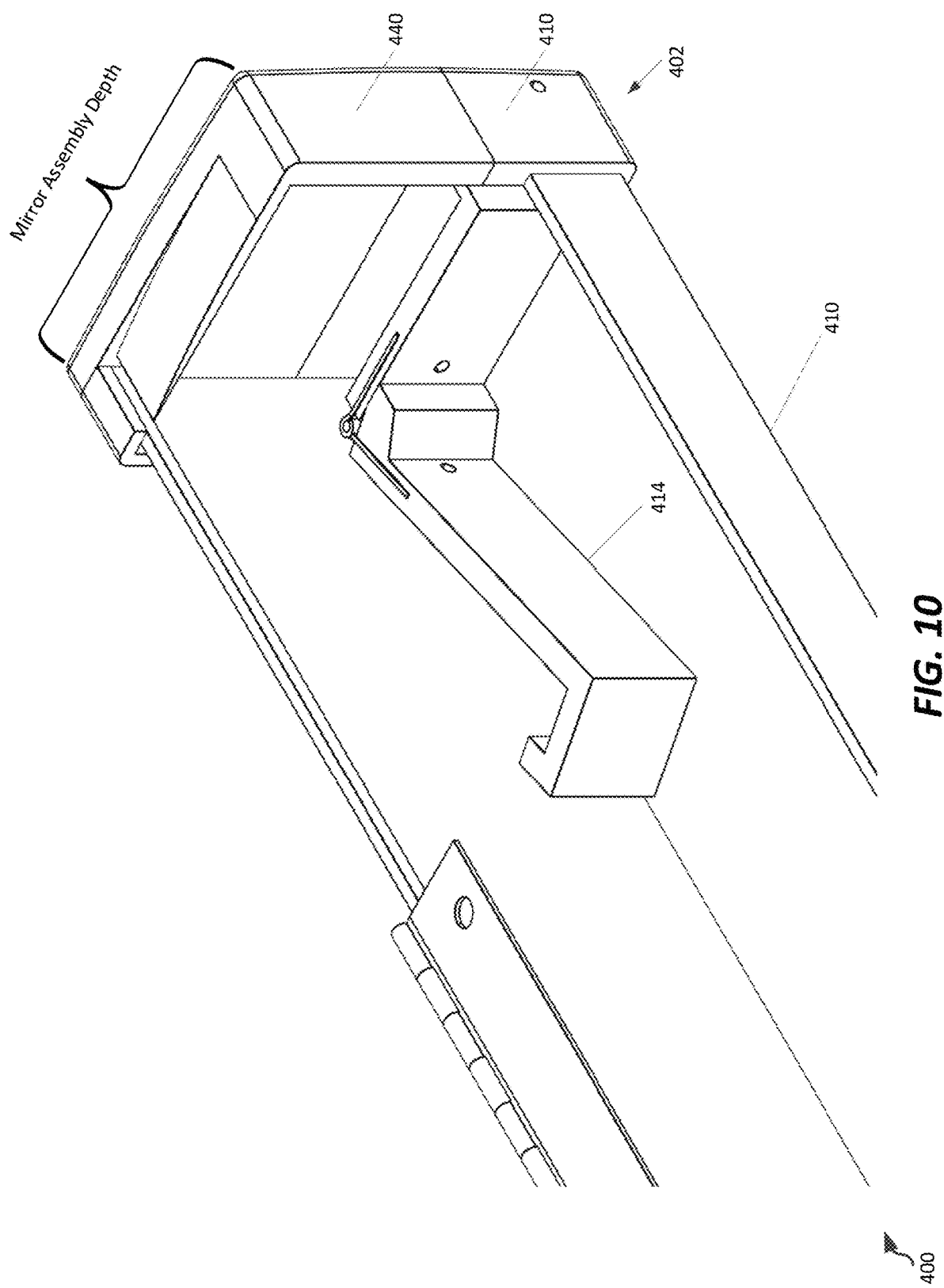
FIG. 10 is a perspective view of the imaging assembly, in accordance with some embodiments of the present disclosure.

In some embodiments, the camera mount 402 forms a portion of an endcap of the mirror assembly 104 when the extension arm 404 is in the retracted position, as illustrated in FIGS. 9 and 10, and further described below. In such cases, the camera mount arm 414 may be folded in towards the extension arm 404 via the camera mount arm hinge 416 such that the camera mount 402 does not extend beyond the mirror assembly depth when the extension arm 404 is in the retracted position.

The camera mount 402 can be made of plastic, molded plastic, rubber, metal, or any suitable material with sufficient strength and stiffness to support the camera 106 and orient the camera 106 towards the mirror surface 408.

Figure 8:
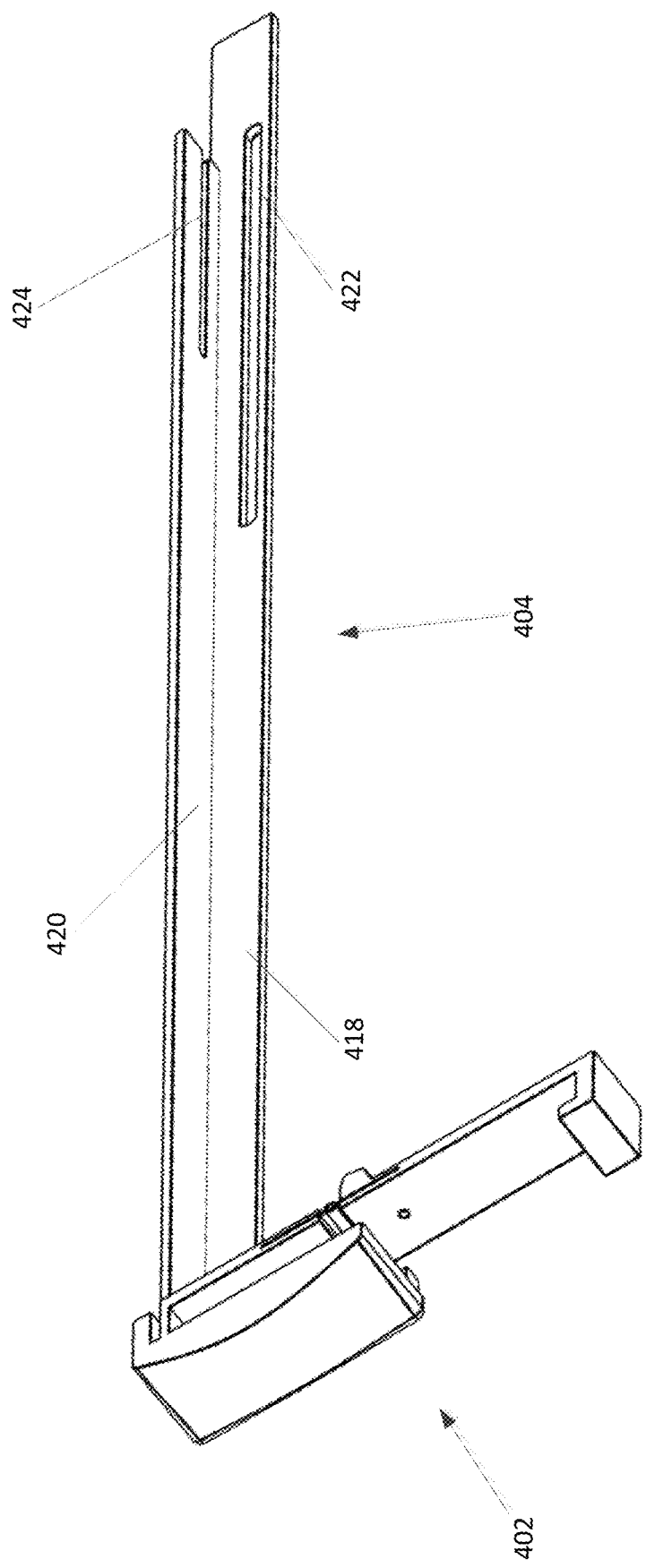
FIG. 8 is a perspective view of the extension arm, in accordance with some embodiments of the present disclosure.

FIG. 8 is a perspective view of the extension arm 404, in accordance with some embodiments of the present disclosure. In the example shown in FIG. 8, the camera mount 402 includes an extension arm base 418, an extension arm side 420, a rotation slot 422, and a lock slot 424.

In the embodiment shown, the extension arm base 418 and extension arm side 420 form an "L-shaped" cross-section. The extension arm base 418 includes the rotation slot 422, and the extension arm side includes the lock slot 424, both the rotation slot 422 and lock slot 424 being located towards the end of the extension arm 404 opposite the end to which the camera mount 402 is attached. In some embodiments, the rotation slot 422 allows the extension arm 404 to be rotatably extended and retracted, e.g. "folded out" and "folded in," from the mirror assembly 104, as illustrated and further described below in connections with FIGS. 12 and 13. In the embodiment shown, the extension arm side 420 length corresponds to the predetermined horizontal distance D, and the extension arm base 418 is longer than the extension arm side, providing stability to the extension arm 404 in the extended position. In some embodiments, the lock slot 424 forms part of a latch closing the mirror assembly 104, e.g. for transport, as illustrated and further described below in connection with FIG. 12.

The extension arm 404 can be made of plastic, molded plastic, metal, or any suitable material with sufficient strength and stiffness to support the camera mount 402 holding the camera 106 and orient the camera 106 towards the mirror surface 408.

FIG. 9 is a perspective view of the imaging assembly 400, in accordance with some embodiments of the present disclosure. In the example shown in FIG. 9, the mirror assembly 104 includes a base 406, a cover 426, a cover top 428, a cover front 430, hinges 432, a handle 434, a bracket 436, a left endcap 438, and a right endcap 440.

In the embodiment shown, the cover 426 includes a cover top 428 and a cover front 430 at right angles to each other, e.g. forming a "L-shaped" cross-section. The cover 426 can be opened and closed by swinging the cover 426 via the hinges 432. The cover 426 fits over the mirror surface 408 in the closed position and protects the mirror surface 408 from being contacted and from dust and debris.

In the embodiment shown in FIG. 9, the mirror assembly 104 is in the "closed" configuration with the cover 426 closed over the base 406 and mirror surface 408 and the extension arm 404 is retracted, or folded in. In the embodiment shown in FIG. 6 above, the mirror assembly 104 is in the "open" configuration with the cover 426 open, or folded back via the hinges 432 exposing the mirror surface 408 and the extension arm 404 extended, or folded out. Generally, the mirror assembly 104 can be lightweight and small enough in dimension to be easily carried, such as by the user 108, and transported in the closed configuration. The mirror assembly 104 can be opened, such as by user 108, and used in the open configuration during vehicle undercarriage image capture, such as described above with respect to the vehicle undercarriage imaging system 300.

In the example shown the left endcap 438 is attached to the base 406, and the right endcap 440 is attached to the cover 426. In some embodiments, the base 406 and cover 426 can form a rectangular "tube" cross-section when the cover 426 is closed. The left endcap 438 closes off the left opening of the "tube" formed by the base 406 and cover 426, and the right endcap 440 fits with the camera mount 402 to close off the right opening of the "tube" when the extension arm 404 is in the retracted position. The left endcap 438 and right endcap 440 protect the mirror surface 408 from being contacted from foreign objects entering the "tube" when the cover 426 is in the closed position.

FIG. 10 is a perspective view of the imaging assembly 400, in accordance with some embodiments of the present disclosure. In the example shown in FIG. 10 illustrates the mirror assembly 104 is in the closed position but with the cover 426 transparent to allow a view of the right endcap 440 and camera mount 402. In the embodiment shown, the camera mount 402 and right endcap 440 combine close off the right-side opening of the "tube" formed by the base 406 and cover 426. In the example shown, the camera mount base 410 has a width equal to the mirror assembly 104 depth, and the camera mount arm 414 is folded in, or swung in, towards the extension arm 404 to fit within the mirror assembly tube cavity such that the camera mount 402 does not extend beyond the depth of the mirror assembly 104.

Figure 11:
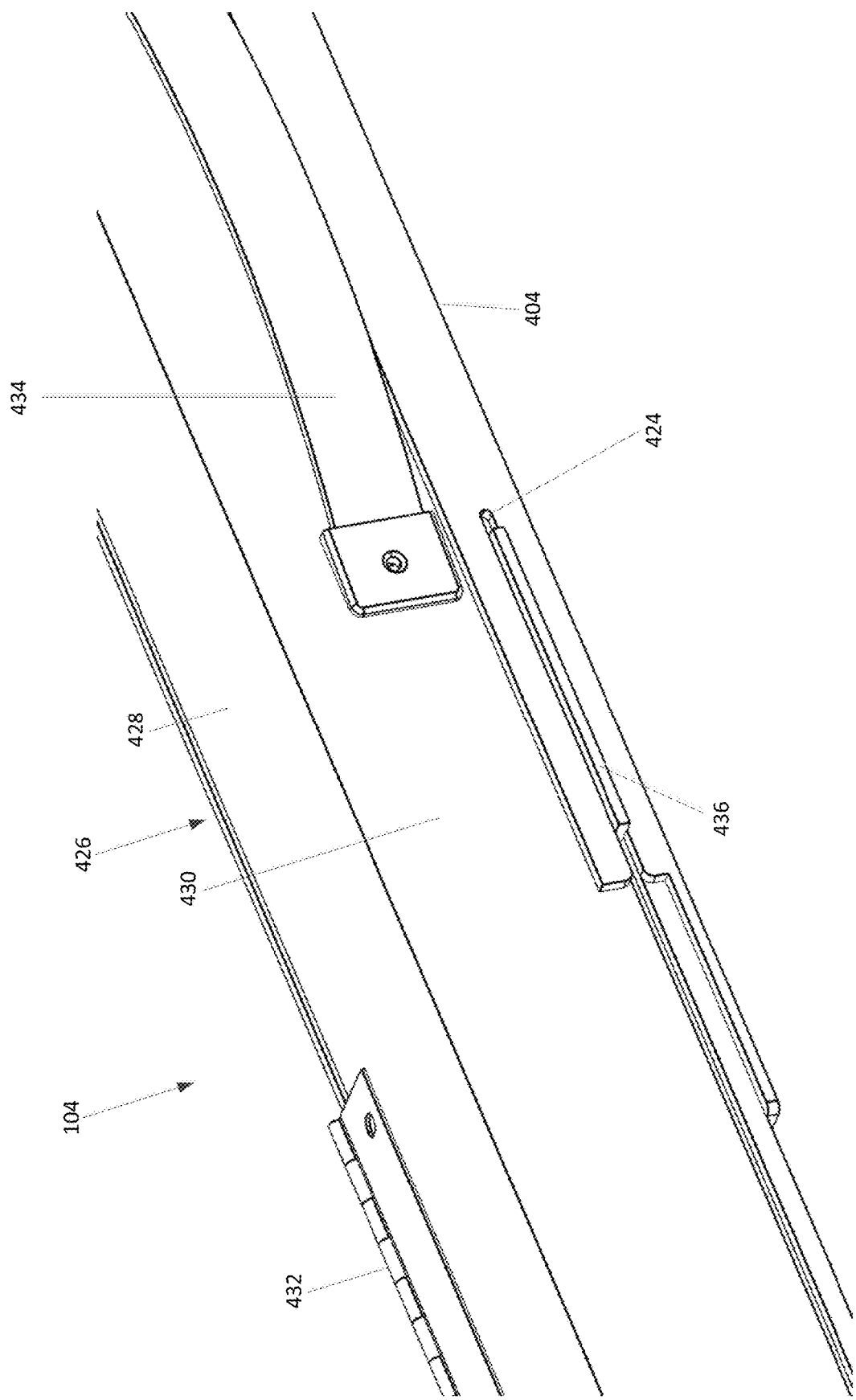
FIG. 11 is a perspective view of the mirror assembly, in accordance with some embodiments of the present disclosure.

In some embodiments, the bracket 436 and extension arm 404 fit together via the lock slot 424 when the extension arm 404 is in the retracted position and the cover 426 is closed, as illustrated in FIG. 11. FIG. 11 is a perspective view of the mirror assembly 104, in accordance with some embodiments of the present disclosure. In the embodiment shown, the bracket 436 is attached to the cover front 430 and is sized to be received by the lock slot 424. In the embodiment shown, when the mirror assembly 104 is in the closed configuration with the cover 426 closed and the extension arm 404 in the retracted position, the bracket 436 is received in the lock slot 424 and prevents the cover 426 from opening. In other words, in the embodiment shown, the bracket 436 and lock slot 424 form a latch and can latch the cover 426 closed. As such, the user 108 can lift and carry the imaging assembly 400 by the handle 434 conveniently and without the cover 426 inadvertently coming open.

Figure 12:
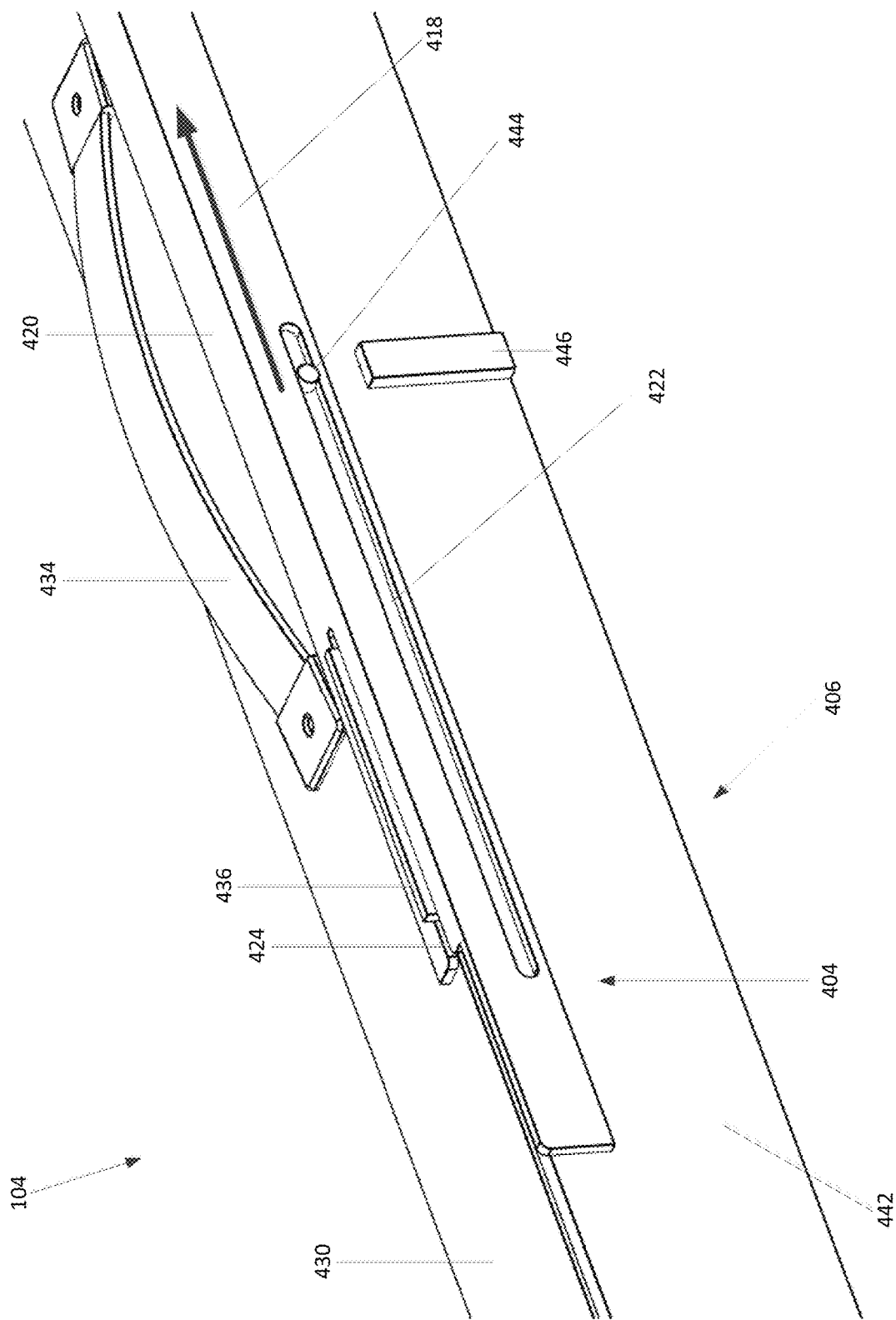
FIG. 12 is a perspective view of the mirror assembly and extension arm, in accordance with some embodiments of the present disclosure.

In some embodiments, the mirror assembly 104 can be opened by sliding and rotating the extension arm 404 from the retracted, or folded in, position to the extended position and opening the cover 426, and closed by closing the cover 426 and rotating and sliding the extension arm 404 from the extended position to the retracted position. FIG. 12 is a perspective view of the mirror assembly 104 and extension arm 404, in accordance with some embodiments of the present disclosure. In the embodiment shown, the mirror assembly 104 includes a base bottom outside surface 442, a rotation pin 444 and a stop bar 446.

Figure 13:
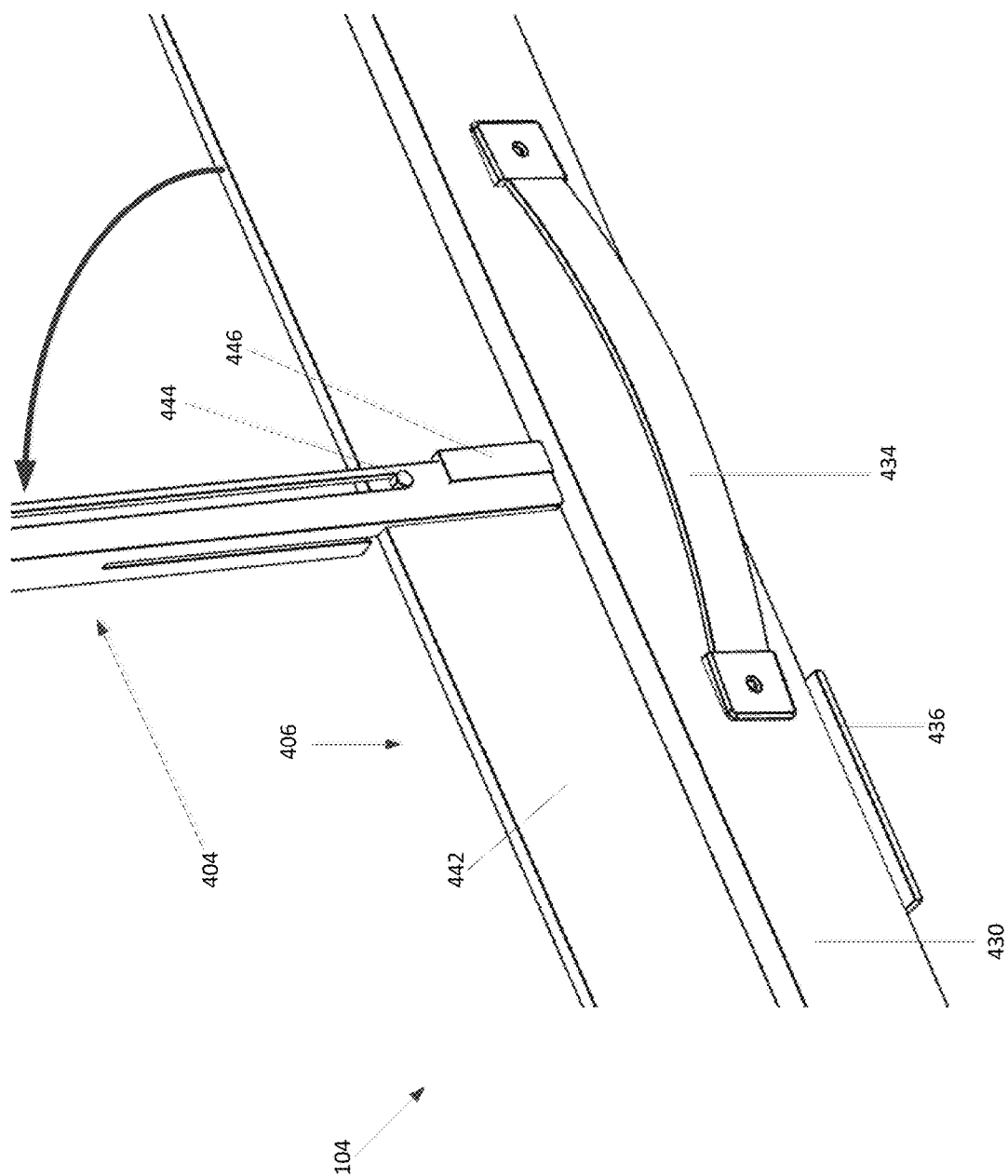
FIG. 13 is a perspective view of the mirror assembly and extension arm, in accordance with some embodiments of the present disclosure.

In the embodiment shown, the extension arm base 418 and extension arm side 420 fit along the outside surfaces the corner formed by the base 406 and cover 426, e.g. along the outside surface of the cover front 430 and the base bottom outside surface 442. The rotation pin 444 can be attached to the base bottom outside surface 442 and can slidably fit within the rotation slot 422. In the embodiment shown, the rotation pin 444 is near the right-side end of the length of the rotation slot 422, and the bracket 436 is mated within the lock slot 424 latching the cover 426 closed. In some embodiments, the mirror assembly 104 can be opened by sliding, e.g. translating, the extension arm 404 along the width of the mirror assembly 104 in the direction indicated in FIG. 12, e.g. towards the right endcap, until the left end of the lock slot 424 is near, or contacts, the rotation pin 444. When the extension arm 404 is slid to the right such that the rotation pin 444 is near or contacts the left end of the rotation slot 422, the lock slot 424 will clear the bracket 436 unlatching the cover 426 and allowing the cover to open. The extension arm 404 can then be rotated about the rotation pin 444 such that the camera mount 402 attached to the other end of the extension arm 404 is spaced apart from the mirror assembly by the predetermined horizontal distance D facing the mirror surface 408 and the extension arm is perpendicular to the width of the mirror assembly 104, as illustrated in FIG. 6. The stop bar 446 can be attached to the base bottom outside surface 442 and stop the rotation of the extension arm 404 by contact when the extension arm 404 is rotated such that it is perpendicular to, e.g. normal to, the width of the mirror assembly 104, as illustrated in FIG. 13. FIG. 13 is a perspective view of the mirror assembly 104 and extension arm 404, in accordance with some embodiments of the present disclosure. In the embodiment shown, the mirror assembly 104 is in the open position and the extension arm 404 is in the extended position. In the embodiment shown in FIG. 13, the stop bar 446 is in contact with the extension arm base 418 when the extension arm 404 is normal to the width of the mirror assembly 104, and the end of the extension arm side 420 opposite the camera mount 402 is in contact with, or near to, and flush with a front outside surface of the mirror assembly base 406.

Figure 14:
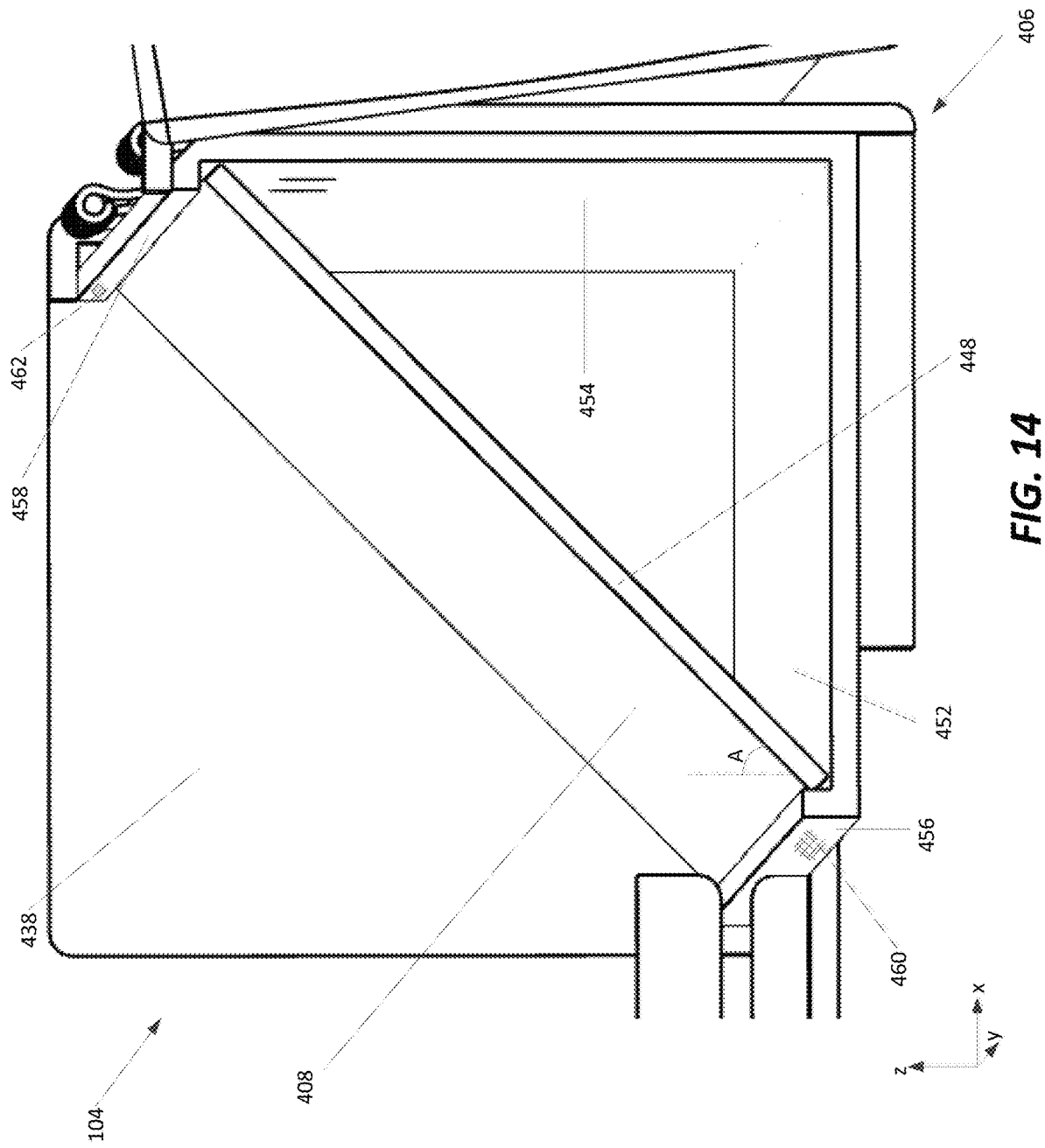
FIG. 14 is a perspective view of the mirror assembly, in accordance with some embodiments of the present disclosure.

FIG. 14 is a perspective view of the mirror assembly 104, in accordance with some embodiments of the present disclosure. In the embodiment shown, the mirror assembly 104 is in the open configuration and includes a mirror 448, the base 406, and fiducial marks 460 and 462. The example in FIG. 14 also illustrates the left endcap 438 and the mirror surface 408.

In some embodiments, the mirror 448 includes a mirror substrate 450 having a thickness and the mirror surface 408. The mirror substrate 450 can be reversible, e.g. including a mirror surface 408 on both the top and bottom surfaces of the mirror substrate 450. The mirror substrate 450 determines the shape of the mirror surface 408. For example, in some embodiments the mirror substrate 450 can be curved and hold the mirror surface 408 in a corresponding curved shape, e.g. the mirror substrate 450 can have a convex or concave shape, a spherical shape, a parabolic shape, or any other determined shape. In preferred embodiments, the mirror surface is flat, e.g. planar, and holds the mirror surface 408 in a planar shape. The mirror substrate 450 can be made from molded plastic, acrylic, polycarbonate, metal, or any suitable material with sufficient strength and stiffness to retain a desired shape and hold the mirror surface 408 to retain its shape to hold the mirror in a fixed position. The mirror substrate 450 can be made with sufficient thickness to have sufficient strength and stiffness to hold a desired shape.

In some embodiments, the mirror surface 408 can have a high reflectivity, e.g. greater than 40%, or greater than 80%, greater than 96% reflectivity. The mirror surface 408 can have a low surface roughness such that the mirror surface 408 is a specular reflecting surface. In some embodiments, the mirror surface 408 can be the outside surface of the mirror substrate 450, in other embodiments the mirror surface 408 can be formed on the mirror substrate 450 by coating a reflective material, such as silver, on the mirror substrate 450.

In some embodiments, the mirror surface 408 can include a protective film, coating, or covering. For example, the mirror surface can be coated with a hydrophobic or oleophobic material, and the mirror 448 may contain an anti-static material or layer. In some embodiments, the mirror surface 408 can be coated with an anti-scratch hardcoat. In other embodiments, the mirror surface 408 can include an anti-glare material, coating, film, or covering. In still other embodiments, a transparent protective film can be overlaid with, or adhered to, the mirror surface 408. In some embodiments, the mirror surface 408 can include an anti-fingerprint material or coating.

In the embodiment shown in FIG. 14, the mirror 448 is supported at an angle A by the base 406. The base 406 can include a bottom 452 and a back 454 that is at right angles with, and adjacent to, the back 454 such that the bottom 452 and the back 454 form an "L-shaped" cross section. In the embodiment shown, the bottom 452 can include a bottom lip 456 that extends in the height direction y from the front edge of the bottom 452 and runs the width of the bottom 452, and the back 454 can include a back lip 458 that extends in the depth direction x from the top edge of the back 454 and runs the width of the back 454. In the embodiment shown, the mirror 448 is flat and rectangular, and has a width that is less than the width of the mirror assembly 104 and a height such that the mirror 448 is supported by the bottom lip 456, bottom 452, back lip 458, and back 454 within the mirror assembly 104, and such that the mirror 448 is tilted back with respect to the y-z plane at an angle A. In some embodiments, the angle A can be 45 degrees. In other embodiments, the angle A can be any other angle at which a reflected image remains visible within a field of view of a camera, e.g., between about 20 and about 70 degrees. Other angles are useable as well.

In the embodiment shown, the mirror 448 can be slid along the width direction of the mirror assembly 104 to remove the mirror 448 when the mirror assembly 104 is in the open configuration. As such, the mirror 448 is removable and replaceable within the mirror assembly 104, and can be flipped to as to expose the bottom surface of the mirror substrate 450 rather than the top, or be replaced by a different mirror 448. In other embodiments, the mirror 448 can be mounted to the mirror assembly 104 via a set of magnets attached to the mirror substrate 450, and an opposing set of magnets attached to the mirror assembly base 406.

In the embodiment shown, the bottom lip 456 includes the fiducial mark 460 along the surface of the bottom lip 456 facing the camera 106. The example shown also illustrates the fiducial mark 462 on the surface of the back lip 458 facing the camera 106. In some embodiments, the fiducial marks 460 and 462 can be used for camera calibration and automated detection of the location and orientation of the mirror surface 408 and selection of the associated sub-regions within captured video or images. In some embodiments, the fiducial marks 460 and 462 can be located on any component of the mirror assembly 104 viewable by the camera 106. In some embodiments, only a single fiducial mark 460 can be used, located on any component and in any location of the mirror assembly 104 viewable by the camera 106, and in other embodiments a plurality of fiducial marks 460 or 462 can be used, located on any component and in any location of the mirror assembly 104 viewable by the camera 106. In some embodiments, the fiducial marks 460 and 462 are a pattern, a color, a shape, an LED or other light emitting element, a material visible on and attached to any component of the mirror assembly 104, or any other distinguishing marking viewable by the camera 106. In some embodiments, the fiducial mark 460 or 462 can be a continuous mark bordering the entire perimeter of the mirror surface 408.

Another example embodiment of an imaging assembly 500 will now be described with reference to FIGS. 15-18. The imaging assembly 500 illustrates an alternative extension arm and camera mount assembly. In some embodiments, the imaging assembly 500 can be portable, and can be used in the vehicle undercarriage imaging system 300 for capturing vehicle undercarriage video sufficient to reconstruct a composite image of a vehicle undercarriage 306 at a location 102 without the need to lift, or otherwise separate, the vehicle 110 from the surface 310 on which the vehicle 110 resides.

Figure 15:
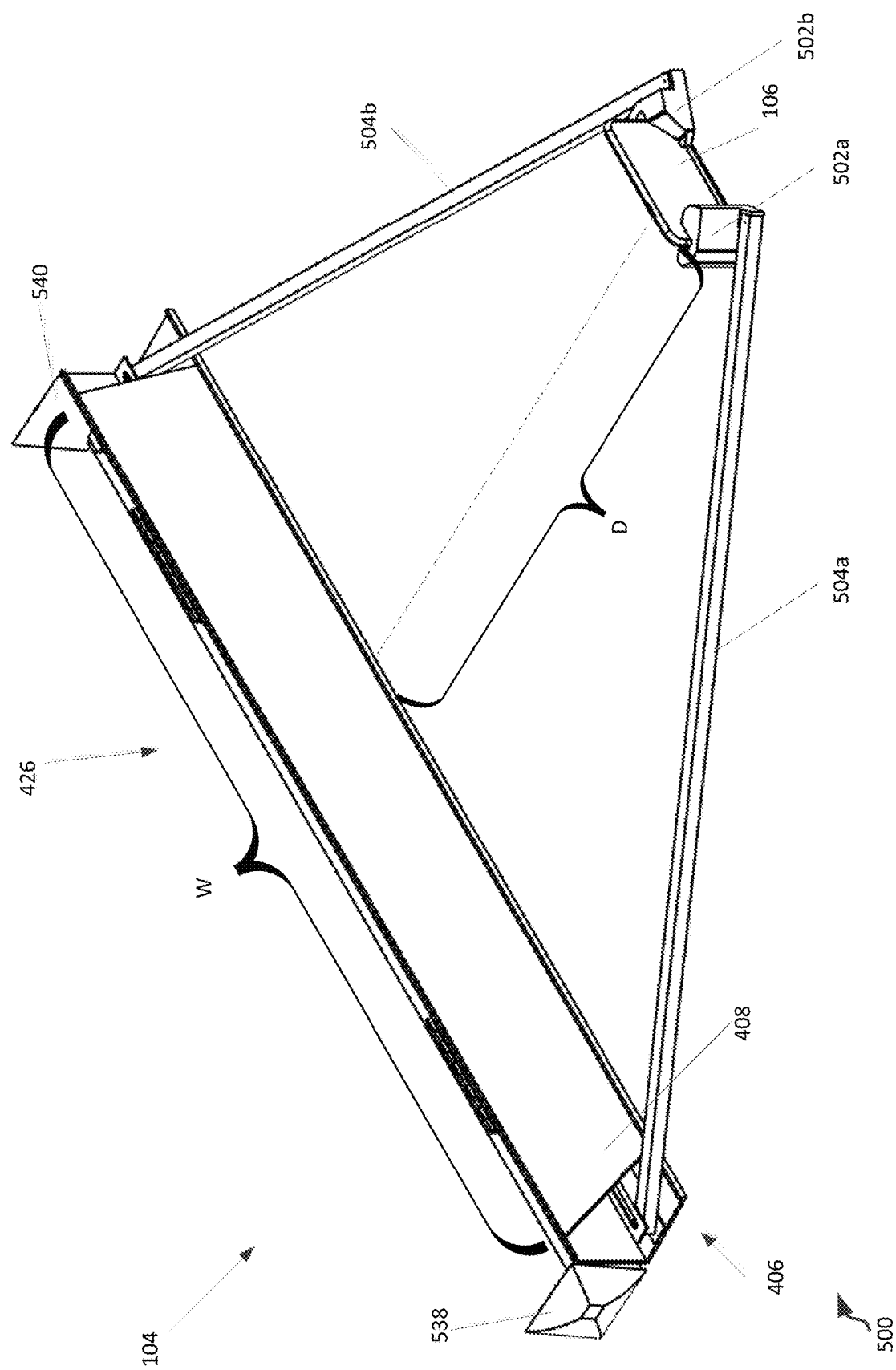
FIG. 15 is a perspective view of an imaging assembly, in accordance with some embodiments of the present disclosure.

FIG. 15 is a perspective view of an imaging assembly 500, in accordance with some embodiments of the present disclosure. In the example shown in FIG. 15, the imaging assembly 500 includes a mirror assembly 104 in an open configuration, a camera mount 502a and 502b, and a pair of extension arms 504a and 504b. The example shown in FIG. 15, also illustrates a left endcap 538, a right endcap 540, and the camera 106.

In the example shown, the camera mount is split into left and right portions 502a and 502b attached to the end of the extension arms 504a and 504b, respectively. The camera mount 502a and 502b support the camera 106 in a position oriented towards the mirror surface 408.

In the embodiment shown, the extension arms 504a and 504b are illustrated in an extended position. The extension arms 504a and 504b can position the camera mount 502a-b such that the camera 106 is located centrally along the width W of the mirror surface 408 and separated from the mirror assembly 104 by a depth distance D in a direction perpendicular to the width of the mirror surface 408. The extension arms 504a-b can be made of metal, such as steel or aluminum, or any suitable material with sufficient strength and stiffness to support the camera mount 502a-b with the camera 106 mounted. In some embodiments, the extension arms 504a-b can be attachable to the mirror assembly 104 and can be extendable and retractable from the mirror assembly 104. In some embodiments, the extension arms 504a-b in the extended position are perpendicular to the width W of the mirror surface 408, and the extension arms 504a-b in the retracted position are parallel to the width W of the mirror surface 408, as illustrated below in FIG. 16.

In the embodiment shown, the mirror assembly 104 includes a base 406 and a cover 426. The example also shows that both the left endcap 538 and the right endcap 540 are attached to the cover 426. The left endcap 538 closes off the left opening of the "tube" formed by the base 406 and cover 426 when the mirror assembly 104 is in the closed configuration, and the right endcap 540 closes off the right opening of the "tube." The cover 426, the left endcap 538 and right endcap 540 protect the mirror surface 408 from being contacted from foreign objects entering the "tube" when the cover 426 is in the closed position. In the embodiment shown, the left endcap 538 and the right endcap 540 being attached to the cover 426 allows the extension arms 504a-b to be extended and retracted when the mirror assembly 104 is in the open configuration.

In the example shown, the imaging assembly 500 can be placed on a surface, such as the ground, a road, a parking lot, the surface 310 on which a vehicle 110 resides. The mirror assembly 104 supports the mirror surface 408 at the correct angle such that the mirror surface 408 reflects a worm's eye view of the vehicle undercarriage to the camera 106 mounted in the camera mount 502a-b. The mirror assembly can also support the extension arm 404 and camera mount 402, either of which can be placed on the surface 310 or be suspended above the surface 310 and supported by the mirror assembly 104.

Figure 16:
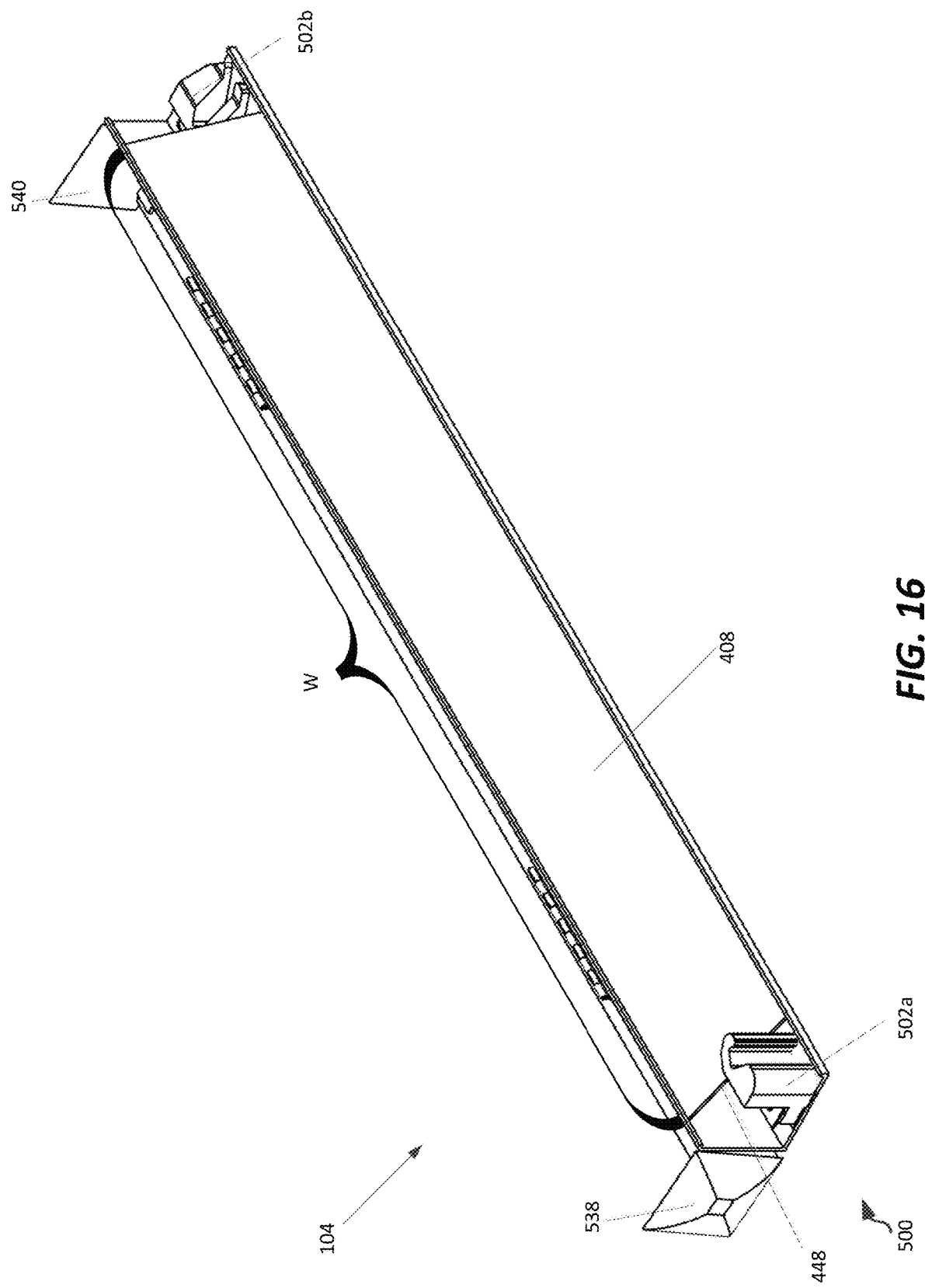
FIG. 16 is a perspective view of an imaging assembly, in accordance with some embodiments of the present disclosure.

FIG. 16 is a perspective view of an imaging assembly 500, in accordance with some embodiments of the present disclosure. In the example shown in FIG. 16, the extension arms 504a-b are in the retracted position, and reside behind the mirror 448. In the example shown in FIG. 16, the mirror surface width W is less than the width of the mirror assembly 104, allowing space on the left and right side for the camera mounts 502a-b to be stored within the mirror assembly 104 when the extension arms 504a-b are in the retracted position.

Figure 17:
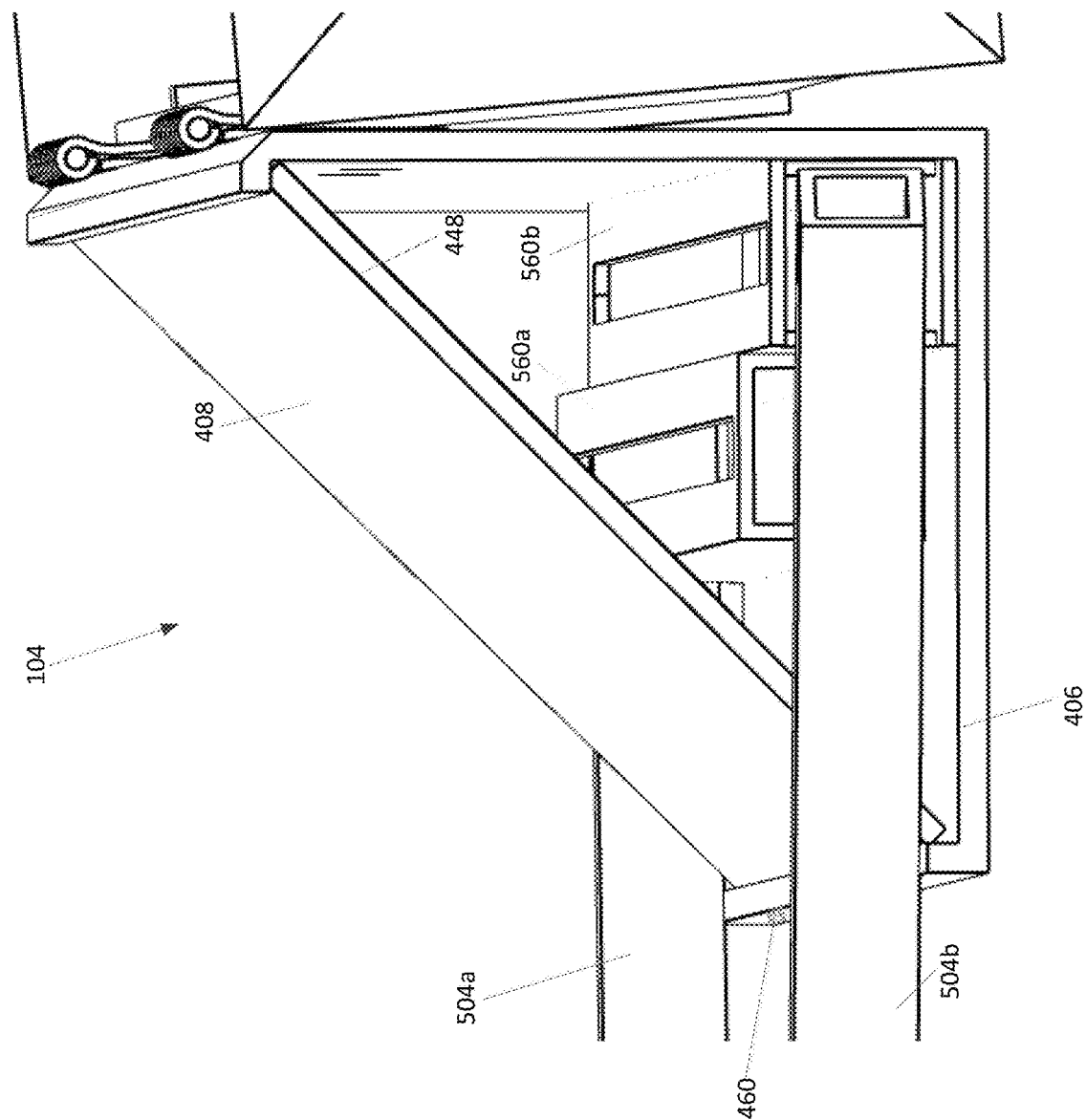
FIG. 17 is a perspective view of an imaging assembly, in accordance with some embodiments of the present disclosure.

FIG. 17 is a perspective view of an imaging assembly 500, in accordance with some embodiments of the present disclosure. In the example shown in FIG. 17, the imaging assembly 500 includes extension arm holders 560a-b. In the embodiment shown, the extension arm holders are positioned underneath the mirror 428 along the base 406, and are sized to receive the extension arms 504a-b. The example shown in FIG. 17 also illustrates the fiducial mark 460.

Figure 18:
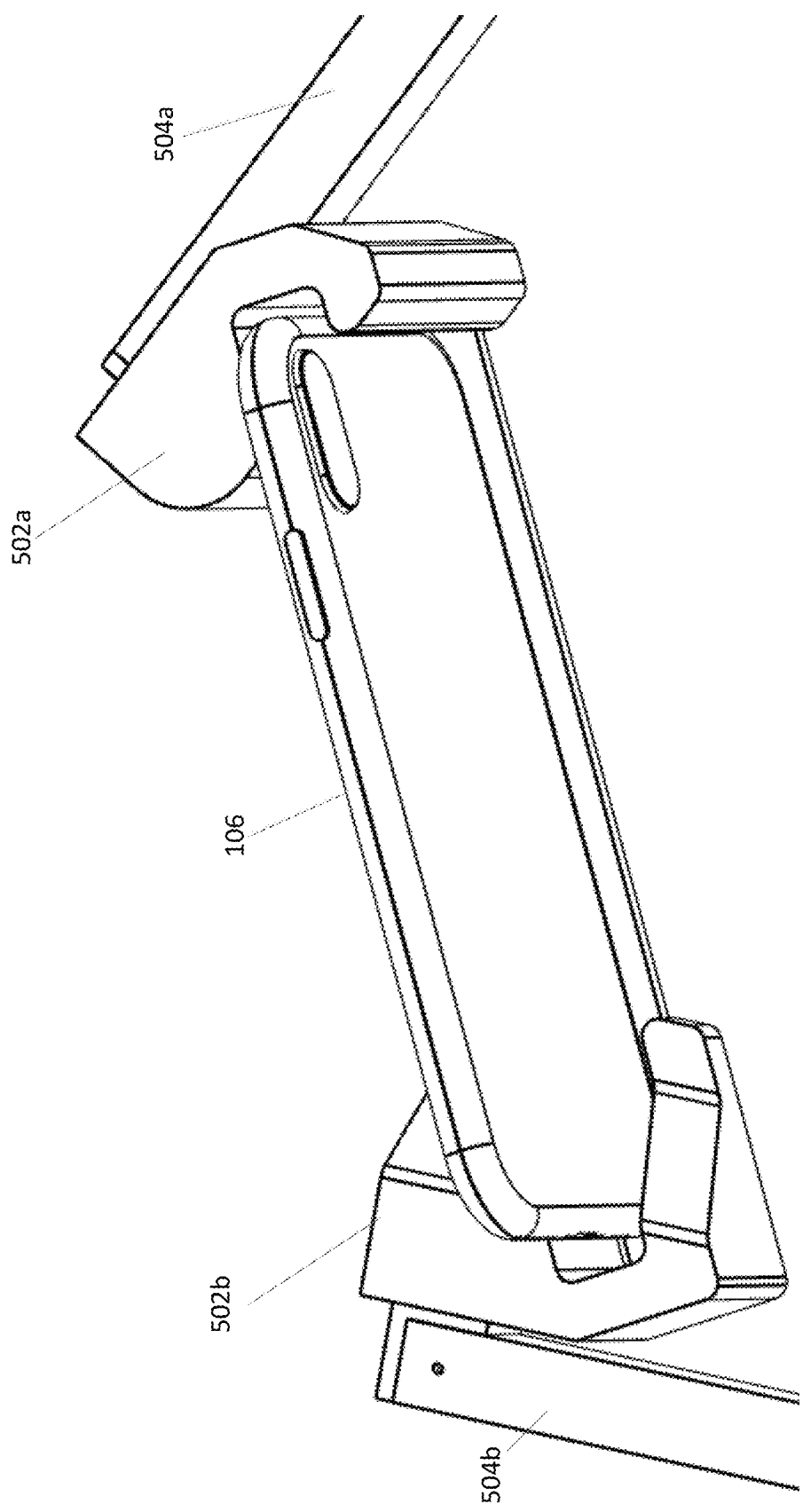
FIG. 18 is a perspective view of the camera mount, in accordance with some embodiments of the present disclosure.

FIG. 18 is a perspective view of the camera mount 502a-b, in accordance with some embodiments of the present disclosure. The example shown in FIG. 18 also illustrate the extension arms 504a-b and camera 106.

In the embodiment shown, the camera mount 502a is attached to the extension arm 504a, and the camera mount 502b is attached to the extension arm 504b. The camera mount 502a and 502b each include a slot sized to receive the camera 106. In some embodiments, the camera 106 can be loosely placed into the slots in the camera mount 502a and 502b such that the camera 106 is oriented towards the mirror surface 408, and in other embodiments, the camera 106 can be press fit into the slots in the camera mount 502a and 502b such that the camera 106 is oriented towards the mirror surface 408. In still other embodiments, the camera 106 can be held in place by tension fitting, locking mechanism, or any other method or mechanism that supports and holds the camera 106 oriented towards the mirror surface 408.

The camera mount 502a-b can be made of plastic, molded plastic, rubber, metal, or any suitable material with sufficient strength and stiffness to support the camera 106 and orient the camera 106 towards the mirror surface 408.

In conjunction with the embodiments shown in FIGS. 15-18, the use of more than one extension arm provides additional stability and ensures proper positioning of the camera mount when both extension arms are attached to the camera mount.

Another example embodiment of an imaging assembly 570 will now be described with reference to FIGS. 19-22. The imaging assembly 570 illustrates an alternative base including adjustable bumpers, a leveling indicator, and an alternative mirror attachment means including magnets. It should be noted that adjustable bumpers, leveling indicators, and any alternative mirror attachment means, including the use of magnets, can be included in any embodiment of an imaging assembly, including the imaging assembly 400 and the imaging assembly 500 discussed above. In some embodiments, the imaging assembly 570 can be portable, and can be used in the vehicle undercarriage imaging system 300 for capturing vehicle undercarriage video sufficient to reconstruct a composite image of a vehicle undercarriage 306 at a location 102 without the need to lift, or otherwise separate, the vehicle 110 from the surface 310 on which the vehicle 110 resides.

Figure 19:
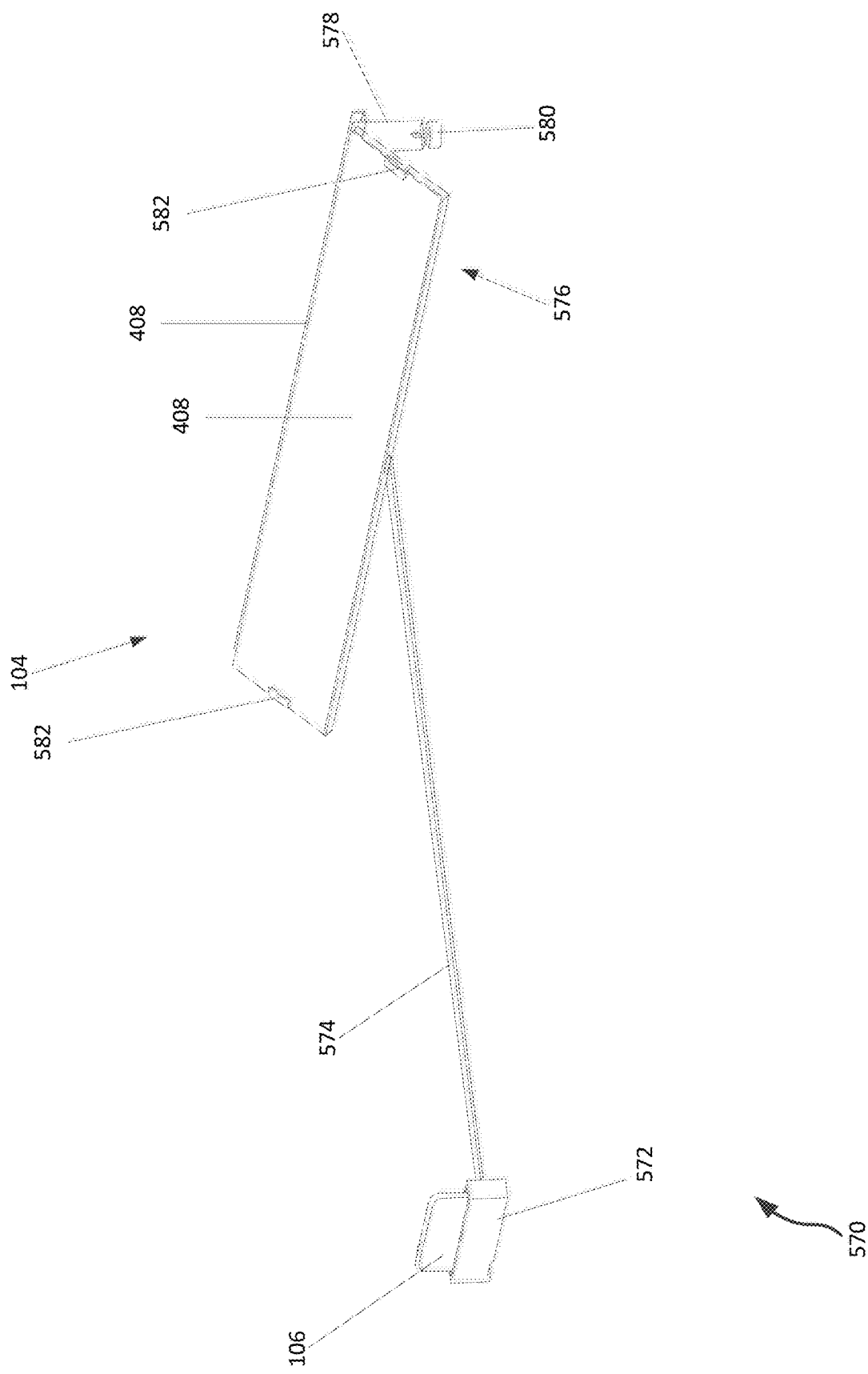
FIG. 19 is a perspective view of an imaging assembly, in accordance with some embodiments of the present disclosure.

FIG. 19 is a perspective view of an imaging assembly 570, in accordance with some embodiments of the present disclosure. In the example shown in FIG. 19, the imaging assembly 570 includes a mirror assembly 104 in an open configuration, a camera mount 572, and an extension arm 574. The example shown in FIG. 15, also illustrates a base 576, legs 578, adjustable bumpers 580, and magnets 582.

In some embodiments, the base 576 is attached to the legs 578 which position the base 576 at an angle in the depth direction such that a reflected field of view that is viewable in a mirror surface 408, held in the same plane as the base 576, from the camera mount is above the mirror assembly in the height direction. In some embodiments, adjustable bumpers 580 can be attached to the legs, and can be adjustable so as change the angle of the base 576 in the depth direction, and also to change the leveling of the base 576 in the width direction along the width of the mirror surface 408.

Figure 20:
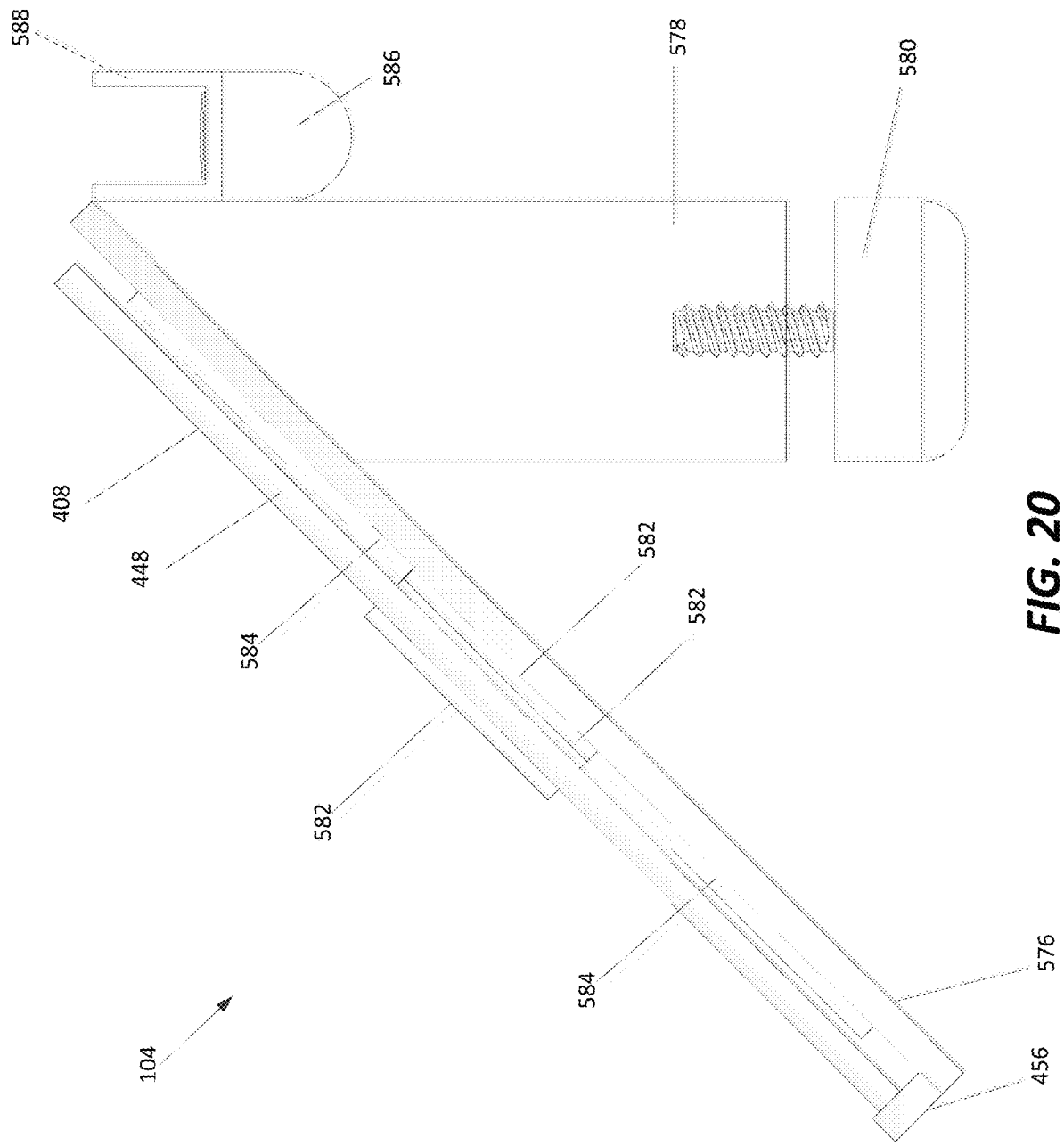
FIG. 20 is a perspective view of a mirror assembly, in accordance with some embodiments of the present disclosure.

FIG. 20 is a perspective view of a mirror assembly 104, in accordance with some embodiments of the present disclosure. In the example shown in FIG. 20, the mirror assembly 104 includes a base 576 including a bottom lip 456, a mirror 448, pads 584, magnets 582, legs 578, adjustable bumpers 580, and a level indicator 586. The example shown in FIG. 20 also illustrates a mirror surface 408 and a bracket 588.

In some embodiments, the mirror 448 can be reversible having a reflective mirror surface 408 as both the top and bottom outer surfaces of the mirror 448. In the embodiment shown in FIG. 20, the mirror 448 is placed on the base 576 such that the bottom surface of the mirror 448 might come into contact with the surface of the base, and may therefore damage the bottom surface of the mirror 448. In some embodiments, pads 584 can be placed between the bottom of the mirror 448 and the top surface of the base 576. The pads 584 can have the same area as the base 576 or the mirror 448, and in other embodiments the pads 584 can have a different area than the mirror 448 or base 576 and act as a spacer. In some embodiments, the pads 584 can be attached to the base 576, in other embodiments the pads 584 can be attached to the mirror 448, and in other embodiments the pads can be free-floating and attached to neither the base 576 nor the mirror 448. In some embodiments the pads 584 are made of felt, and in other embodiments the pads 584 are made of any other material that can protect the bottom surface of the mirror 448, e.g. a mirror surface 408, from being damaged by coming into contact with the base 576.

In some embodiments, the mirror 448 can be attached to the base 576 using magnets 582. For example, magnets 582 may be attached to both the top and bottom surfaces of the mirror 448 and to the base 576 at the appropriate position on the base 576 so as to match up with the magnets 582 attached to the mirror 448. The magnets 582 can be arranged such that the magnets 582 attached to the base 576 and the mirror 448 have opposite magnetic poles facing each other and are thus attracted and attach the mirror 448 to the base 576 by a magnetic attraction force.

In some embodiments, the adjustable bumpers 580 can be threaded, and the legs 578 included thread-holes to receive the threaded adjustable bumpers 580, so as to adjust the angle and leveling of the mirror surface 408 by threading the adjustable bumpers 580 into and out of the thread-holes. The legs 578 and adjustable bumpers 580 can be made of plastic, molded plastic, rubber, metal, or any suitable material with sufficient strength and stiffness to support the base 576.

In some embodiments, the mirror assembly 104 can include a level indicator 586. In the example shown in FIG. 20, the level indicator is attached to the bracket 588, which is attached to the legs 578. In other embodiments, the level indicator can be attached to other components of the base 576, or the base 406.

Figure 21:
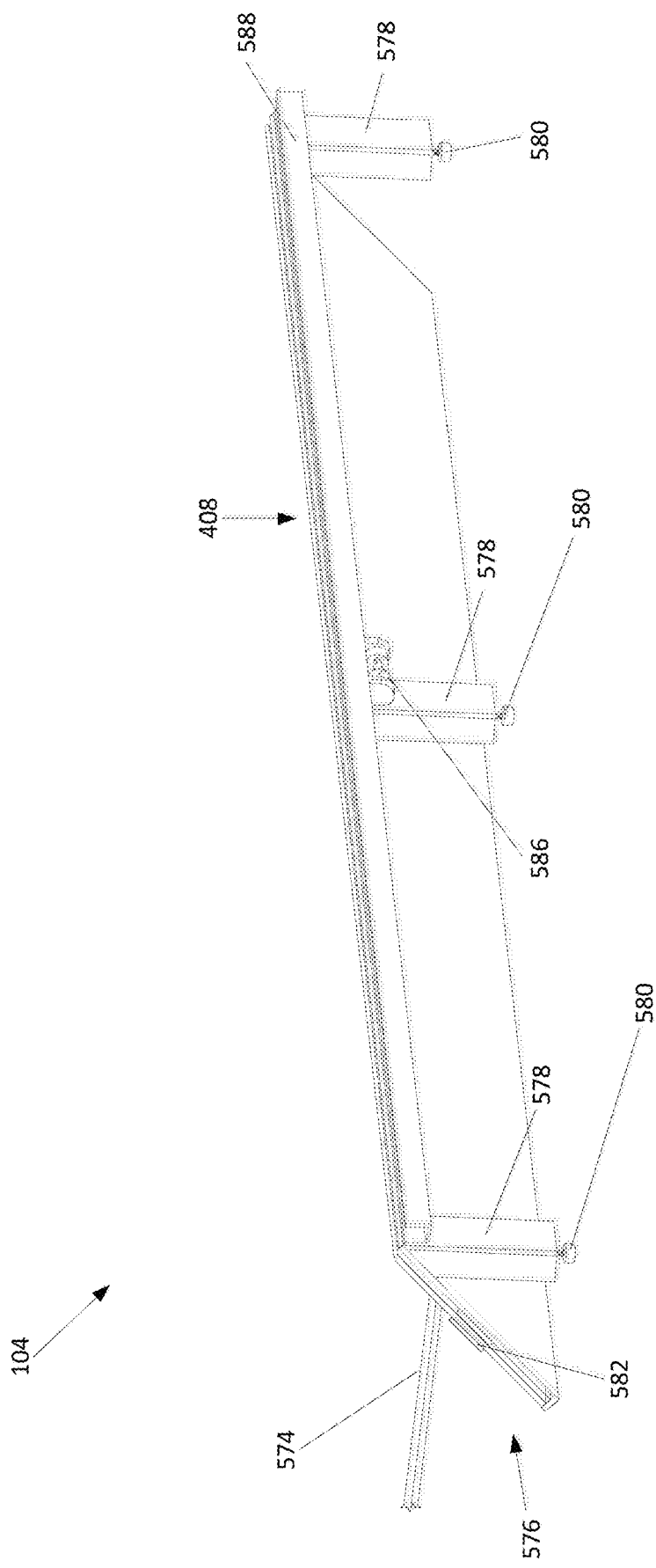
FIG. 21 is a perspective view of a mirror assembly, in accordance with some embodiments of the present disclosure.

FIG. 21 is a perspective view of a mirror assembly 104, in accordance with some embodiments of the present disclosure. In the example shown in FIG. 21, the mirror assembly 104 includes a level indicator 586. The example shown in FIG. 21 also illustrates the base 576, the mirror surface 408, the bracket 588, the legs 578, and the adjustable bumpers 580.

In some embodiments, the base 576 can be attached to a plurality of legs 578, each of which includes at least one adjustable bumper 580. In the example shown, the base 576 is attached to three legs 578, each having an adjustable bumper 580. In some embodiments, both the angle of the base 576 in the depth direction and the level of the base 576 along the width direction of the mirror surface 408 can be adjusted by adjusting the adjustable bumpers 580. For example, adjusting the height of all three of the adjustable bumpers 580 by the same amount can adjust the angle of the base 576 in the depth direction, which adjusting the height of the left or right adjustable bumper 580 in the example shown can change both the angle of the base 576 in the depth direction and the level of the base 576 in the width direction.

In the example shown, the level indicator 586 can be attached to the mirror assembly 104 such that it can indicate the level of the base 576 in the width direction of the mirror surface 408. In some embodiments, the level indicator can be a bubble level with its cylinder axis parallel to the width direction of the mirror surface 408.

Although shown in conjunction with the imaging assembly 570, it is noted that the various features seen therein, such as the fiducial marks 460 and 462, the adjustable bumpers 580, magnets 582, pads 584, and or the level indicator 586 may be incorporated into other versions of the imaging assembly, such as imaging assemblies 400, 500 described above.

Referring generally now to FIGS. 6-21, in some embodiments, a light source can be attached to the mirror assembly 104. For example, a light source can be attached to the upper surface of the back lip 458, or a light source can be attached to the inner surface of the cover top 428 such that the light from the light source is directed in the height direction above the mirror surface 408, for example to illuminate the undercarriage of a vehicle passing over the mirror assembly 104, or a light source can be attached to the bracket 588. In other embodiments, a light source can be attached to other components of the mirror assembly 104. The light source can include a plurality of individual light sources, and can be of any type, e.g. light emitting diode (LED), fluorescent tube, incandescent, halogen, flash lamp, etc. In preferred embodiments, the light source can be a strip of LEDs oriented to emit light in the height z direction to illuminate a vehicle undercarriage. In some embodiments, an ambient light sensor and a light source controller can be attached to the mirror assembly 104 for regulating the light source. For example, an ambient light sensor can sense low ambient light level conditions, such as with an overcast day or at night, and can send a signal to the controller to turn on or increase the brightness of the light source. The ambient light sensor can also sense ambient light level conditions sufficient for capturing vehicle undercarriage data without the light source and can send a signal to the controller to reduce the brightness or turn off the light source.

Referring now to FIGS. 22-36, methods and systems for capturing image data and processing captured image data to create composite vehicle undercarriage images using the systems and apparatus of FIGS. 3-21 are described. Generally, the methods and systems described herein may be executed at least in part on a computing device, such as a mobile device mounted to the imaging assemblies as described above, for example as part of execution of a vehicle inspection application installed on such a device.

Figure 22:
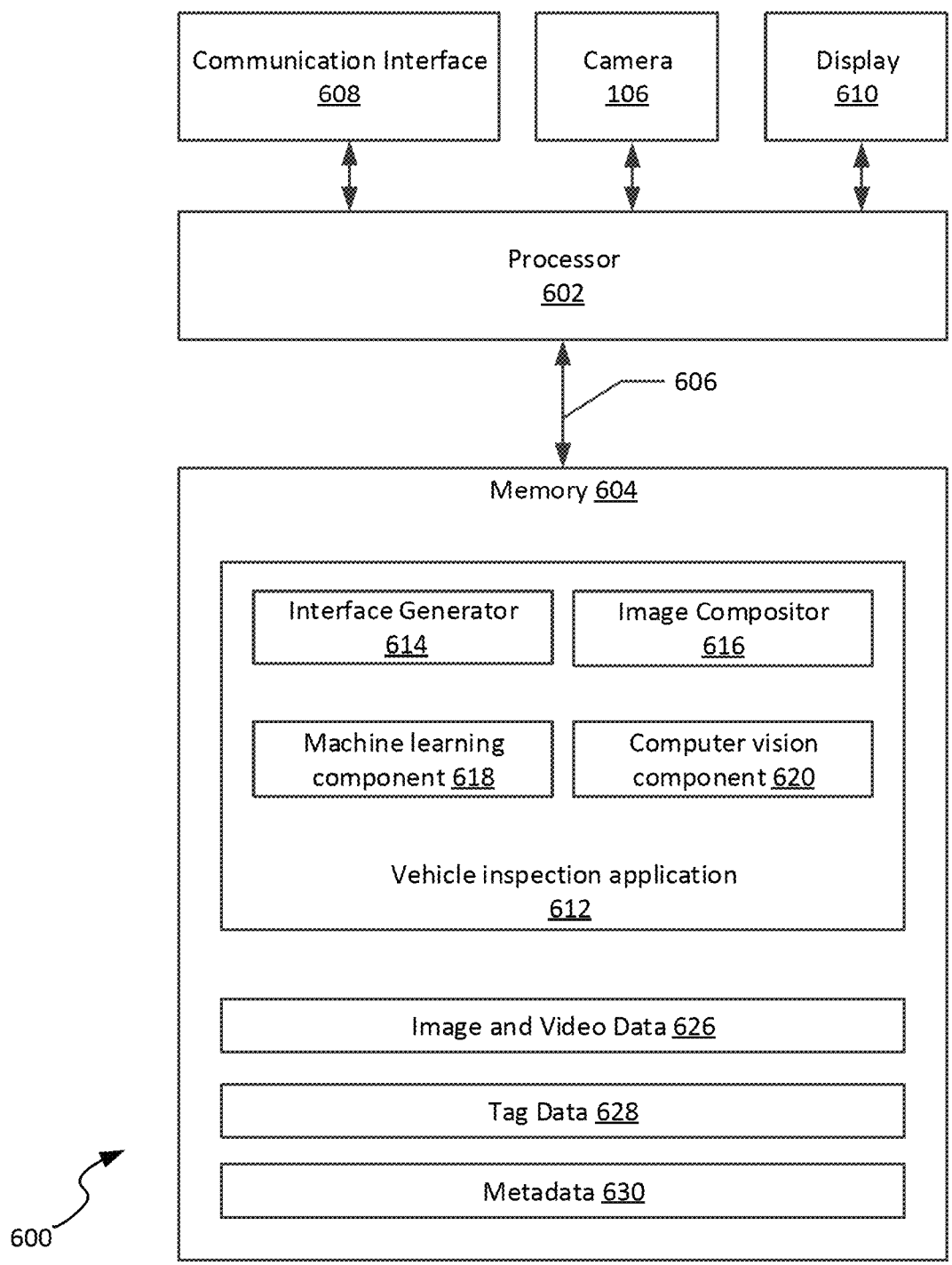
FIG. 22 is a schematic illustration of an example computing system useable to process captured vehicle undercarriage image or video data, according to an example embodiment of the present disclosure.

FIG. 22 is a schematic illustration of an example computing system 600 useable to process captured vehicle undercarriage image or video data, according to an example embodiment of the present disclosure. The example computing system 600 represents one possible embodiment of a device, such as a mobile computing device including a camera, used to capture and process image data. In general, the computing system 600 includes a processor 602 communicatively connected to a memory 604 via a data bus 606. The processor 602 can be any of a variety of types of programmable circuits capable of executing computer-readable instructions to perform various tasks, such as mathematical and communication tasks, such as those described above in connection with FIG. 22. The memory 604 can include any of a variety of memory devices, such as using various types of computer-readable or computer storage media, as also discussed above. In the embodiment shown, the memory 604 stores a vehicle inspection application 612, discussed in further detail below. The computing system 600 can also include a communication interface 608 configured to receive and transmit data, for example to access data in an external database, or to serve a web interface useable to process audio data. Additionally, the computing system 600 can include a camera 106 used for capturing image or video data, and a display 610 that can be used for viewing a local version of a user interface, as described herein, via the vehicle inspection application 612.

In various embodiments, the vehicle inspection application 612 generally is configured to generate an interface to automatically process vehicle inspection data, such as video data and audio data, and provide processed vehicle inspection data results. In the example embodiment shown, the vehicle inspection application 612 includes an interface generator 614, an image compositor 616, a machine learning component 618, and a computer vision component 620.

The memory 604 can include image and video data 626, which can include captured vehicle undercarriage video data including other associated data such as metadata, as well as other information, for any number of vehicles. The memory 604 may also include tag data 628, which can include user input tags associated with the image and video data 626. Examples of tags are described above in connection with FIG. 2. The memory 604 may also include metadata 630, which can include data associated with the image and video files such as image and video capture settings, e.g. the number of video frames, frame rate, date and time of image and video capture, type of digital format, and vehicle information such as vehicle identification, information from the vehicle computer, and vehicle information from third party reporting systems, as well as other information, for any number of vehicles.

In example embodiments, the interface generator 614 can be configured to generate and serve a vehicle undercarriage image compositing and diagnostics user interface. The vehicle undercarriage image compositing and diagnostics user interface presents to a user software controls for downloading image and video data, manipulating image and video data processing settings, initiating image and video data processing, and obtaining results from image and video data processing.

In the example shown, the image compositor 616 is configured to generate a composite digital image of a vehicle undercarriage from the captured vehicle undercarriage data, such as video data, or a series of images, captured of portions of a vehicle undercarriage.

In the example shown, the machine learning component 618 is configured to extract features from the composited image of the vehicle undercarriage. In some embodiments, the machine learning component 618 uses deep convolutional neural networks (DCNN) trained to extract features from images and video and perform some classification task, keypoint estimation task, semantic segmentation task, or instance segmentation task. Vehicle undercarriage video, image samples, and associated tags, for example captured digital vehicle undercarriage image and video data along with associated tags that may be stored in the image and video data 626 in the memory 604, may form a dataset from which to train machine learning algorithms, as well as validate machine learning results. Examples of features include aftermarket modification, e.g. lift kits, replacement parts, etc., excessive rust and corrosion, flood damage, e.g. corrosion, dirt and debris, etc., frame damage, missing components, e.g. removal of the catalytic converter, etc., exhaust system defects, e.g. holes in the exhaust pipes or muffler, the presence of non-standard components, e.g. items attached to the vehicle undercarriage. Other machine learning algorithms such as linear models, probability models, etc., for example, ordinary least squares, ridge regression, or support vector machines, may also be used to predict a tag or tags from another tag or tags. Machine learning is further described below in connection with FIGS. 35 to 36.

In alternative embodiments, the machine learning component 618 may not be included within the vehicle inspection application 612, and instead is included at a server, such as server 112. In such embodiments, composite vehicle undercarriage images can be sent to the server 112 for purposes of automated analysis to identify features such as those noted above. Machine learning, as may be implemented at server 112, is further described below in connection with FIGS. 31 to 32.

In the example shown, the computer vision component 620 is configured to extract features from the composited image of the vehicle undercarriage. In some embodiments, the computer vision component 620 uses algorithms suitable for computer vision to extract features from images and video and perform tasks such as or inform machine learning models as a component of a dataset for tasks such as classification, keypoint estimation, semantic segmentation, or instance segmentation. Examples of such algorithms include Size Invariant Feature Transform (SIFT), projective transformations, affine transformations, edge detection algorithms, etc. Examples of features include aftermarket modification, e.g. lift kits, replacement parts, etc., excessive rust and corrosion, flood damage, e.g. corrosion, dirt and debris, etc., frame damage, missing components, e.g. removal of the catalytic converter, etc., exhaust system defects, e.g. holes in the exhaust pipes or muffler, the presence of non-standard components, e.g. items attached to the vehicle undercarriage.

It is noted that although certain functionality of the vehicle inspection application 612 is described herein, other functionality may be provided as well. For example, the vehicle inspection application 612 may be configured to capture and analyze various other information about a vehicle, such as exterior and interior photographs of the vehicle, audio of vehicle engine operation, and user input of various vehicle characteristics (make/model, mileage, observed characteristics). Example types of audio features that may be captured and analyzed in such a vehicle inspection application are described in U.S. Provisional Patent Application No. 62/795,444, entitled "Vehicle Audio Capture and Diagnostics", the disclosure of which is hereby incorporated by reference in its entirety.

Figure 23:
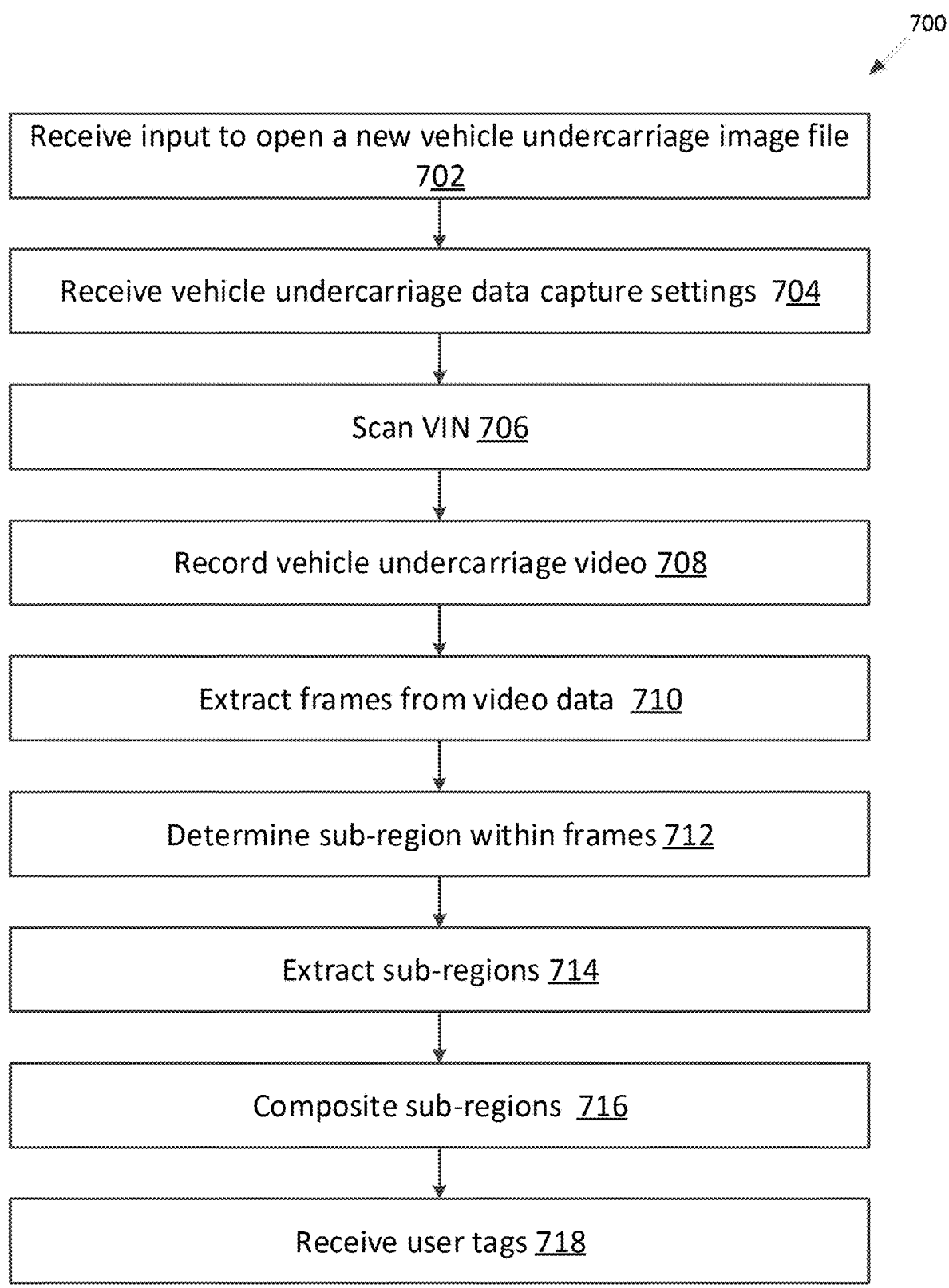
FIG. 23 is a flowchart of a method for reconstructing a vehicle undercarriage composite image, according to an example embodiment of the present disclosure.

FIG. 23 is a flowchart of a method 700 for reconstructing a vehicle undercarriage composite image, according to an example embodiment of the present disclosure. The method 700 can be performed, for example, at a computing device or a server, such as data consumer devices 122, 124, or 126, a mobile computing device, a server 112 of FIG. 1, and the computing system 600 of FIG. 22.

In the embodiment shown, the method 700 includes receiving input to open a new vehicle undercarriage image file at step 702. In some embodiments, the input can be provided by a user 108 and received through a user interface, such as a user interface generated by the interface generator 614 of a computing system 600 illustrated in FIG. 22. At step 704, vehicle undercarriage data capture settings are received, such as through a user interface generated by the interface generator 614. At step 706, the vehicle identification number (VIN) of the vehicle that is to have its undercarriage imaged is scanned. In some embodiments, scanning a vehicle VIN can be done using a vehicle inspection application, such as the vehicle inspection application 612 illustrated and described above in connection with FIG. 22, in conjunction with the mobile device camera and other software or firmware on the mobile device. At step 708, the vehicle undercarriage video is recorded.

In the embodiment shown, at step 710, individual frames from the captured vehicle undercarriage video data are extracted. The vehicle undercarriage video data is stored as a digital video file, and tags identifying conditions during video capture can be associated with the video file. In some embodiments, the user 108 can select the frames to be extracted using a user interface of the vehicle inspection application 612.

In the embodiment shown, at step 712, a sub-region within each of the individual frames extracted at step 702 is determined. Generally, the sub-region is determined for all of the frames, e.g. the pixel locations of the sub-region are the same in each of the individual frames. In some embodiments, the sub-region can be determined by selecting a rectangular region within the frames of a certain width and height and located at a particular location within the frames. For example, the sub-region can correspond to a region of interest with the frames, such as a rectangular region including the mirror surface 308, and also a portion of the vehicle undercarriage 306, can be the region of interest for compositing a vehicle undercarriage image, and can be selected as the sub-region. In some embodiments, the sub-region can be selected by the user 108 using a user interface of the vehicle inspection application 612. In some embodiments, the sub-region corresponds to a slice of image data included in a region of interest.

In some embodiments, the sub-region can be determined by identifying features within the frames, such as fiducial marks 460 and 462. In other embodiments, the sub-region can be determined by identifying other features within the frames, for example, a colored border or LEDs positioned around the periphery of the mirror surface 308. In such cases, each frame of the video can be scanned for the predetermined color data, e.g. HSV or HSL values in a three-channel HSV or HSL frame, corresponding to the colored border, and bounding boxes that encompass those pixels having the predetermined color data can be determined. The sub-region can then be determined from the pixel locations of the bounding boxes. In some embodiments, a sub-region corresponding to each frame can be determined by identifying features within the frames. In some embodiments, identification of the sub-region can be performed automatically using features within the frames, such as by the vehicle inspection application 612. In other embodiments, identification of the sub-region can be performed by a user, such as the user 108, using a user interface, such as a user interface via the vehicle inspection application 612.

In some embodiments, the sub-region can be determined using motion detection. For example, a subset of frames can be examined to identify pixels that remain static, e.g. the pixels values do not change or change less than a predetermined tolerance, and to identify pixels that change, e.g. have values that change more than a predetermined tolerance. Pixels identified as "static" can be designated as "background" and pixels identified as "changing" can be designated as "foreground." Bounding boxes can be determined that encompass the "foreground pixels", and the sub-region can then be determined from the pixel locations of the bounding boxes.

In the embodiment shown, at step 714, the sub-regions determined at step 712 are extracted from the frames. In some embodiments, the set of sub-regions extracted from the video frames are sequentially ordered according to the time at which each frame was captured in the video. As such, the set of extracted sub-regions are also sequentially ordered according to location along the length of the vehicle undercarriage for sub-regions that are extracted from video frames of a video capturing a moving vehicle undercarriage from a static viewpoint. In such cases, the first two sub-regions will correspond to the first two positions of the vehicle undercarriage captured in the video.

In the embodiment shown, at step 716, the sub-regions extracted at step 714 are composited to form the vehicle undercarriage composite image. At step 718, user tags related to the vehicle undercarriage composite image are received. In some embodiments, user tags are received from a user, such as user 108, via a user interface of a vehicle inspection application, such as the vehicle inspection application 612. In other embodiments, user tags are received automatically via a vehicle inspection application 612, or automatically by a machine learning component 618. Examples of user tags are described in further detail above with respect to method 200 of FIG. 2 above.

Figure 24:
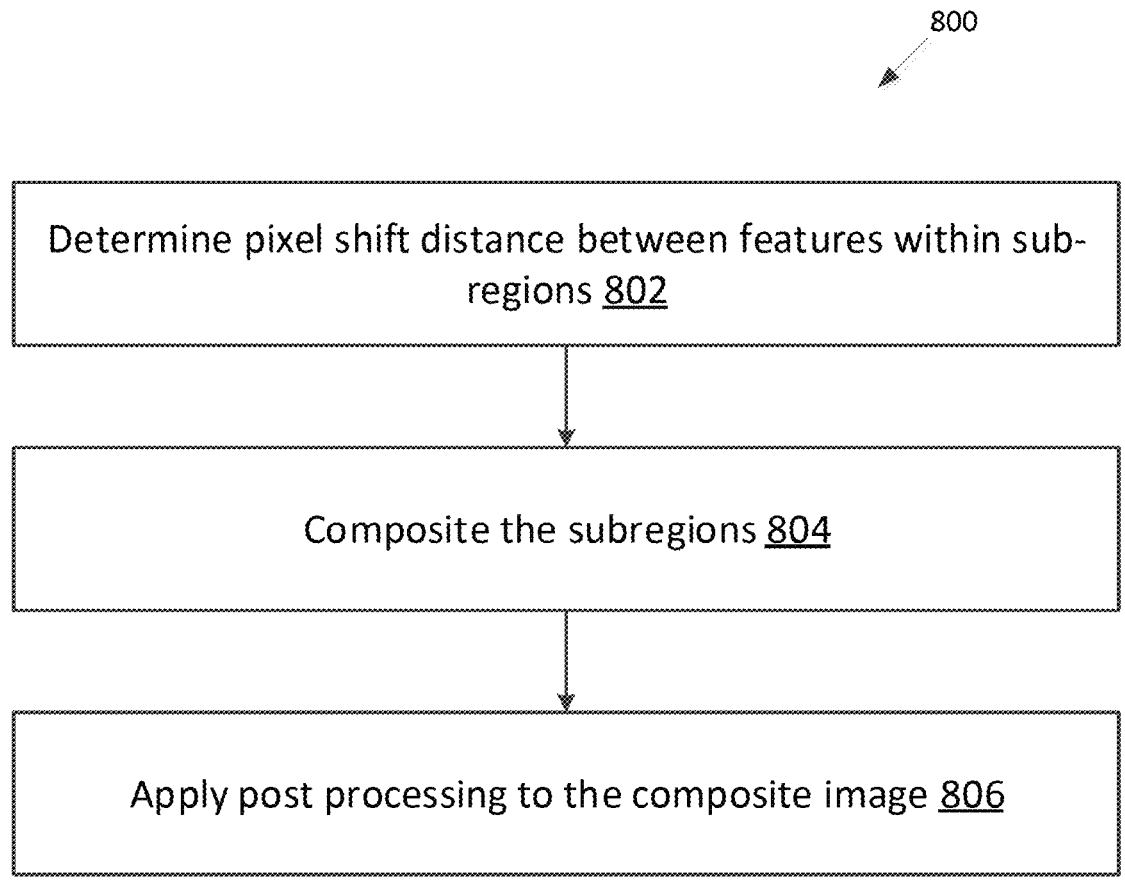
FIG. 24 is a flowchart of a method for compositing sub-regions extracted from video data, according to an example embodiment of the present disclosure.

FIG. 24 is a flowchart of a method 800 for compositing sub-regions extracted from video data, according to an example embodiment of the present disclosure. The method 800 can be performed, for example, at a computing device or a server, such as data consumer devices 122, 124, or 126, a mobile computing device, a server 112 of FIG. 1, and the computing system 600 of FIG. 22. The method 800 is one example of a method that can be used to perform the method step 716 of the method 700 described above and illustrated in FIG. 23.

In the example shown, the method 800 includes determining pixel shift distances between features in the extracted sub-regions at step 802.

In some embodiments, the pixel shift distances can be determined by phase correlation. For example, a fast fourier transform (FFT) can be used to convert the extracted sub-regions into frequency representations in the Fourier domain, e.g. the frequency domain, where phase correlation can be used to determine x-y pixel shift differences between the sub-regions based on the position of maximum phase correlation. In some embodiments, pre-processing can be applied to the extracted sub-regions before applying phase correlation. For example, the sub-regions can be contrast enhanced, converted to grayscale, and edge detection can be performed, such as by performing a Sobel edge detection. In some embodiments, edge detection can filter out "noise" such as image anomalies included in the sub-regions originating from debris or other obstructions or distortions of the view of the vehicle undercarriage during video capture, e.g. dust, water droplets, etc., on the mirror surface 308. In some embodiments, the x-y pixel shift differences include sub-pixel shifts, e.g. shifts that are less than a pixel or include fractional amounts of a pixel.

In other embodiments, the pixel shift distance can be determined using motion vectors calculated from the sub-regions. In some embodiments, In still other embodiments, machine learning can be applied to determine the pixel shift distance. In some embodiments, applying machine learning to determine the pixel shift distance can be robust and accurately determine the pixel shift distance when the sub-regions include "noise" such as dust or water droplets on the mirror surface during video capture.

In some embodiments, the determination of pixel shift distances between features in extracted subregions can be performed at a computing device using open source functions. For example, OpenCV functions performing phase correlation, such as cv::phaseCorrelate, can be used. In some embodiments, open source functions performing processing, such as color conversion, e.g. cv::cvtColor, edge detection, e.g. cv::Sobel and cv::Laplacian, and Gaussian blurring, e.g. cv::GaussianBlur, can be used. In addition, open source functions can provide conversion functionality between open source functions and platform-specific application environments, such as iOS, for example, UIImageToMat( ) and MatToUIImage( ) for converting the extracted sub-regions between image types used in Swift and OpenCV. In some embodiments, open source functions, such as those in OpenCV, use various functions from the NumPy library, and can be used to provide additional application functionality.

In the embodiment shown, at step 804, the sub-regions are composited. In some embodiments, compositing the sub-regions include shifting the sub-regions relative to each other by the pixel shift distances determined in step 802 and blending overlapping pixels to form the composite vehicle undercarriage image. At step 806, post-processing can be applied to the vehicle undercarriage composite image. In some embodiments, post-processing includes cropping extraneous edges, equalizing and adjusting the contrast, brightness, color, and vibrancy of the vehicle undercarriage composite image.

In accordance with the method 800 of FIG. 24, in some embodiments, the pixel shift distances determined in step 802 may be performed across each of the image sub-regions that are used to form the composite vehicle undercarriage image collectively, with all sub-regions composited at step 804 concurrently. In alternative embodiments, subsets of the sub-regions may be analyzed, pixel shift distances computed, and sub-regions composited. For example, in some instances, pixel shift distances between a first and second sub-region are calculated, those two sub-regions are composited, and that composited image is subsequently analyzed with a third sub-region for compositing. Such a process may occur iteratively until an entire composite vehicle undercarriage image is formed. In still further embodiments, a plurality (but not all) sub-regions may be analyzed and composited concurrently, with composite sub-images then further composited to form the overall composite vehicle undercarriage image.

Figure 25:
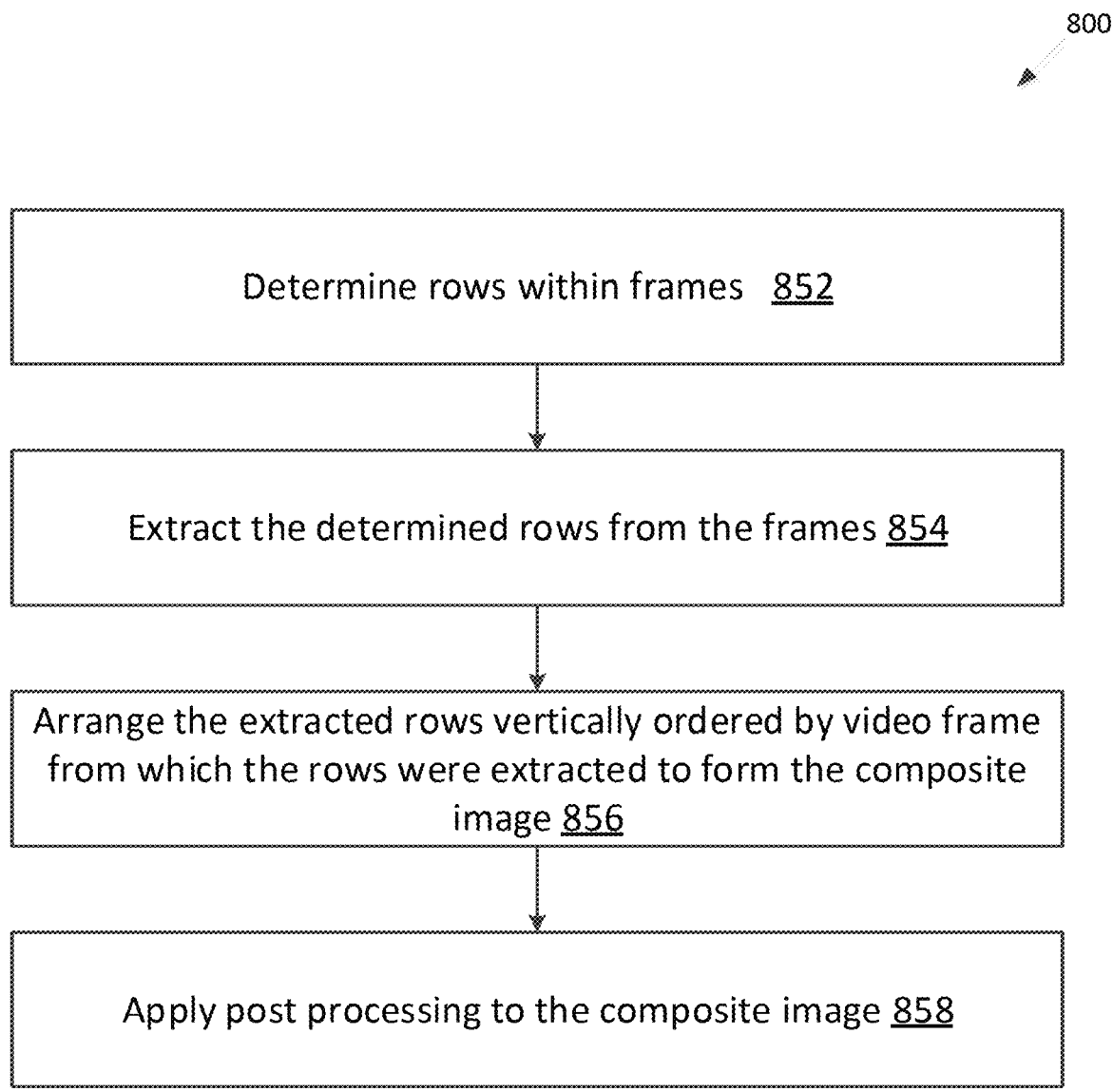
FIG. 25 is a flowchart of another method 850 for compositing sub-regions extracted from video data, according to an example embodiment of the present disclosure.

FIG. 25 is a flowchart of another method 850 for compositing sub-regions extracted from video data, according to an example embodiment of the present disclosure. The method 850 can be performed, for example, at a computing device or a server, such as data consumer devices 122, 124, or 126, a mobile computing device, a server 112 of FIG. 1, and the computing system 600 of FIG. 22. The method 850 is one example of a method that can be used to perform the method steps 712, 714, and 716 of the method 700 described above and illustrated in FIG. 23. The method 850 is analogous to various slit scanning techniques in which a very thin slit is used as an aperture of a film camera along with high-speed film. In general, the method 850 can be used with conventional video imaging techniques, with a small subset of the same rows of pixels, or the same single row of pixels, in each of the captured digital images corresponding to a "slit image." The method 850 has the advantage of enabling the use of a very low profile mirror assembly, such as mirror assembly 104 having a very small height H as illustrated in FIG. 3.

In the example shown, the method 850 includes determining rows within frames of vehicle undercarriage digital video at step 852. In some embodiments, a single row is determined, and in other embodiments a subset of rows are determined. Generally, the row or rows are determined for all of the frames, e.g. the pixel locations of the sub-region are the same in each of the individual frames. In some embodiments, as described above with respect to method step 802, the individual frames of vehicle undercarriage video are sequentially ordered according to the time at which each frame was captured in the video. As such, the set determined rows within the frames are also sequentially ordered according to location along the length of the vehicle undercarriage for rows that are extracted from video frames of a video capturing a moving vehicle undercarriage from a static viewpoint. In some embodiments, the rows can be determined by selecting the row or rows, identifying features with the frames, and using motion detection, as described in more detail above with respect to method step 712. At step 854, the row or rows determined at step 852 are extracted from the frames. At step 856, the row or rows extracted at step 854 are arranged vertically in sequential order by frame from which the row or rows were extracted to form the composite image of the vehicle undercarriage. At step 858, user tags related to the vehicle undercarriage composite image are received. Examples of user tags are described in further detail above with respect to method 200 of FIG. 2 above.

FIGS. 26-34 illustrate an example user interface, such as a user interface of a vehicle inspection application 612. The user interface, and associated screens described below, illustrate operation of the vehicle inspection application in accordance with the methods 700, 800 described above in connection with FIGS. 22-24.

Figure 26:
FIG. 26 is an image of user interface screen for receiving input to open a new vehicle undercarriage image file, according to an example embodiment of the present disclosure.

FIG. 26 is an image of user interface screen 900 for receiving input to open a new vehicle undercarriage image file, according to an example embodiment of the present disclosure. The user interface screen 902 is an example of a screen that can be used to perform the method step 702 further described above and illustrated in FIG. 23. In the embodiment shown, the user interface screen 900 includes a button 902 which the user 108 can touch, e.g. using a mobile device having a touch screen enabled to receive touch input and displaying the user interface screen 900.

Figure 27:
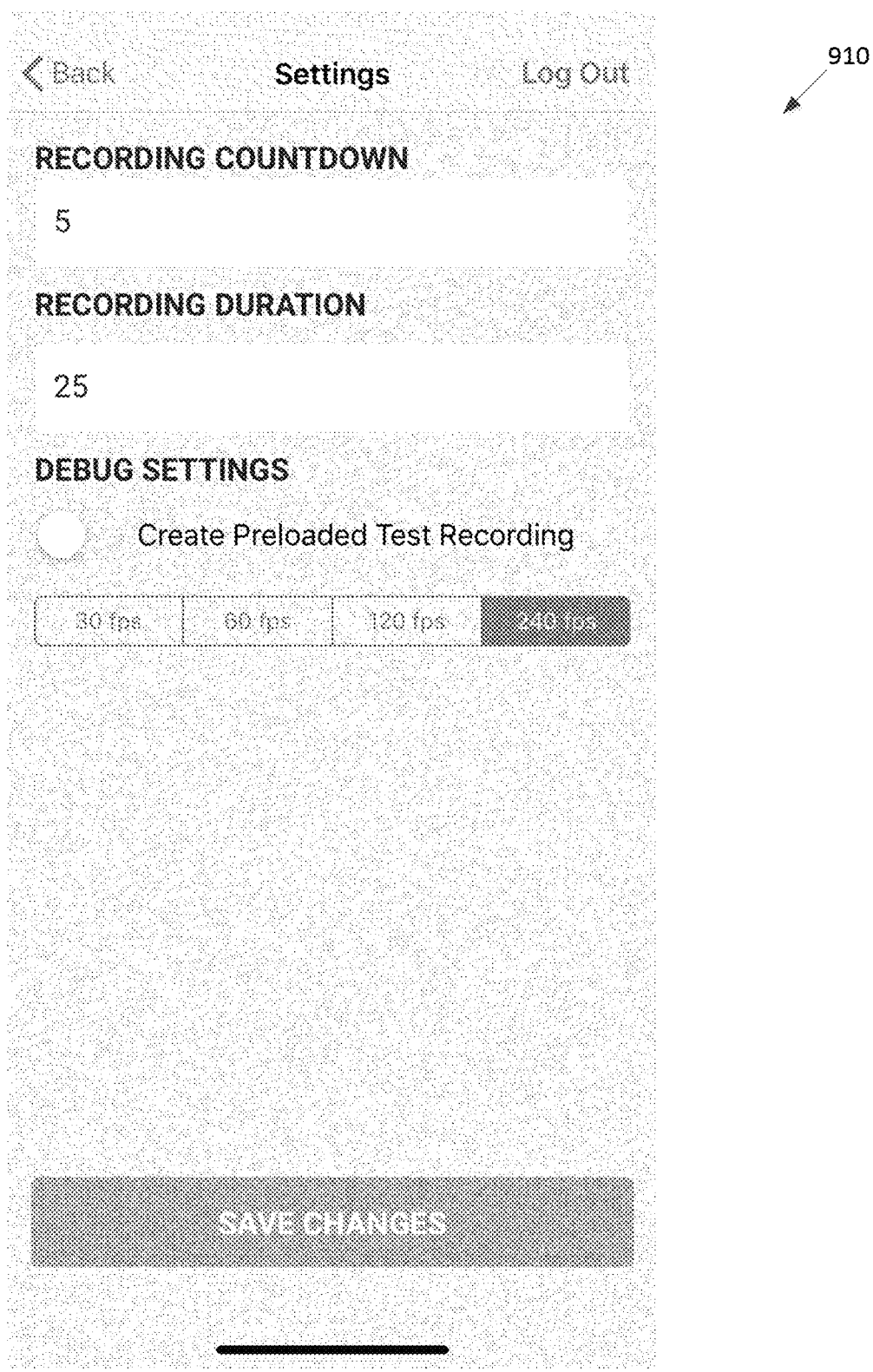
FIG. 27 is an image of user interface screen for receiving vehicle undercarriage data capture settings, according to an example embodiment of the present disclosure.

FIG. 27 is an image of user interface screen 910 for receiving vehicle undercarriage data capture settings, according to an example embodiment of the present disclosure. The user interface screen 910 is an example of a screen that can be used to perform the method step 704 further described above and illustrated in FIG. 23. In the embodiment shown, the user interface screen 900 includes a "recording countdown" text field, a "recording duration" text field, a series of frame rate toggle buttons, and a "save changes" button. In some embodiments, recording countdown in units of seconds can be entered as text in the recording countdown text field, the recording duration in seconds can be entered in the recording duration text field, the frame rate can be selected, and the settings can be save changes button can be selected to save the entered settings. In some embodiments, the recording countdown corresponds to a delay time, for example, to allow a user 108 to initiate recording using a mobile device having a camera 106 and get in the vehicle 110.

Figure 28:
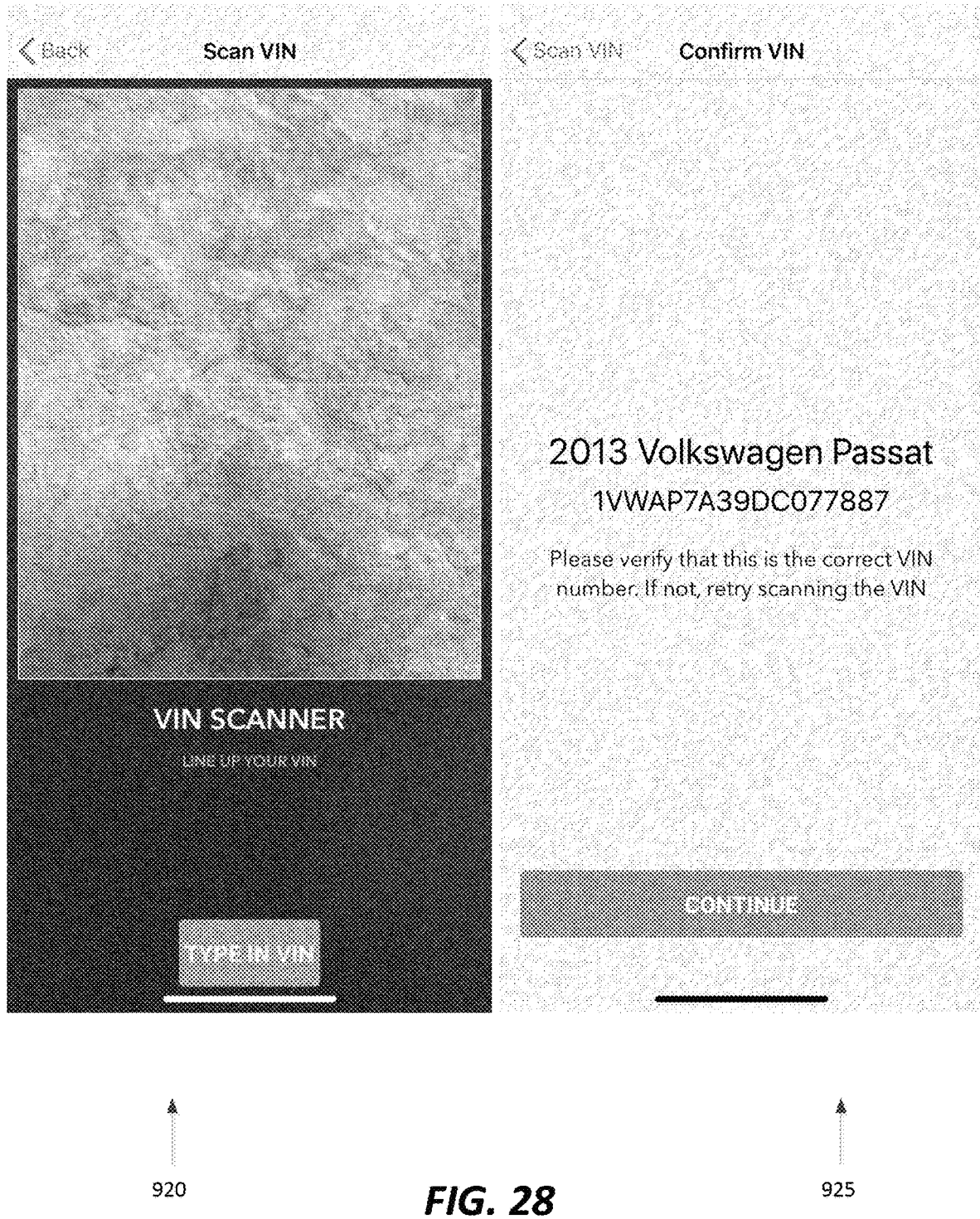
FIG. 28 is an image of user interface screens for scanning the VIN and an image of a user interface screen for verifying the scanned VIN, according to an example embodiment of the present disclosure.

FIG. 28 is an image of user interface screens 920 for scanning the VIN and an image of a user interface screen 925 for verifying the scanned VIN, according to an example embodiment of the present disclosure. The user interface screens 920 and 925 are examples of a screens that can be used to perform the method step 706 further described above and illustrated in FIG. 23. In the embodiment shown, the user interface screen 920 also includes the option to manually enter the VIN.

Figure 29:
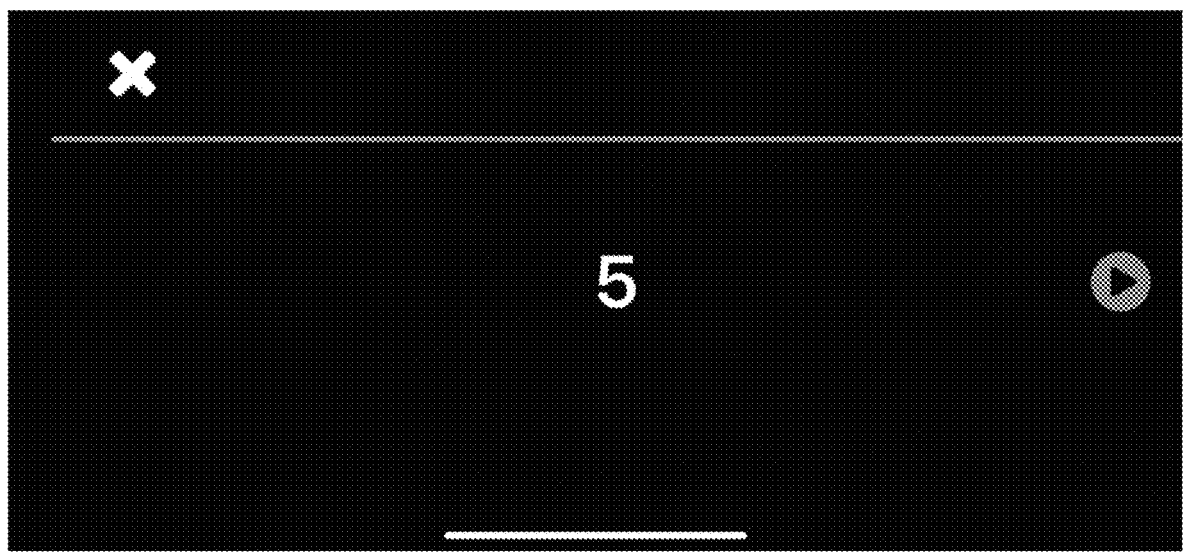
FIG. 29 is an image of user interface screen for recording vehicle undercarriage video, according to an example embodiment of the present disclosure.

FIG. 29 is an image of user interface screen 930 for recording vehicle undercarriage video, according to an example embodiment of the present disclosure. The user interface screen 930 is an example of a screen that can be used to perform the method step 708 further described above and illustrated in FIG. 23.

Figure 30:
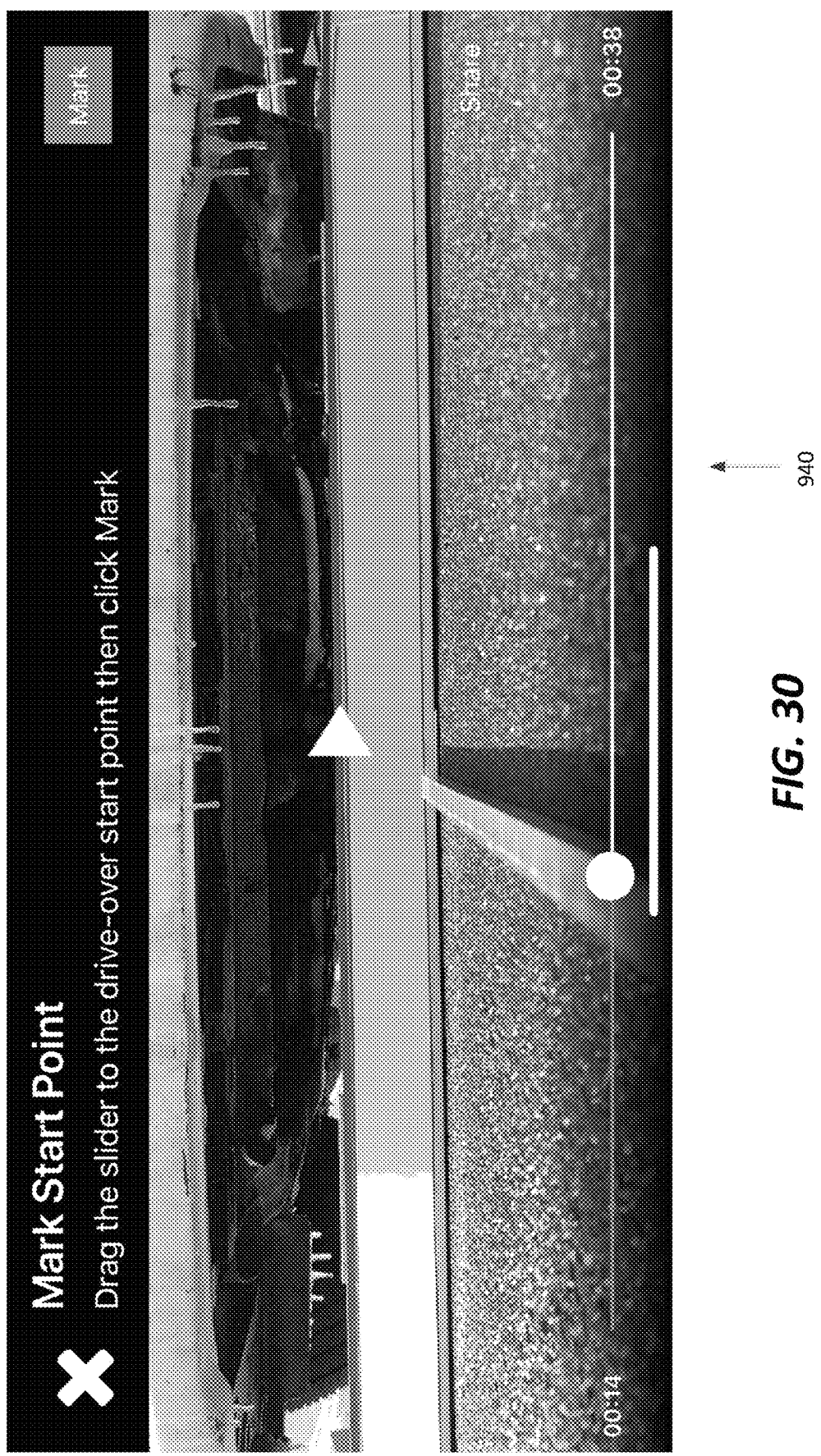
FIG. 30 is an image of user interface screen for receiving a starting point of a video from which frames are to be extracted, according to an example embodiment of the present disclosure.
Figure 31:
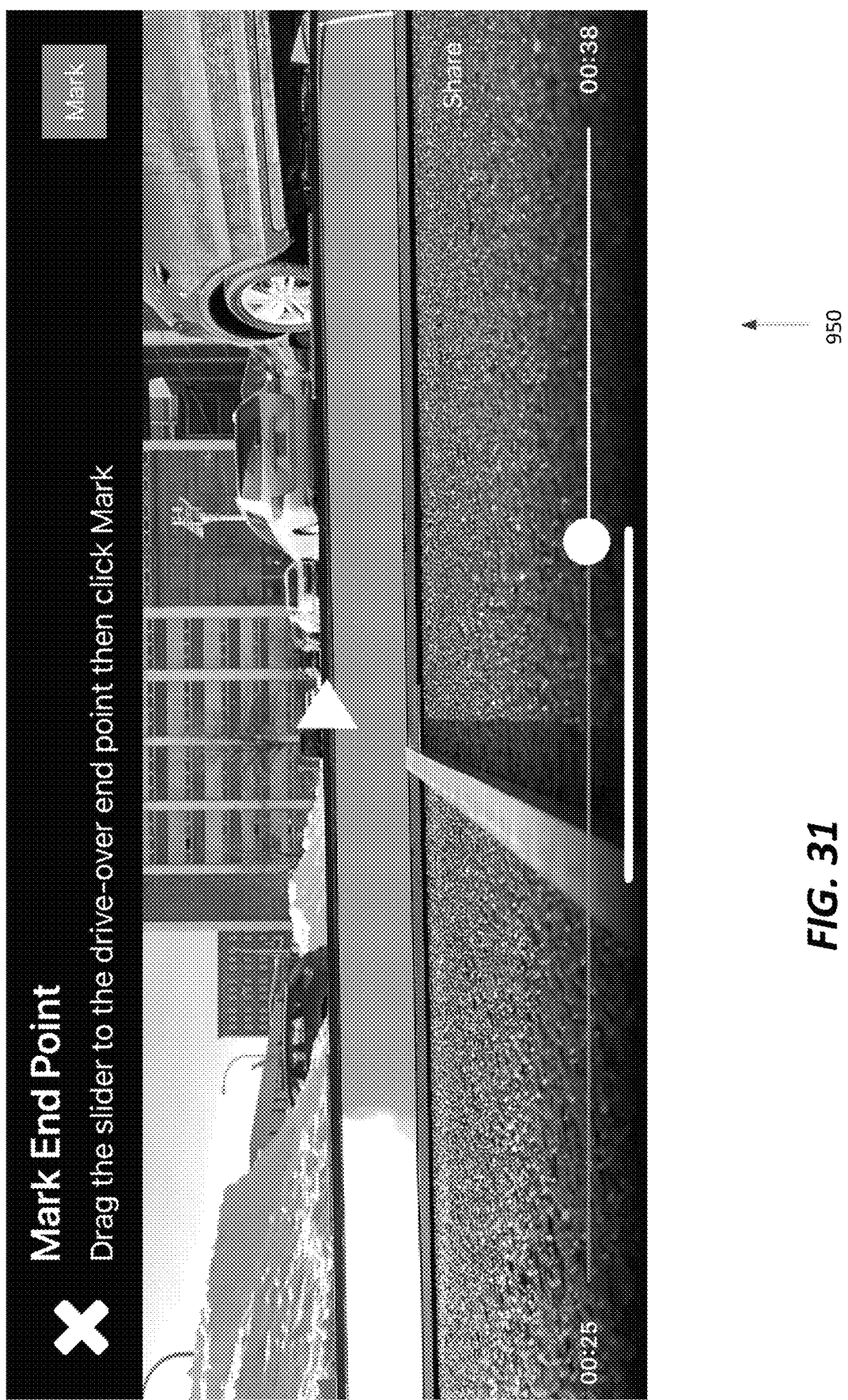
FIG. 31 is an image of user interface screen for receiving an ending point of a video from which frames are to be extracted, according to an example embodiment of the present disclosure.

FIG. 30 is an image of user interface screen 940 for receiving a starting point of a video from which frames are to be extracted, according to an example embodiment of the present disclosure. FIG. 31 is an image of user interface screen 950 for receiving an ending point of a video from which frames are to be extracted, according to an example embodiment of the present disclosure. The user interface screens 940 and 950 are example screens that can be used to perform the method step 710 further described above and illustrated in FIG. 23.

FIG. 32 is an image of user interface screen 960 for determining a sub-region 968 within each of the individual frames of an extracted set of frames from a video and a user interface screen 965 for displaying the determined sub-region 968, according to an example embodiment of the present disclosure. The user interface screens 960 and 965 are example screens that can be used to perform the method step 712 further described above and illustrated in FIG. 23. In some embodiments, the user interface screen 960 can be used by a user 108 to select a region of interest to be extracted as the sub-region 968.

FIG. 33 is an image of user interface screen 970 for displaying an extracted sub-region 968 and a user interface screen 975 for displaying image compositing progress, according to an example embodiment of the present disclosure. The user interface screen 970 is an example screen that can be used in connection with the method step 714 further described above and illustrated in FIG. 23. The user interface screen 975 is an example screen that can be used in connection with the method step 716 further described above and illustrated in FIG. 23.

Figure 34:
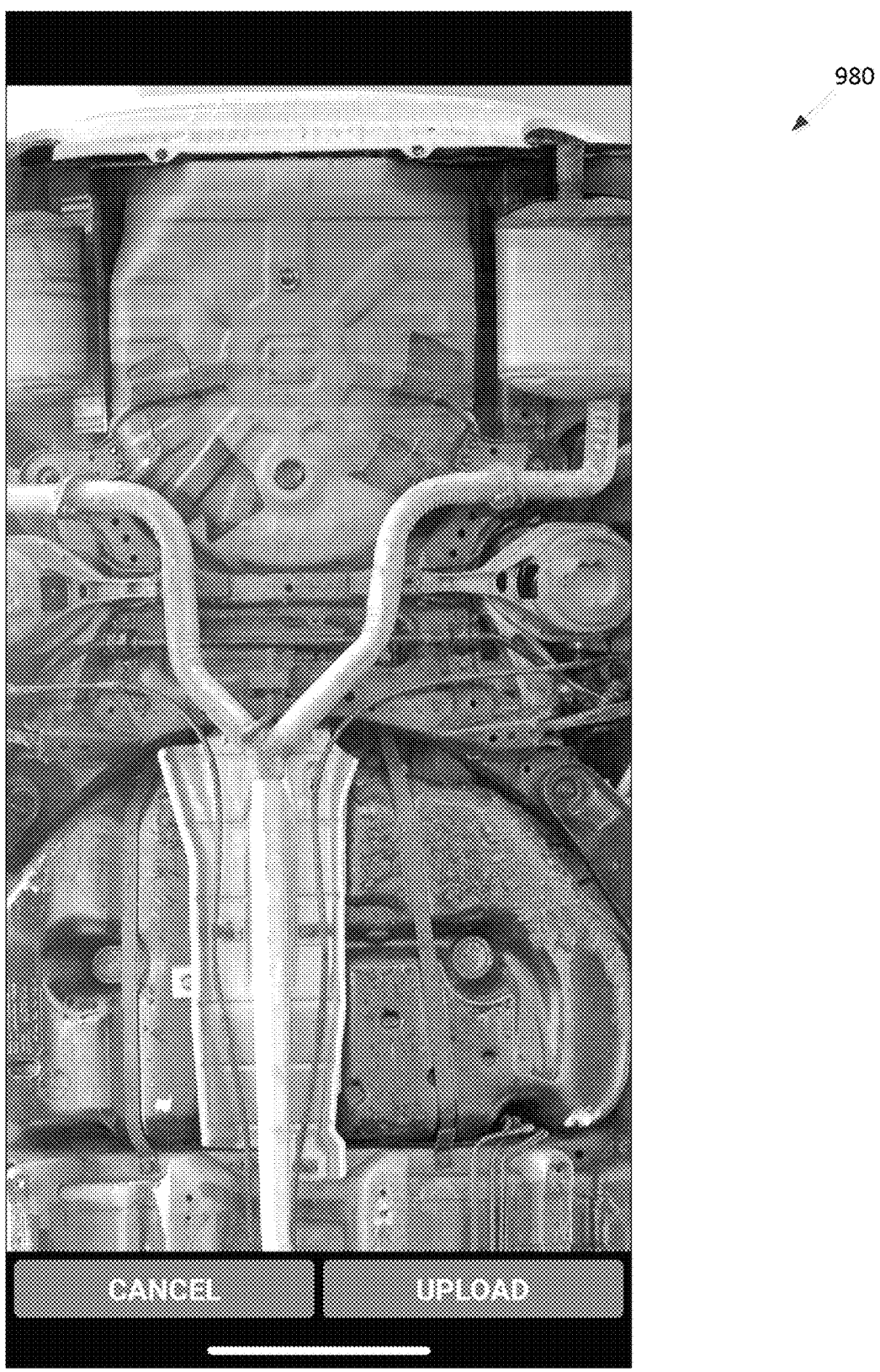
FIG. 34 is an image of user interface screen for uploading a vehicle undercarriage composite image, according to an example embodiment of the present disclosure.

FIG. 34 is an image of user interface screen 980 for uploading a vehicle undercarriage composite image, according to an example embodiment of the present disclosure. For example, the user 108 may select the upload button illustrated in FIG. 34, causing the vehicle inspection application 612 to transfer the vehicle undercarriage composite image to a mobile device, data consumer devices 122, 124, or 126, or a server 112 for storage and further processing or distribution.

Figure 35:
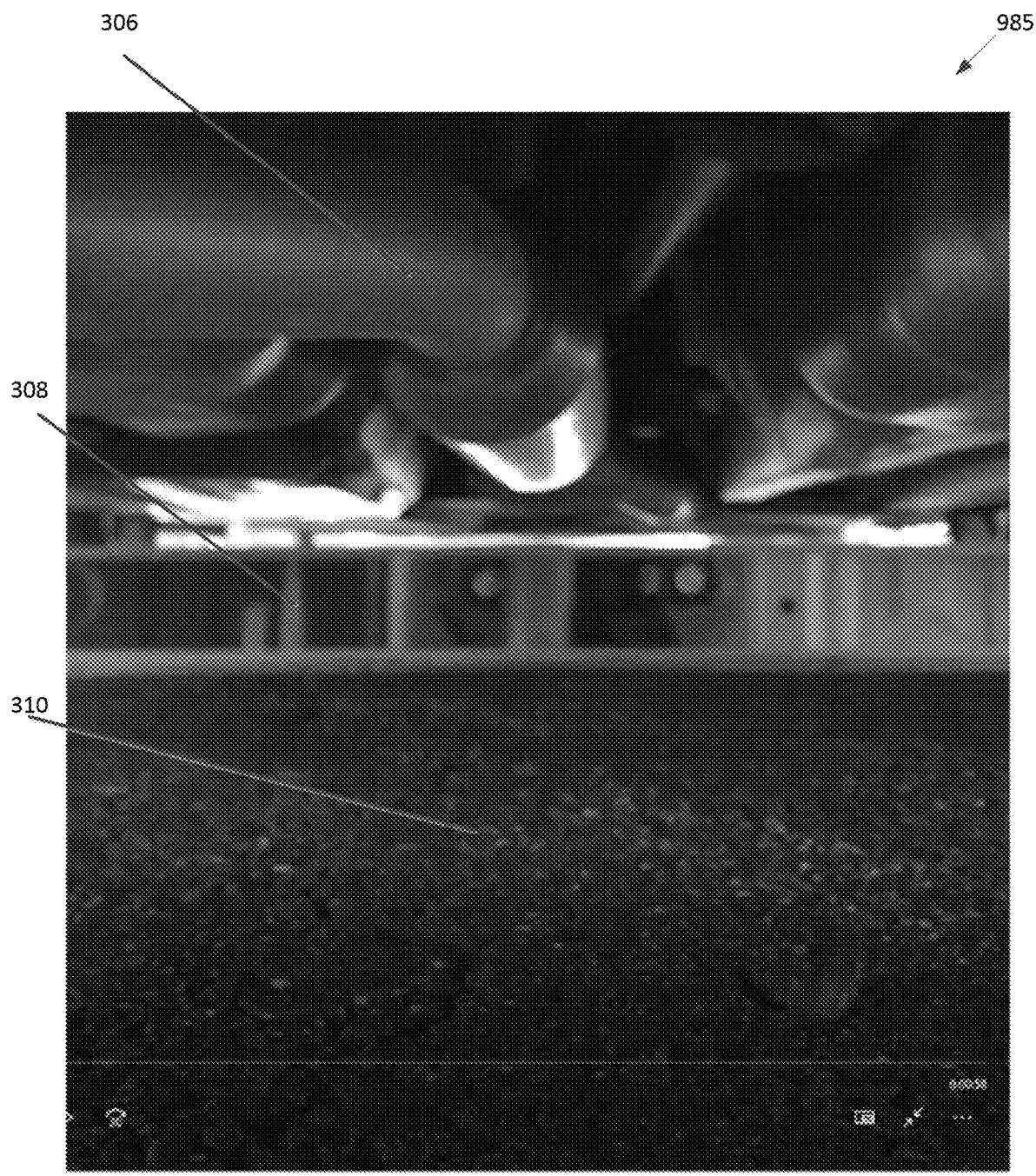
FIG. 35 is an image of a user interface screen for playback of recorded vehicle undercarriage video, according to an example embodiment of the present disclosure.

FIG. 35 is an image of a user interface screen 985 for playback of recorded vehicle undercarriage video, according to an example embodiment of the present disclosure. The example shown in FIG. 35 illustrates a frame of vehicle undercarriage video and shows the perspective view of the camera 106 during video capture. The image shown in FIG. 35 includes a direct view of a vehicle undercarriage 306, a worm's eye view of a portion of the vehicle undercarriage reflected in a mirror surface 308, and a view of a surface 310 on which the vehicle resides.

Figure 36:
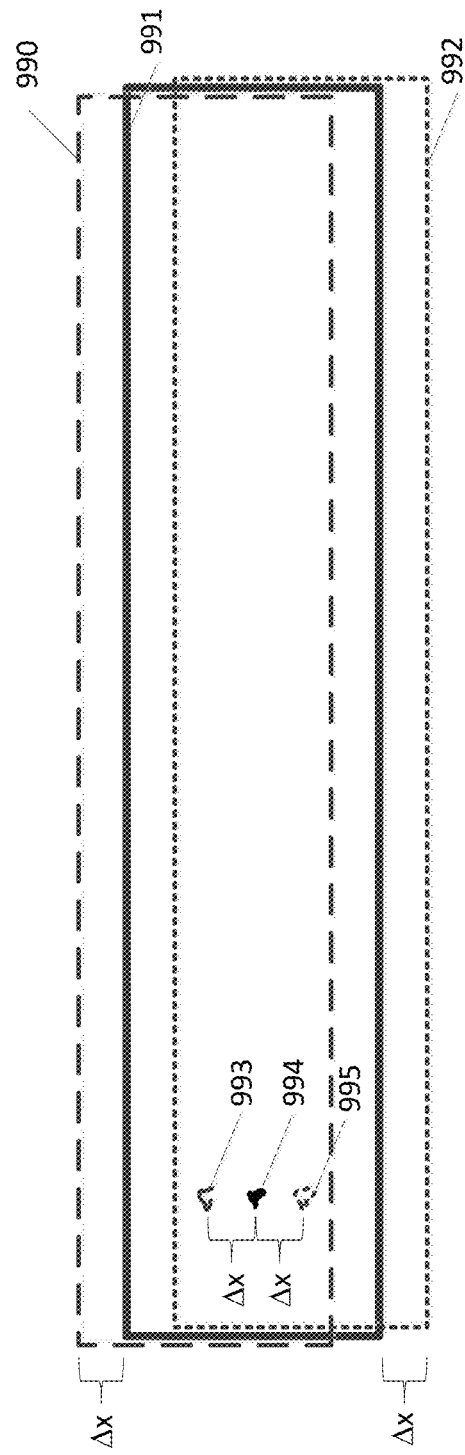
FIG. 36 is a schematic illustration of correcting sub-regions having anomalies due to the mirror surface including debris, according to an example embodiment of the present disclosure.

FIG. 36 is a schematic illustration of correcting sub-regions having anomalies due to the mirror surface 408 including debris, according to an example embodiment of the present disclosure. The example shown in FIG. 36 includes sub-regions 990, 991, and 992, and anomalies 993, 994, and 995. The sub-regions 990, 991, and 992 represent sub-regions of frames of video data captured in successive order as a vehicle undercarriage is passing through a field of view including the sub-regions, such as video data captured using the vehicle undercarriage imaging system described above with respect to FIG. 3. The portion of the vehicle undercarriage captured in the sub-regions 990, 991, and 992 is shifted along the length of the undercarriage by some distance $\Delta x$, and is represented in FIG. 36 as a vertical shift $\Delta x$ of the sub-regions 990, 991, and 992. The anomalies 993, 994, and 995 correspond to an area and location on the mirror surface having debris. The anomaly 993 corresponds to the sub-region 990, the anomaly 994 corresponds to the sub-region 991, and the anomaly 995 corresponds to the sub-region 992.

In the example shown, each of the anomalies 993-995 are of the same area and occur at the same location relative to their respective sub-region because they are caused by debris on the mirror surface, however, the portion of the vehicle undercarriage affected by the anomalies 993-995 changes because of the shift $\Delta x$ along the length direction due to the vehicle passing over the mirror surface during video capture. As such, in some embodiments, the location and area of the image of the portions of the vehicle undercarriage affected by the anomaly 994 in the sub-region 991 is not affected in the sub-region 990 or the sub-region 992 because that portion of the vehicle undercarriage is at a different location in those sub-regions. In some embodiments, the anomalies 993-995 can be corrected by replacing the affected area in the respective sub-regions using locations in other sub-regions corresponding to the same location and area of the portion of the vehicle undercarriage that are included in those other respective sub-regions but not affected by any anomaly.

Figure 37:
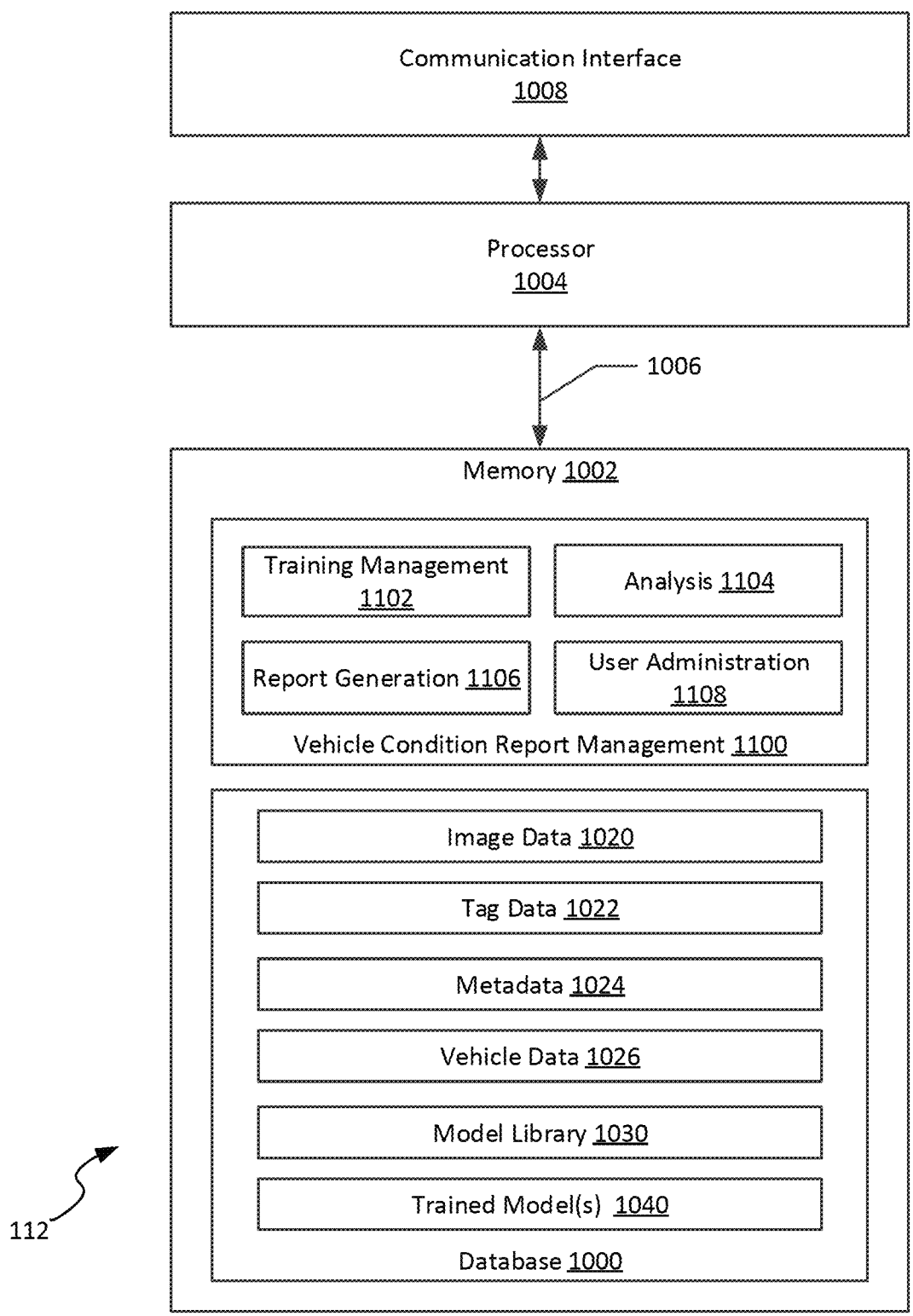
FIG. 37 is a schematic illustration of a server, according to an example embodiment of the present disclosure.
Figure 38:
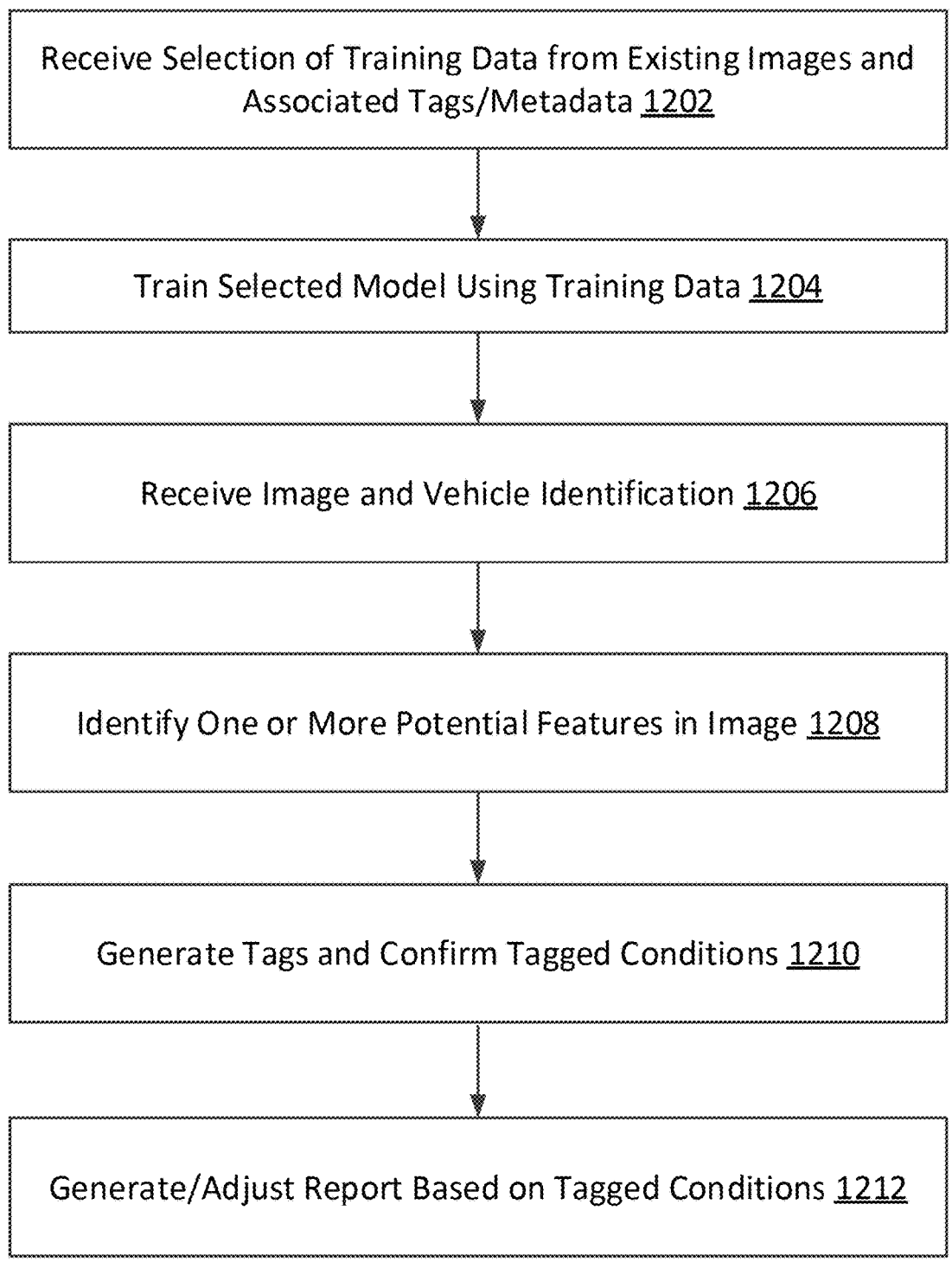
FIG. 38 is a flowchart of a method of analyzing composite vehicle undercarriage images, according to an example embodiment.

Referring now to FIGS. 37-38, example applications of the vehicle undercarriage imaging system described herein are provided. In example aspects, captured vehicle undercarriage images can be tagged with the identifying information associated with the vehicle make and model, as well as features identified in the images. The features identified may be, for example, based on degradation, such as corrosion, frame damage, fluid leaks, or other types of issues that may negatively affect vehicle valuation. The features identified may also be aftermarket changes to the vehicle that are visible in the undercarriage, such as enhanced suspension components, modified exhaust systems, or other features.

In FIG. 37, additional details regarding server 112 are shown. In the example shown, server 112 hosts a database 1000, which stores composite vehicle undercarriage images from mobile devices in the manner described above. The server 112 can, as noted above, generate reports and perform analysis that integrates information from those composite vehicle undercarriage images.

In the example shown, the database 1000 is stored in a memory 1002 alongside a vehicle condition report management tool 1100. A processor 1004 is communicatively connected via a bus 1006 to the memory, and executes instructions stored in the memory, including instructions defining the vehicle condition report management tool 1100. A communication interface 1008 allows the server 112 to communicate with other devices, e.g., to receive the composite vehicle undercarriage images and provide vehicle condition reports to other devices.

In the embodiment shown, the database 1000 stores image data 1020, tag data 1022, and metadata 1024, alongside other vehicle data 1026. The image data 1020 generally includes the composite vehicle undercarriage images uploaded to the database 1000 from one or more mobile devices or other computing systems at which the images are captured and created. The image data 1020 therefore generally corresponds to the composite vehicle undercarriage images from each of a plurality of different vehicle makes and models.

The tag data 1022 includes one or more tags associated with at least some of the images. The tags included in the tag data 1022 may be associated with the image overall, or may be associated with a particular location or region within the associated composite vehicle undercarriage image. For example, a tag associated with an image may indicate the presence of corrosion on a vehicle undercarriage generally, or may be associated with a location in the image where such corrosion is apparent. In the example embodiments, and as discussed above, tags included in the tag data 1022 may be associated with undercarriage images by a user prior to upload of the image and tag. Additionally, in some embodiments tags may be automatically associated with particular images. In such embodiments, image analysis may be performed to identify features in the vehicle undercarriage images. Such image analysis may be based on, for example, providing images to a trained model of vehicle undercarriage images which can then suggest one or more tags that may be appropriate to be associated with a particular composite vehicle undercarriage image.

The metadata 1024 represents other information that may be associated with specific composite vehicle undercarriage images. For example, the metadata 1024 may include, for example, a time and date of image capture, and other information inherent in the image, for example, the device used to capture the image, location (latitude/longitude), etc. Additionally, metadata 1024 may include additional information that a user capturing the image may wish to associate with the image, for example, a vehicle identification number (VIN) that uniquely identifies the vehicle, or other information known about the vehicle, such as regarding features (e.g., corrosion, frame damage, leaks, post-purchase suspension/exhaust modifications, etc.) or known problems with the vehicle, such as issues regarding the operating condition of the vehicle.

The vehicle data 1026 can include other information associated with the vehicle that may be obtained and linked to the image data 1020, tag data 1022, and metadata 1024. The vehicle data can include, for example, other condition information entered into a vehicle inspection application, such as the vehicle undercarriage imaging application described above with respect to FIGS. 22-30. For example, the vehicle condition report can include ownership records, images of the interior and exterior of the vehicle, maintenance records and other vehicle information. Such information can be the basis of a suggested value for the vehicle, or can be used by prospective purchasers to make informed bids regarding the vehicle.

In accordance with some embodiments, and to support machine-learning based image analysis of the composite vehicle undercarriage images, the database 1000 stores, in the example shown, a model library 1030 and one or more trained models 1040. Generally, the model library 1030 stores one or more possible machine learning models that may be selected for use in analyzing the composite vehicle undercarriage images for purposes of automatically identifying features in those images. Example models that may be selected include, for example deep learning models and regression models, although other models may be utilized as well.

The trained models 1040 can include one or more models that are useable to identify features in composite vehicle undercarriage images. For example, a model selected from the model library may be trained with a set of training data drawn from the image data 1020, tag data 1022, and metadata 1024 to identify features in a composite vehicle undercarriage image.

In some examples, a selected model is trained on composite vehicle undercarriage images for a particular make and model of vehicle, including images of new vehicles and images of vehicles having features (e.g., degradation or enhanced features) that are tagged (i.e., images having tag data associated therewith in the database 1000). In other examples, two or more models are trained on composite vehicle undercarriage images for such a make/model, and either a composite model may be formed, or a best candidate may be selected from the trained models 1040.

In still further examples, one or more selected models may be trained on a subset of data across a plurality of makes/models of vehicles, such as a particular class of vehicles (e.g., passenger cars), a particular manufacturer, or on some other basis. Training a model on a wider variety of types of vehicles may allow the model to automatically detect a vehicle make/model from the vehicle undercarriage image (from among the trained vehicle makes/models) as well as to identify features in that image.

In accordance with the present disclosure, each of the various types of data 1020-1026 can be used in various combinations for training a model which can in turn be used to automatically identify features in vehicle undercarriage images. This may include automatically suggesting potential tags associated with features detected in the composite vehicle undercarriage images, for optional confirmation by a user. Such automatically identified features may be the basis for adjusting an estimated value for a vehicle, or determining an expected sale price of the vehicle based on sales prices of vehicles having similar make/model information and similar combinations of tags applied thereto.

Still referring to FIG. 37, the vehicle condition report management tool 1100 includes a training manager 1102, an analysis module 1104, a report generator 1106, and a user administration tool 1108.

The training manager 1102 manages selection of training data and selection of a model to be trained from the database 1000 for purposes of generating trained models 1040. In example embodiments, the training manager 1102 can periodically assess and retrain models included among the trained models 1040, or replace trained models with improved trained models, according to predetermined criteria (e.g., age or accuracy of the model, or amount/type of training data used).

The analysis module 1104 accesses one or more trained models and one or more composite vehicle undercarriage images to be analyzed, and provides the image to the trained models for purposes of generating one or more suggested feature tags for that image, as noted above. The analysis module 1104 can perform, for example analysis of vehicle undercarriage features and adjust additional descriptive data associated with the vehicle, for example by detecting a type of the vehicle, make/model, features, etc. Additionally, an estimated value for the vehicle can be adjusted by the analysis module 1104 as well in response to detected features or a detected identification of the vehicle based on the undercarriage images.

The report generator 1106 generates vehicle condition reports that can be accessed by users. The vehicle condition reports are generally specific to a particular vehicle, and can include detailed information about the vehicle including, but not limited to, the types of information described above as being stored in database 1000. Such reports may be made available to users of the vehicle inspection application having a predetermined set of access rights defined using a user administration tool 1108.

The user administration tool 1108 generally allows users access to upload or access data in the database 1000. For example, the user administration tool 1108 controls access rights for vehicle inspectors to be able to upload information to the database or modify information in the database as to vehicles that inspector may be associated with (e.g., that he/she inspected), or for prospective bidders to access vehicle condition reports. Various other user roles may be defined and enforced via user account-based authentication as well.

Referring to FIG. 37 generally, it is noted that although certain functionality is described herein, other types of functions could be performed at server 112 as well. For example, some or all of the image processing techniques described above in connection with FIGS. 25-33 may be performed at a server, as an alternative to performing such operations at an inspection device (e.g., a mobile device useable in connection with a vehicle undercarriage imaging system described herein).

Referring to FIG. 38, a generalized method 1200 of analyzing composite vehicle undercarriage images is described, according to an example embodiment. The method 1200 analyzes a subset of available composite vehicle undercarriage images and associated data (e.g., the data described above in connection with database 1000) to allow features to be detected in subsequently-analyzed composite vehicle undercarriage images.

In the example shown, the method 1200 includes receiving a selection of training data from the data in the database (step 1202). The selection of training data can include selecting all or some portion of the available data from existing, tagged composite vehicle undercarriage images. A machine learning model may them be selected from the model library 1030 and trained using the selected training data (step 1204), providing a trained model.

Upon completion of model training, the server may receive a composite vehicle undercarriage image, and optionally a vehicle identification (step 1206). Based on the received information, one or more potential features are identified using a selected trained model (step 1208). As noted above, a variety of features can be identified in association with the image generally or a specific region within the image. In some examples, the trained model can also be used to validate the make/model of vehicle as being correctly associated with the vehicle identification that is received.

In the embodiment shown, the identified features can be used to automatically generate tags that are to be associated with the image (step 1210). Optionally, those tags that are automatically generated may be presented to the user who uploaded the composite vehicle undercarriage image (e.g., by transmitting the tags and optionally a copy of the image back to a mobile device of that user) for confirmation that the proposed tags are correct or appropriate. In other examples, the automatically generated tags are associated directly with the image with no confirmation required. In addition, other information regarding a vehicle may be stored in the database 1000 based on detection of attributes of the vehicle from the images.

Once tags are applied and optionally confirmed, the method 1200 may proceed to generate a vehicle condition report that includes the tagged composite vehicle undercarriage images (step 1212). This may also include adjusting other data that might be included in the vehicle condition report, for example by adjusting an estimated value of the vehicle up or down based on the types of features identified in and tagged in the composite vehicle undercarriage image, based on a regional pricing adjustment for the region from which the image is received (e.g., based on metadata 1024 associated with the image), and comparison to prices of other vehicles having similarly tagged features and other descriptive metadata.

Referring to FIGS. 37-38 generally, it is noted that the server-based processing methods described herein have a number of advantages over existing vehicle condition analysis tools, in particular when used in conjunction with the systems and apparatuses described above. For example, a vehicle condition inspector may quickly capture an image of an undercarriage of a vehicle and a vehicle identification number, provide that information to a server, and the server may perform a number of analyses on that data to determine features of an identifying characteristics of the vehicle being inspected. Accordingly, not only are improved undercarriage images obtained, but suggested features may be presented to an inspecting user, simplifying their analysis of the vehicle undercarriage. Furthermore, as models improve at accurately detecting features (as more training data becomes available), the importance that an inspector to accurately identify all features in a vehicle undercarriage is lessened because the image analysis tools provided herein will identify such features based on the library of identified features and trained models. With respect to application users who are prospective bidders on the vehicle (consumers of vehicle condition reports), the features may, for example, be used to provide objective adjustments to vehicle value based on sales of other vehicles of the same make/model and having similar feature sets, which is information not typically exposed to such users. Other advantages are apparent as well throughout the application.

Figure 39:
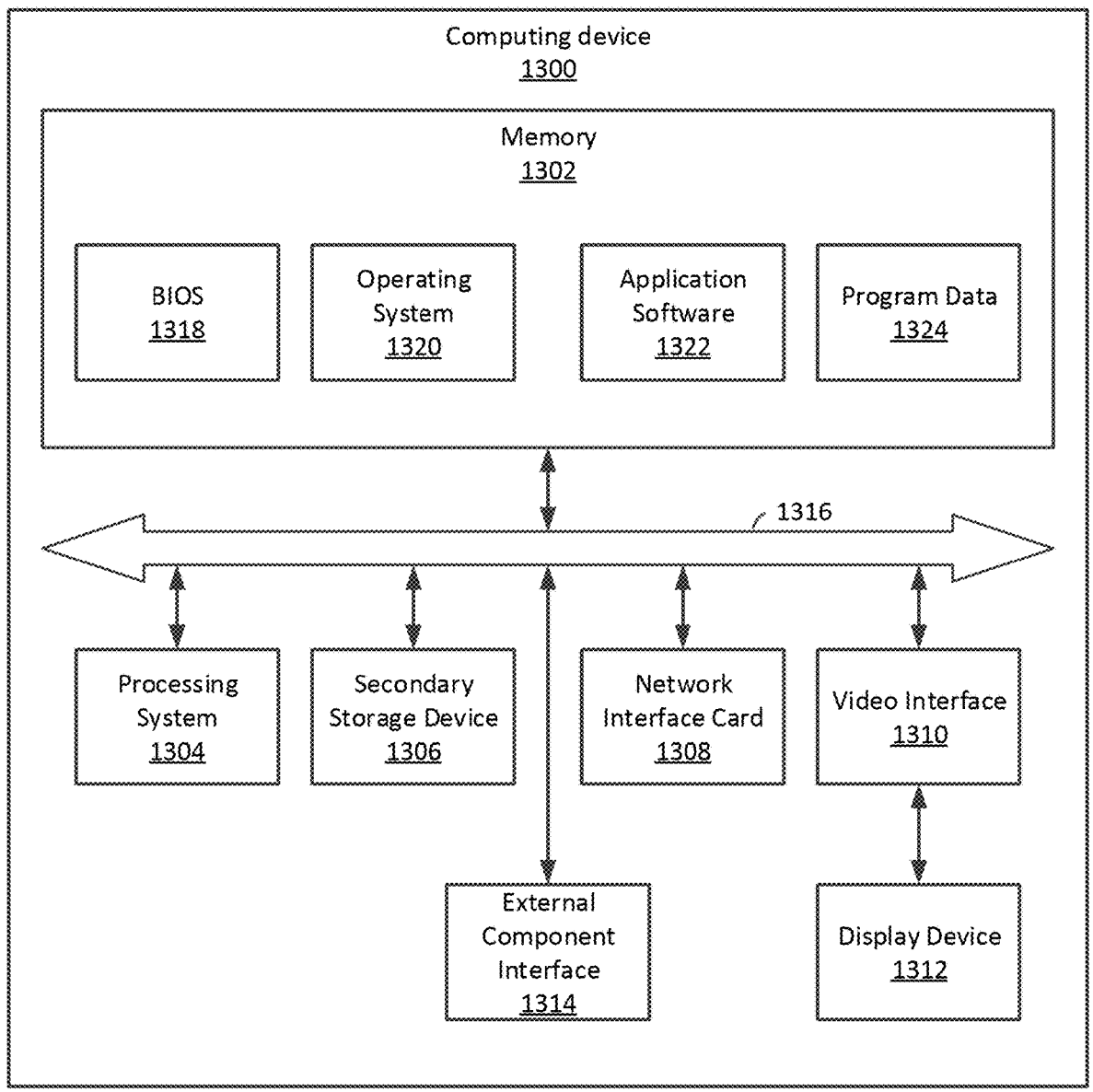
FIG. 39 is a schematic illustration of an example discrete computing system in which aspects of the present disclosure can be implemented.

Referring now to FIG. 39, a schematic illustration of an example discrete computing system in which aspects of the present disclosure can be implemented. The computing device 1300 can represent, for example, a native computing system within which server 112 can be implemented, or an implementation of a mobile device, or data consumer devices 122, 124, or 126. In particular, the computing device 1300 represents the physical construct of an example computing system at which a mobile device or server could be established. In some embodiments, the computing device 1300 implements virtualized or hosted systems, and executes one particular instruction set architecture while being used to execute non-native software and/or translate non-native code streams in an adaptive manner, for execution in accordance with the methods and systems described herein.

In the example of FIG. 39, the computing device 1300 includes a memory 1302, a processing system 1304, a secondary storage device 1306, a network interface card 1308, a video interface 1310, a display unit 1312, an external component interface 1314, and a communication medium 1316. The memory 1302 includes one or more computer storage media capable of storing data and/or instructions. In different embodiments, the memory 1302 is implemented in different ways. For example, the memory 1302 can be implemented using various types of computer storage media.

The processing system 1304 includes one or more processing units. A processing unit is a physical device or article of manufacture comprising one or more integrated circuits that selectively execute software instructions. In various embodiments, the processing system 1304 is implemented in various ways. For example, the processing system 1304 can be implemented as one or more physical or logical processing cores. In another example, the processing system 1304 can include one or more separate microprocessors. In yet another example embodiment, the processing system 1304 can include an application-specific integrated circuit (ASIC) that provides specific functionality. In yet another example, the processing system 1304 provides specific functionality by using a field-programmable gate array (FPGA) or ASIC. In still another example, the processing system 1304 can include one or more special purpose processors such as general purpose graphics processing units (GPGPUs), vector processors, with a single instruction stream single data (SISD) architecture processor, single instruction stream multiple data (SIMD) architecture processor, multiple instruction single data (MISD) architecture processor, and multiple instruction multiple data (MIMD) architecture processor, or non-Von Neumman processor, etc.

The secondary storage device 1306 includes one or more computer storage media. The secondary storage device 1306 stores data and software instructions not directly accessible by the processing system 1304. In other words, the processing system 1304 performs an I/O operation to retrieve data and/or software instructions from the secondary storage device 1306. In various embodiments, the secondary storage device 1306 includes various types of computer storage media. For example, the secondary storage device 1306 can include one or more magnetic disks, magnetic tape drives, optical discs, solid state memory devices, and/or other types of computer storage media.

The network interface card 1308 enables the computing device 1300 to send data to and receive data from a communication network. In different embodiments, the network interface card 1308 is implemented in different ways. For example, the network interface card 1308 can be implemented as an Ethernet interface, a token-ring network interface, a fiber optic network interface, a wireless network interface (e.g., WiFi, WiMax, etc.), or another type of network interface.

The video interface 1310 enables the computing device 1300 to output video information to the display unit 1312. The display unit 1312 can be various types of devices for displaying video information, such as an LCD display panel, a plasma screen display panel, a touch-sensitive display panel, an LED screen, a cathode-ray tube display, or a projector. The video interface 1310 can communicate with the display unit 1312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 1314 enables the computing device 1300 to communicate with external devices. For example, the external component interface 1314 can be a USB interface, a FireWire interface, a serial port interface, a parallel port interface, a PS/2 interface, and/or another type of interface that enables the computing device 1300 to communicate with external devices. In various embodiments, the external component interface 1314 enables the computing device 1300 to communicate with various external components, such as external storage devices, input devices, speakers, modems, media player docks, other computing devices, scanners, digital cameras, and fingerprint readers.

The communication medium 1316 facilitates communication among the hardware components of the computing device 1300. In the example of FIG. 2, the communications medium 1316 facilitates communication among the memory 1302, the processing system 1304, the secondary storage device 1306, the network interface card 1308, the video interface 1310, and the external component interface 1314. The communications medium 1316 can be implemented in various ways. For example, the communications medium 1316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

The memory 1302 stores various types of data and/or software instructions. For instance, in the example of FIG. 2, the memory 1302 stores a Basic Input/Output System (BIOS) 1318 and an operating system 1320. The BIOS 1318 includes a set of computer-executable instructions that, when executed by the processing system 1304, cause the computing device 1300 to boot up. The operating system 1320 includes a set of computer-executable instructions that, when executed by the processing system 1304, cause the computing device 1300 to provide an operating system that coordinates the activities and sharing of resources of the computing device 1300. Furthermore, the memory 1302 stores application software 1322. The application software 1322 includes computer-executable instructions, that when executed by the processing system 1304, cause the computing device 1300 to provide one or more applications. The memory 1302 also stores program data 1324. The program data 1324 is data used by programs that execute on the computing device 1300.

Although particular features are discussed herein as included within a computing device 1300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer storage media does not include, e.g., solely a carrier wave or other propagated or modulated data signal. In some embodiments, the computer storage media includes at least some tangible features; in many embodiments, the computer storage media includes entirely non-transitory components.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A vehicle undercarriage imaging system comprising:
   a mirror assembly including a base and a mirror surface, the mirror surface having a width and the mirror assembly having a height;
   a camera positionable at a location that is central in a width direction along the mirror surface and spaced apart from the mirror surface in a depth direction that is normal to the width direction, the camera having a field of view oriented toward the mirror surface;
   wherein the mirror surface is angled in the depth direction such that a reflected field of view that is viewable in the mirror surface at the camera is above the mirror assembly in the height direction, and
   wherein the camera is configured to capture sequential images of at least a portion of a vehicle undercarriage passing above the mirror assembly within the reflected field of view, and
   wherein the mirror assembly includes an extension arm movably attached to the base at a first end of the extension arm, the extension arm including a camera mount at a second end of the extension arm.

2. The vehicle undercarriage imaging system of claim 1, wherein the image capture device is configured to form a composite vehicle undercarriage image from the sequential images.

3. The vehicle undercarriage imaging system of claim 1, wherein the camera mount is configured to position the camera at the location that is central in the width direction along the mirror surface and spaced apart from the mirror surface in a depth direction that is normal to the width direction.

4. The vehicle undercarriage imaging system of claim 3, wherein the extension arm is configured to fold into the base such that the first and second ends of the extension arm are parallel to the width direction along the mirror surface.

5. The vehicle undercarriage imaging system of claim 4, wherein the extension arm includes a base having a slot and a side attached to the base at a right-angle, the side including a slot.

6. The vehicle undercarriage imaging system of claim 5, wherein the mirror assembly further includes:
   a cover, including bracket;
   a stop bar attached to the bottom of the base configured to position the extension arm in a depth direction that is normal to the width direction when the extension arm is extended and an edge of the extension arm is in contact with the stop bar;
   an extension arm rotation pin attached to the bottom of the base configured to be received in the slot on the base of the extension arm;
   wherein the extension arm is configured to extend from a folded-in position in which the extension arm is parallel to the width direction along the mirror surface by sliding along the rotation pin and rotating about the rotation pin so as to swing out from the mirror assembly base in a depth direction to an extended position in which the extension arm is normal to the width direction along the mirror surface.

7. The vehicle undercarriage imaging system of claim 1, wherein the mirror assembly includes a pair of extension arms movably attached to the base at opposite ends of the base and at a first end of each of the extension arms, the extension arms including a camera mount at a second end of each of the extension arms, the camera mount configured to position the camera at the location that is central in the width direction along the mirror surface and spaced apart from the mirror surface in a depth direction that is normal to the width direction.

8. The vehicle undercarriage system of claim 1, wherein the height of the mirror assembly is less than six inches, and wherein the width of the mirror surface is less than about 60 inches and wide enough to capture a width of the vehicle undercarriage.

9. The vehicle undercarriage imaging system of claim 1, wherein the mirror assembly further includes a plurality of light emitting diodes at fixed positions along at least one peripheral edge of the mirror surface.

10. The vehicle undercarriage imaging system of claim 1, wherein the mirror assembly further includes a leveling indicator.

11. The vehicle undercarriage imaging system of claim 1, wherein the mirror assembly further includes a plurality of adjustable feet extending from the base, the plurality of adjustable feet being individually adjustable in a height direction.

12. The vehicle undercarriage imaging system of claim 1, wherein the mirror surface is mountable to the base via one or more magnets.

13. The vehicle undercarriage imaging system of claim 1, further comprising a plurality of cameras oriented toward the mirror surface.

14. The vehicle undercarriage imaging system of claim 1, further comprising at least one fiducial mark positioned on the mirror assembly within the field of view of the camera.

15. A vehicle undercarriage imaging system comprising:
a mirror assembly including a base and a mirror surface, the mirror surface having a width and the mirror assembly having a height;
a camera mount positioned on an end of an extension arm, the extension arm movable between a retracted position an extended position, wherein, in the extended position, the camera mount is at a location that is central in a width direction along the mirror surface and spaced apart from the mirror surface in a depth direction that is normal to the width direction,
wherein the camera mount is positioned such that a camera mountable therein is oriented toward the mirror surface;
wherein the mirror surface is angled in the depth direction such that a reflected field of view that is viewable in the mirror surface from the camera mount is above the mirror assembly in the height direction, and
wherein the reflected field of view includes a width of a vehicle undercarriage passing above the mirror assembly in the depth direction.

16. The vehicle undercarriage imaging system of claim 15, wherein the height of the mirror assembly is less than a predetermined height corresponding to a minimum ground clearance of an automobile.

17. The vehicle undercarriage imaging system of claim 15, wherein the camera mount is oriented to receive a mobile device having the camera on a rear side, the camera being oriented toward the mirror assembly when received by the camera mount.

18. The vehicle undercarriage imaging system of claim 15, wherein the mirror surface is positioned at an upwardly-oriented 45 degree angle relative to the camera mount.

19. The vehicle undercarriage imaging system of claim 15, wherein the camera mount is at least partially positioned in horizontal alignment with the mirror assembly.

20. A method of capturing an image of a vehicle undercarriage, the method comprising:
placing a mirror assembly at a predetermined location, the mirror assembly including a base and a mirror surface, the mirror surface having a width and the mirror assembly having a height;
extending a camera mount from the mirror assembly at a predetermined horizontal distance from the mirror assembly;
positioning a device including a camera in the camera mount oriented toward the mirror surface, the mirror surface being upwardly angled to reflect a view above the mirror assembly toward the camera;
causing a vehicle to pass over the mirror assembly while recording a plurality of images in the camera; and
viewing a composite vehicle undercarriage image compiled from portions of the plurality of images.

21. The method of claim 20, further comprising:
prior to causing the vehicle to pass over the mirror assembly, initiating a process to record the plurality of images.

22. The method of claim 20, wherein viewing the composite vehicle undercarriage image is performed in an application on the device, the method further comprising providing one or more inputs to the application identifying features in the composite vehicle undercarriage image.

23. A vehicle undercarriage imaging system comprising:
a mirror assembly including a base and a mirror surface, the mirror surface having a width and the mirror assembly having a height;
a camera positionable at a location that is central in a width direction along the mirror surface and spaced apart from the mirror surface in a depth direction that is normal to the width direction, the camera having a field of view oriented toward the mirror surface;
wherein the mirror surface is angled in the depth direction such that a reflected field of view that is viewable in the mirror surface at the camera is above the mirror assembly in the height direction, and
wherein the camera is configured to capture sequential images of at least a portion of a vehicle undercarriage passing above the mirror assembly within the reflected field of view, and
wherein the height of the mirror assembly is less than six inches, and wherein the width of the mirror surface is less than about 60 inches and wide enough to capture a width of the vehicle undercarriage.

* * * * *